(12) United States Patent
Liao et al.

(10) Patent No.: US 11,372,447 B2
(45) Date of Patent: Jun. 28, 2022

(54) TRIGGER DEVICE AND SMART BRACELET

(71) Applicant: SHENZHEN ROYOLE TECHNOLOGIES CO. LTD., Guangdong (CN)

(72) Inventors: Le Liao, Guangdong (CN); Xinyuan Xia, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 787 days.

(21) Appl. No.: 16/329,930

(22) PCT Filed: Nov. 2, 2016

(86) PCT No.: PCT/CN2016/104344
§ 371 (c)(1),
(2) Date: Mar. 1, 2019

(87) PCT Pub. No.: WO2018/081950
PCT Pub. Date: May 11, 2018

(65) Prior Publication Data
US 2021/0034099 A1    Feb. 4, 2021

(51) Int. Cl.
*G06F 1/16* (2006.01)
*A44C 5/00* (2006.01)
*A44C 5/14* (2006.01)
*G06F 3/14* (2006.01)

(52) U.S. Cl.
CPC ............ *G06F 1/163* (2013.01); *A44C 5/0015* (2013.01); *A44C 5/14* (2013.01); *G06F 3/14* (2013.01)

(58) Field of Classification Search
CPC .................................. G06F 3/14; G06F 1/163
See application file for complete search history.

(56) References Cited

U.S. PATENT DOCUMENTS

2016/0165024 A1    6/2016  Tan et al.

FOREIGN PATENT DOCUMENTS

| CN | 102123187 A | 7/2011 |
| CN | 103716428 A | 4/2014 |
| CN | 103869976 A | 6/2014 |
| CN | 103941816 A | 7/2014 |

(Continued)

OTHER PUBLICATIONS

International search report dated Apr. 10, 2017 from corresponding application No. PCT/CN2016/104344.

*Primary Examiner* — Kent W Chang
*Assistant Examiner* — Chayce R Bibbee
(74) *Attorney, Agent, or Firm* — Hauptman Ham, LLP

(57) ABSTRACT

A trigger device is provided. The trigger device includes a controller, a screen assembly, an extendible support assembly operable to support the screen assembly, and a drive assembly operable to drive the support assembly. The drive assembly is provided with a first contact, and the support assembly is provided with a second contact movable relative to the second contact. During retraction or extension of the support assembly, the first contact and the second contact move relative to each other between a contacting state and a separating state. The controller determines whether the support assembly is in the retraction state or the extension state according to the contacting state or the separating state of the first contact and the second contact, so as to control display of the screen assembly. A smart bracelet is further provided.

20 Claims, 53 Drawing Sheets

(56) References Cited

FOREIGN PATENT DOCUMENTS

| | | |
|---|---|---|
| CN | 104298337 A | 1/2015 |
| CN | 204178148 U | 2/2015 |
| CN | 104851367 A | 8/2015 |
| CN | 205121184 U | 3/2016 |
| CN | 105807850 A | 7/2016 |
| CN | 105892275 A | 8/2016 |
| JP | 2007286094 A | 11/2007 |
| KR | 20110082943 A | 7/2011 |

TRIGGER DEVICE AND SMART BRACELET

RELATED APPLICATION

The present application is a National Phase of International Application Number PCT/CN2016/104344, filed Nov. 2, 2016.

TECHNICAL FIELD

The present disclosure relates to the technical field of wearable smart products, and particularly to a trigger device of a display device of a smart bracelet, which is operable to selectively trigger a screen assembly according to a display size of the screen assembly.

BACKGROUND

With the increasing development and application of wearable smart products, the requirements of users are also growing, for example, miniaturization of dimension for portability, a big screen for facilitating viewing, and other requirements. Existing smart bracelets have a display device of a fixed shape, with a common dimension which is usually less than 2 inches, thus the viewing requirement for a big screen cannot be satisfied.

How to design a display device that not only can be miniaturized in dimension but also can satisfy the requirement of enlarging the screen for viewing is a project continuously researched in the industry.

SUMMARY

A technical problem to be solved by embodiments of the present disclosure is to provide a trigger device. The trigger device is applied to a display device of a smart bracelet. When a display size of a screen assembly changes, the trigger device can selectively trigger an operation area of the screen assembly.

In one aspect, the present disclosure provides a trigger device. The trigger device includes a controller, a screen assembly, an extendible support assembly operable to support the screen assembly, and a drive assembly operable to drive the support assembly. The drive assembly is provided with a first contact, and the support assembly is provided with a second contact movable relative to the second contact. During retraction or extension of the support assembly, the first contact and the second contact move relative to each other between a contacting state and a separating state. The controller is operable to determine whether the support assembly is in the retraction state or the extension state according to the contacting state or the separating state of the first contact and the second contact, so as to control display of the screen assembly.

In a further aspect, the present disclosure further provides a smart bracelet which includes a display device having the trigger device, and a wrist belt coupled with the display device.

By engagement of the drive assembly and the support assembly, that is, by the engagement of the first contact and the second contact, the trigger device of the present disclosure can selectively control display of the screen assembly when the screen assembly is in an extension state or a retracted state, thereby ensuring that a display region exposed from the display device can work normally. Therefore, not only the requirement of miniaturization of dimension can be satisfied, but also the dimension of a screen can be expanded.

BRIEF DESCRIPTION OF THE DRAWINGS

In order to illustrate the technical solutions of embodiments of the present disclosure or the related art more clearly, the accompanying drawings used in the description of the embodiments will be briefly described. Apparently, the accompanying drawings described in the following are merely some embodiments of the present disclosure, and a person ordinarily skilled in the art still can obtain other accompanying drawings according to these accompanying drawings without any creative effort.

DETAILED DESCRIPTION

Below technical solutions of embodiments of the present disclosure will be described clearly and completely in conjunction with the accompanying drawings of the embodiments of the present disclosure. Apparently, some but not all of embodiments of the present disclosure are described. Based on the embodiments of the present disclosure, all the other embodiments, which a person ordinarily skilled in the art obtains without paying creative effort, fall within the scope of protection of the present disclosure.

Terms "first", "second", "third", "fourth" and the like (if present) in the description and claims of the present disclosure and the above accompanying drawings are used for distinguishing similar objects, but are not necessarily used to describe a specific order or sequence.

Figure 1:
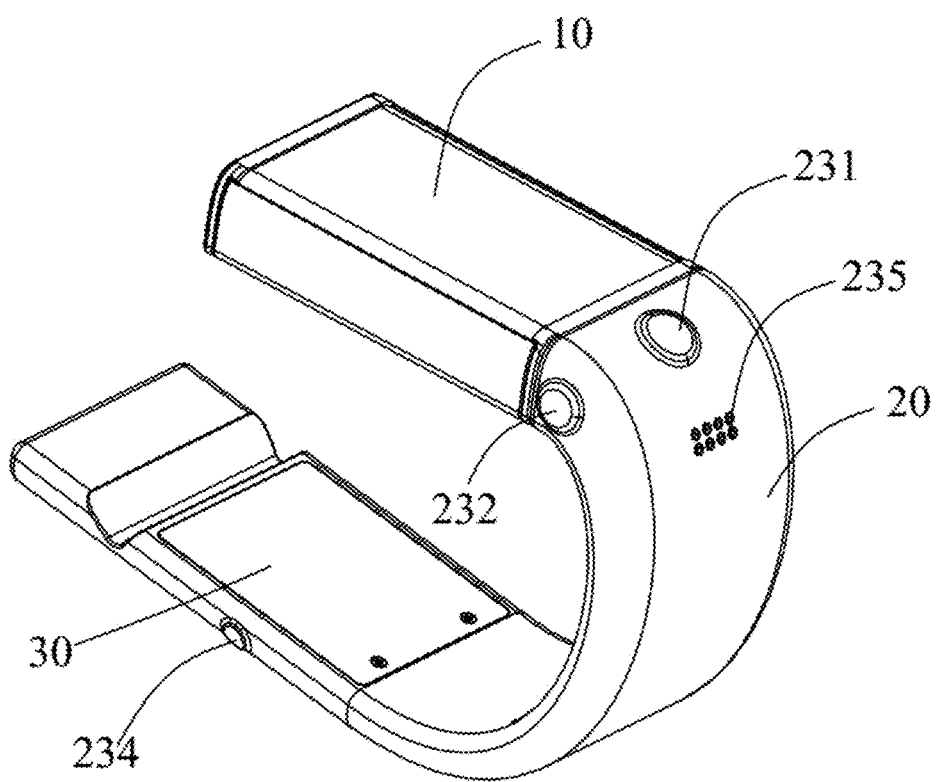
FIG. 1 is a perspective schematic view of a smart bracelet according to an embodiment of the present disclosure.

Referring to FIG. 1, the present disclosure relates to a smart bracelet which includes a display device 10 and a wrist belt 20. The wrist belt 20 receives a battery module 30 therein. In an embodiment, the display device 10 and the battery module 30 are oppositely arranged (the two are located at the side of the hand back and the side of the palm, respectively, and by "oppositely arranged" herein, it not merely refers to "directly oppositely arranged", but also can be "staggered with each other" or "partially oppositely arranged"), the battery module 30 is fixed in the wrist belt 20, and an end of the wrist belt 20 is connected to the display device 10, so that the smart bracelet is substantially in a C shape or U shape. As illustrated in FIG. 1, the wrist belt 20 is further provided with a switch button 234, an expansion button 232, a home button 231, and sound holes 235. In the present disclosure, more electronic parts (for example, various buttons described above) are arranged on the wrist belt 20, which facilitates the wrist belt being multi-functional, while freeing up more spaces for the display device 10.

Figure 2:
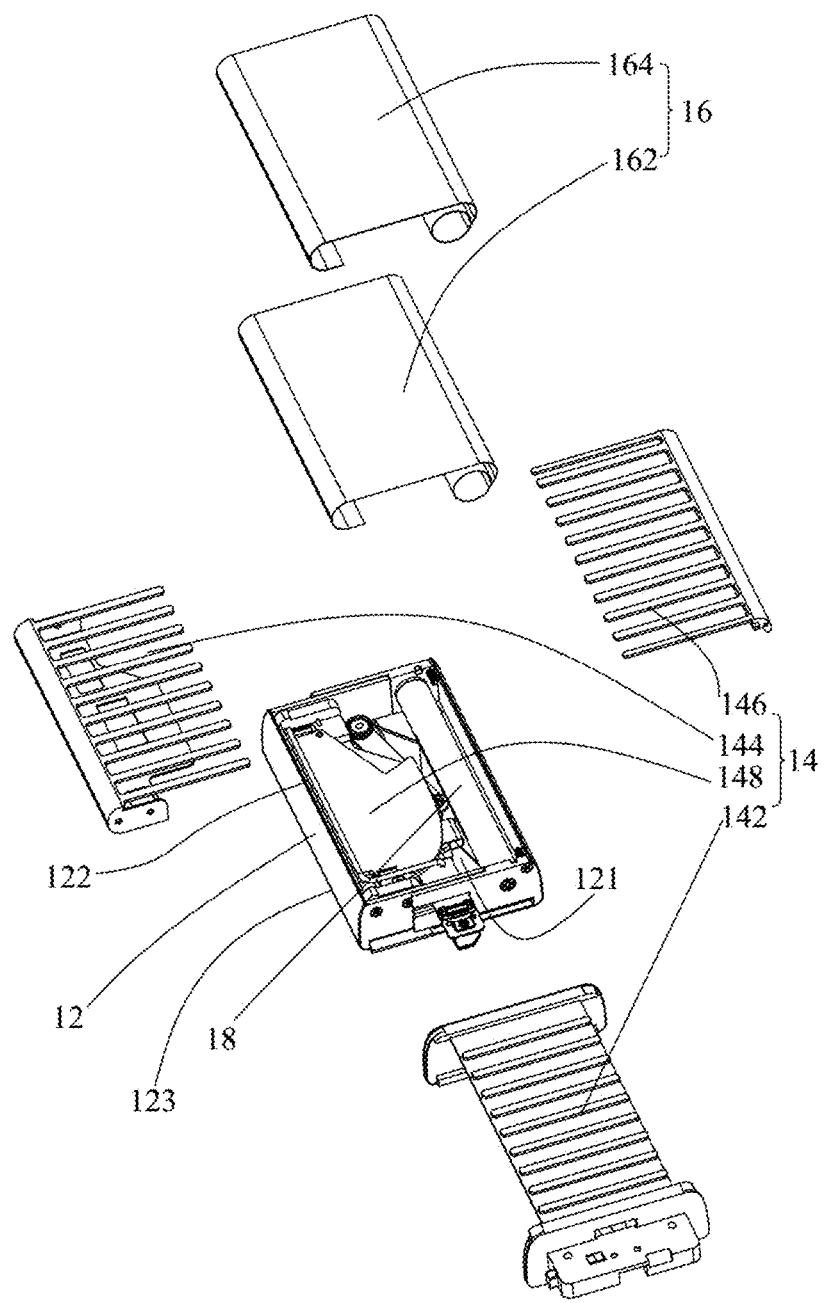
FIG. 2 is an exploded schematic view of a display device of the smart bracelet according to an embodiment of the present disclosure.

Referring to FIG. 2, the display device 10 includes a frame assembly 12, a support assembly 14, a screen assembly 16, and a reel assembly 18. The frame assembly 12 receives a receiving space 121 therein. The frame assembly 12 includes a top end 122 and a bottom end 123. The support assembly 14 is installed at the top end 122 of the frame assembly 12, and the support assembly 14 is used to support the screen assembly 16. The reel assembly 18 is arranged in the receiving space 121 of the frame assembly 12, and the reel assembly 18 is rotatably connected to the frame assembly 12 for winding a part of the screen assembly 16. In the present disclosure, through deformation of the frame assembly 12, the support assembly 14 and the screen assembly 16 are driven to be varied in dimension, so that the dimension of the display device 10 of the smart bracelet is expanded and a display interface can be extended and retracted. The frame assembly 12 in the present disclosure further can be applied in other portable electronic devices (for example, cellphones) for supporting the screen assembly.

The screen assembly 16 includes a flexible display screen 162 and a flexible touch screen 164, which are stacked and both can be made from a flexible material that can be rolled.

Figure 3:
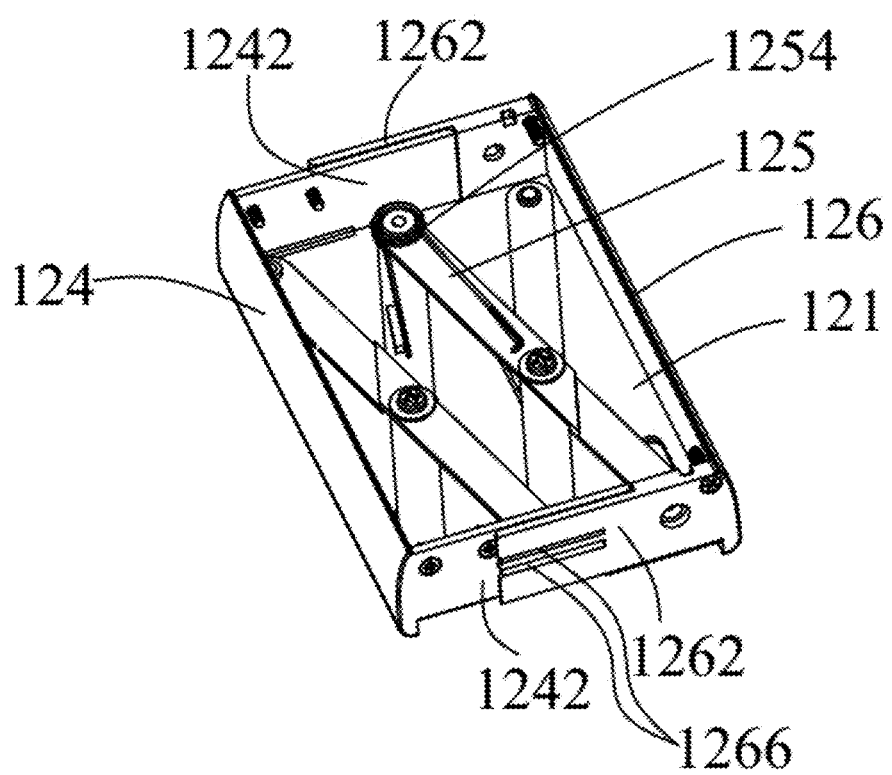
FIG. 3 is an exploded schematic view of a frame assembly of the display device of the smart bracelet according to an embodiment of the present disclosure.
Figure 4:
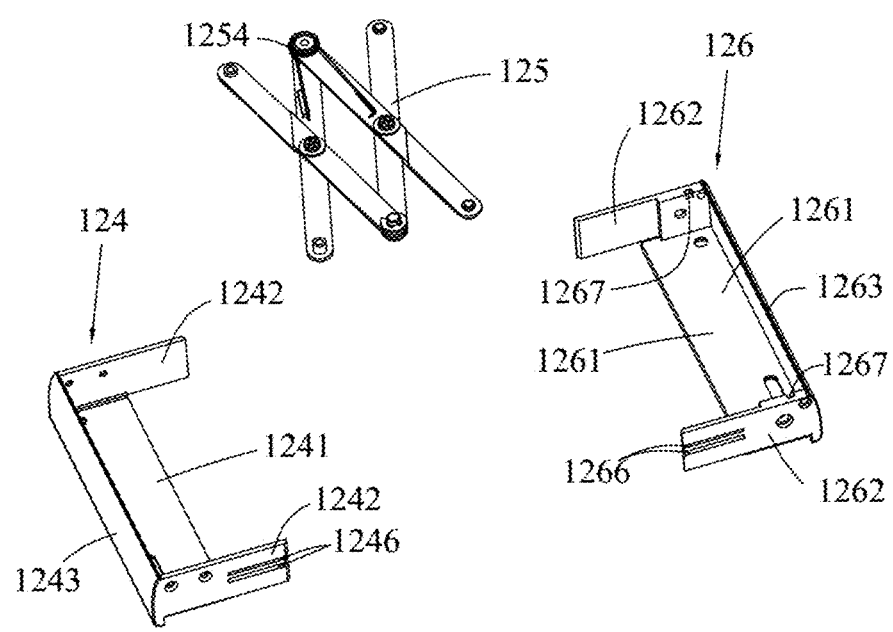
FIG. 4 is an exploded schematic view illustrating a left frame, a right frame, and a deformation assembly of the frame assembly on the basis of FIG. 3.

Referring to FIG. 3 and FIG. 4, the frame assembly 12 includes a left frame 124, a right frame 126, and a deformation assembly 125. The left frame 124 and the right frame 126 are oppositely arranged and define the receiving space 121 therebetween. The deformation assembly 125 is located in the receiving space 121, and is connected between the left frame 124 and right frame 126, and a variation of a distance between the left frame 124 and right frame 126 is realized through the deformation assembly 125.

Figure 5:
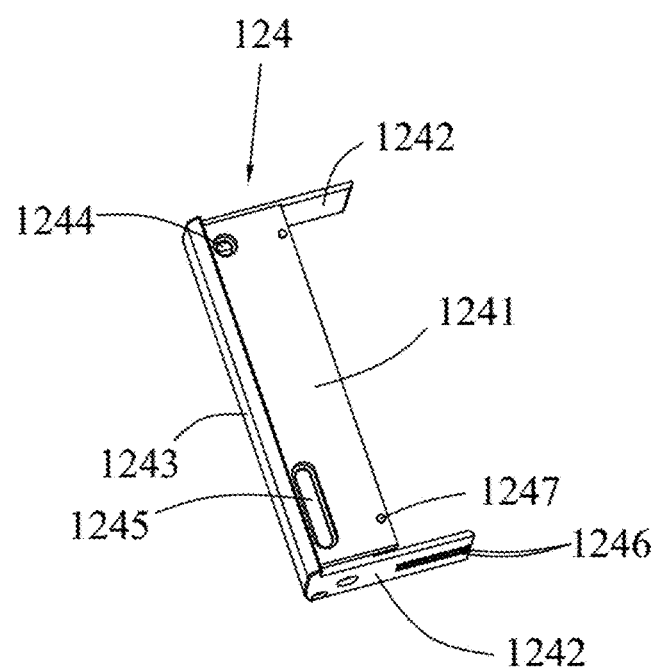
FIG. 5 is a schematic view of the left frame of the frame assembly according to an embodiment of the present disclosure.

Referring to FIG. 4 and FIG. 5, the left frame 124 includes a first bottom wall 1241, a pair of first side walls 1242 formed at two opposite sides of the first bottom wall 1241, and a first connecting wall 1243 connected between the first bottom wall 1241 and the pair of first side walls 1242. The first bottom wall 1241 defines a first screw hole 1244 and an elongated first limit slot 1245. Two corners are formed at places of the first bottom wall 1241 close to the first connecting wall 1243 and the pair of first side walls 1242, and the two corners are referred to as a first corner and a second corner, respectively. The first screw hole 1244 is located at the first corner. The first limit slot 1245 extends from the second corner and along an extending direction of the first connecting wall 1243. The first screw hole 1244 and the first limit slot 1245 are used to install the deformation assembly 125. One of the first side walls 1242 defines two first grooves 1246, and the two first grooves 1246 each define an opening at an end face of the first side wall 1242 away from the first connecting wall 1243. Furthermore, the two first grooves 1246 are parallel to each other.

Figure 6:
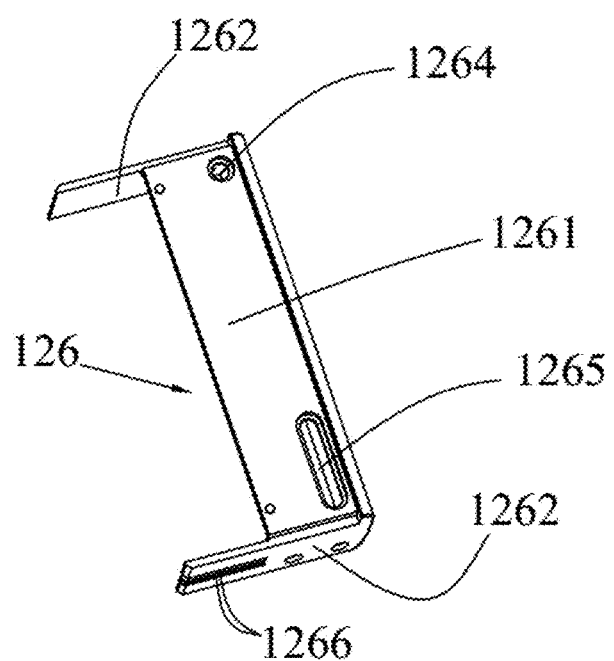
FIG. 6 is a schematic view of the right frame of the frame assembly according to an embodiment of the present disclosure.

Referring to FIG. 4 and FIG. 6, the right frame 126 is substantially the same as the left frame 124 in structure. The right frame 126 includes a second bottom wall 1261, a pair of second side walls 1262 formed at two opposite sides of the second bottom wall 1261, and a second connecting wall 1263 connected between the second bottom wall 1261 and the pair of second side walls 1262. The second bottom wall 1261 defines a second screw hole 1264 and an elongated second limit slot 1265 located at two corners, respectively. The second limit slot 1265 extends along an extending direction of the second connecting wall 1263. The second screw hole 1264 and the second limit slot 1265 are used to install the deformation assembly 125. One of the second side walls 1262 defines two second grooves 1266, and the two second grooves 1266 each define an opening at an end face of the second side wall 1262 away from the second connecting wall 1263. Furthermore, the two second grooves 1266 are parallel to each other. The right frame 126 differs from the left frame 124 in that the pair of second side walls 1262 of the right frame 126 respectively define two notches 1267, and each notch 1267 is located at an end face of the second side wall 1262 away from the second bottom wall 1261. Furthermore, the two notches 1267 respectively located on the pair of second side walls 1262 are arranged opposite to each other, and close to the second connecting wall 1263. The two notches 1267 are used to position the support assembly 14.

Figure 38:
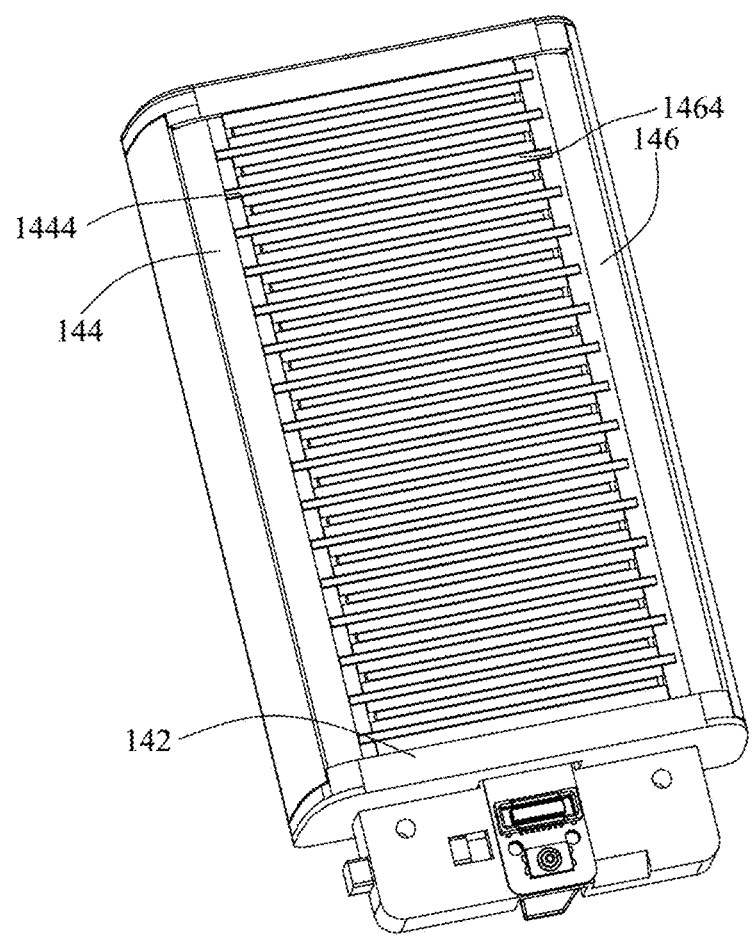
FIG. 38 is a schematic view of a support assembly according to another embodiment of the present disclosure, the support assembly being in a retraction state.
Figure 39:
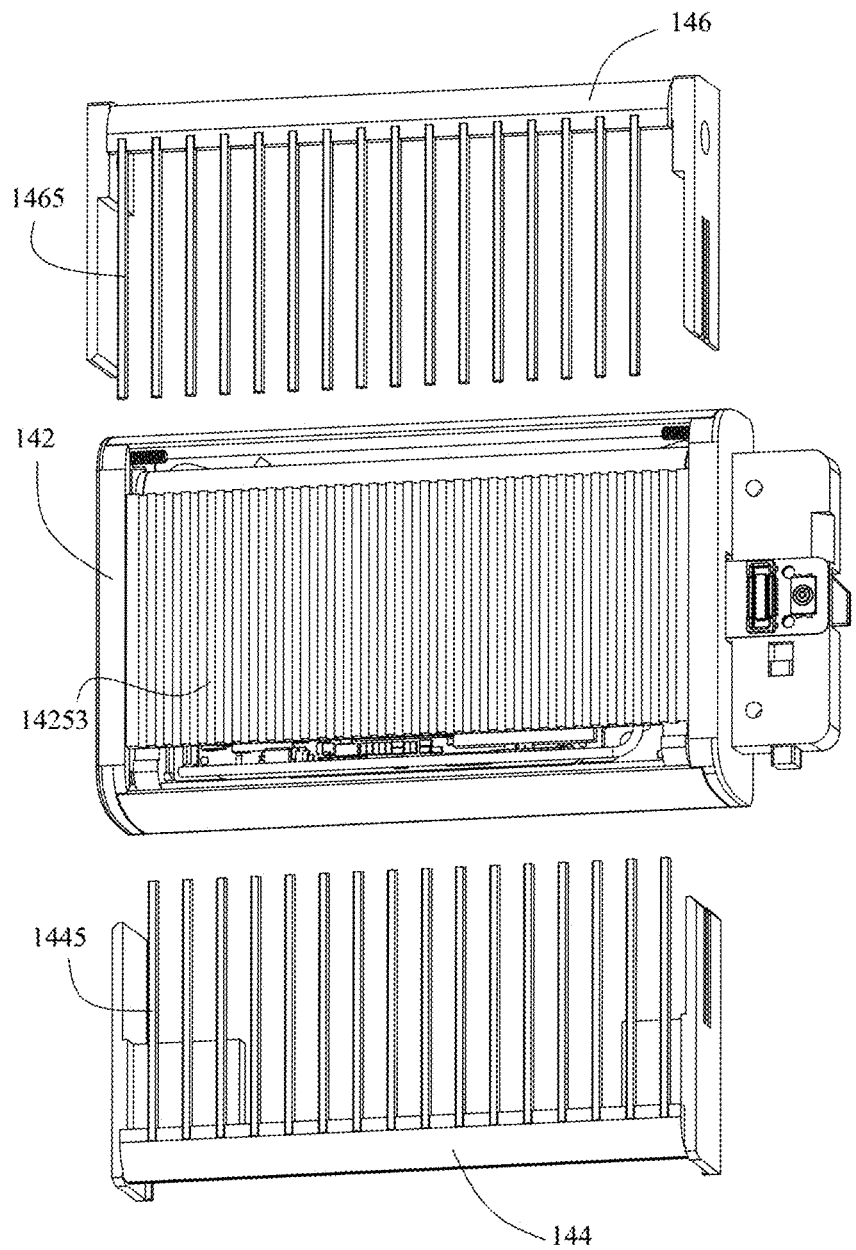
FIG. 39 is an exploded schematic view of the support assembly illustrated in FIG. 38, a left support frame and a right support frame being disassembled from a frame body.
Figure 47:
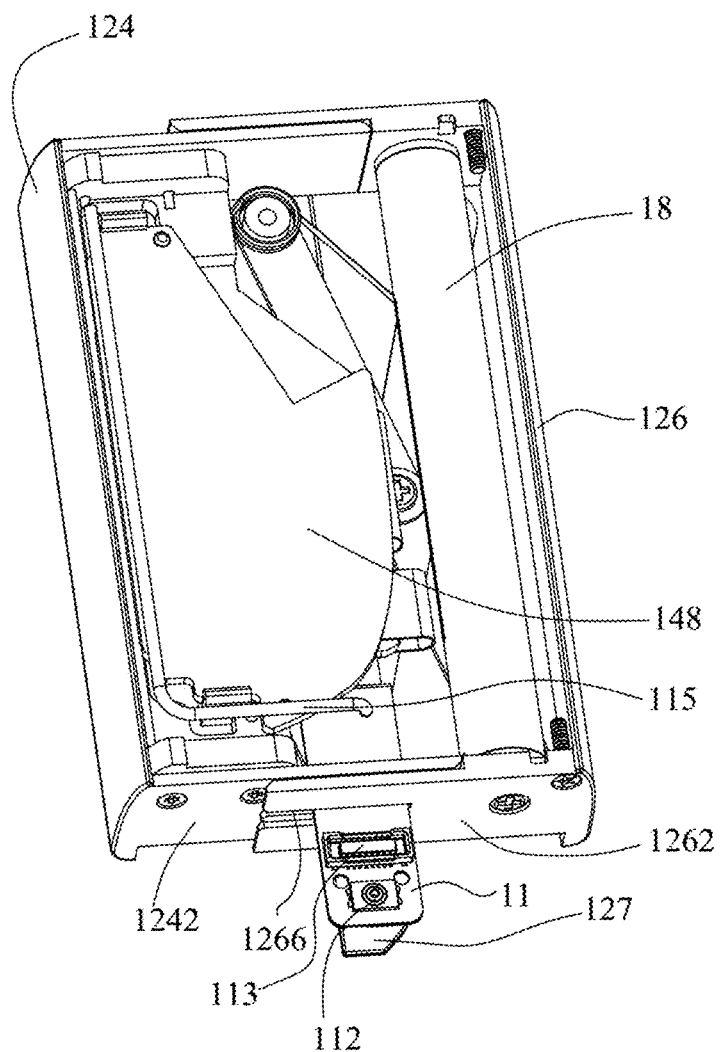
FIG. 47 is a partial structural schematic view of the display device according to an embodiment of the present disclosure, mainly illustrating an end of an FPC extending out of the display device.

The left frame 124 and the right frame 126 are oppositely arranged, and the first bottom wall 1241 and the second bottom wall 1261 are coplanar. The pair of first side walls 1242 are connected to the pair of second side walls 1262, respectively. When the left frame 124 and the right frame 126 get close to each other, the pair of first side walls 1242 are located at inner sides of the pair of second side walls 1262, respectively, as illustrated in FIG. 3. That is to say, each first side wall 1242 abuts against the inner side of a corresponding second side wall 1262. At this point, the two first grooves 1246 and the two second grooves 1266 overlap with each other, respectively. The first grooves 1246 and the second grooves 1266 are used for connecting elements to extend out of the frame assembly 12 from the inside of the frame assembly 12, so as to cooperate with structures of the wrist belt 20. For example, as illustrated in FIG. 38 and FIG. 47, at the two first grooves 1246 and the two second grooves 1266, an FPC 11 and a connecting sheet 127 extend out of the frame assembly 12 from the inside of the frame assembly 12, respectively. Particularly, the FPC 11 extends out of the upper first groove 1246 and the upper second groove 1266, and the connecting sheet 127 extends out of the lower first groove 1246 and the lower second groove 1266. Thus, extending paths of the FPC 11 and the connecting sheet 127 are spaced apart from each other, avoiding interference with each other. Certainly, there may be one first groove 1246 and one second groove 1266, and the FPC 11 and the connecting sheet 127 extend out of the frame assembly 12 from the same groove. The first limit slot 1245 and the second limit slot 1265 are parallel to each other, and directions of extension of the first limit slot 1245 and the second limit slot 1265 are perpendicular to a direction along which the left frame 124 moves relative to the right frame 126.

In an embodiment of the present disclosure, the deformation assembly 125 has a connecting rod structure formed by hinging a number of connecting rods with each other. In other embodiments, the deformation assembly 125 also can have a sleeve structure, for example, similar to a telescopic structure of a luggage.

Figure 7:
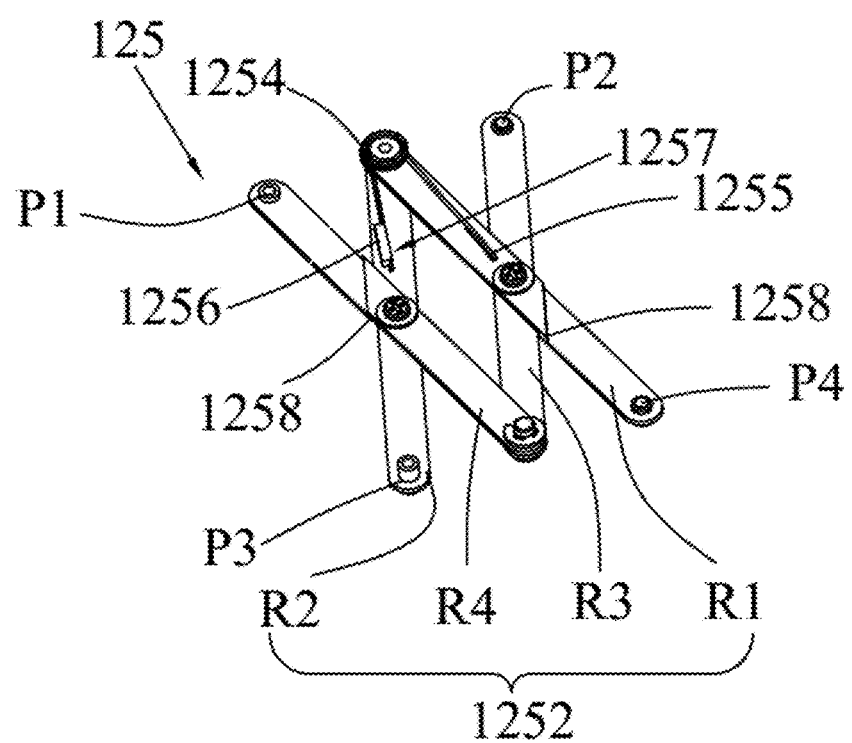
FIG. 7 is a schematic view of the deformation assembly of the frame assembly according to an embodiment of the present disclosure.
Figure 8:
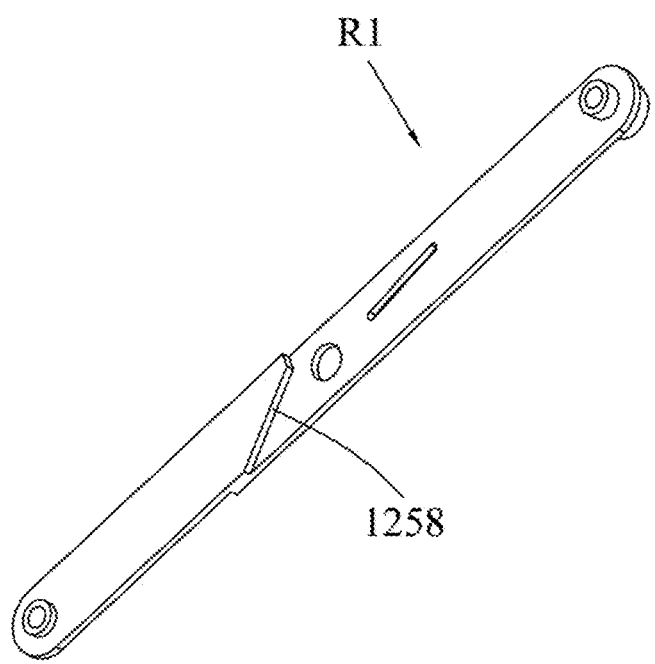
FIG. 8 is a schematic view of a connecting rod of the deformation assembly in FIG. 7.

Referring to FIG. 7 and FIG. 8, the deformation assembly 125 used in the present disclosure includes a rod assembly 1252 and an elastic element 1254. The rod assembly 1252 includes at least two connecting rods, and the at least two connecting rods are hinged. The elastic element 1254 may be a coil spring or a spring. The elastic element 1254 elastically connects at least two connecting rods of the rod assembly 1252. When the elastic element 1254 is in a stretched state, the rod assembly 1252 is in an unfolded state, and when the rod assembly 1252 is in a folded state, the elastic element 1254 is in an elastically compressed state.

The rod assembly 1252 includes a first fixing end P1 and a second fixing end P2 respectively fixed to the left frame 124 and the right frame 126, and a first moving end P3 and a second moving end P4 slidably connected to the left frame 124 and the right frame 126, respectively. Referring to FIG. 9, FIG. 10, FIG. 11, and FIG. 12, the first fixing end P1 is fixed at the first screw hole 1244, the second fixing end P2 is fixed at the second screw hole 1264, the first moving end P3 is installed to the first limit slot 1245, and the second moving end P4 is installed to the second limit slot 1265. In a process of folding or unfolding the rod assembly 1252, the first moving end P3 is moved in the first limit slot 1245, and the second moving end P4 is moved in the second limit slot 1265, so as to drive relative movement between the left frame 124 and the right frame 126.

That is to say, in the above embodiment, the first fixing end P1 and the second fixing end P2 are moved together with the left frame 124 and the right frame 126 in the deformation direction, and they are fixed with respect to the left frame 124 and the right frame 126. The first moving end P3 and the second moving end P4 are moved together with the left frame 124 and the right frame 126, meanwhile, the first moving end P3 and the second moving end P4 are moved with respect to the left frame 124 and the right frame 126. Because in a direction perpendicular to the deformation direction, in the process of the deformation of the rod assembly, a distance between the first moving end P3 and the first fixing end P1 and a distance between the second moving end P4 and the second fixing end P2 are variable.

In other embodiments, for example, the rod assembly 1252 has a V shape by hinging two connecting rods, in this way, in the process of the deformation of the rod assembly 1252, tracks of relative movement between the end portion of the two ends of the rod assembly 1252 and the left frame 124 and the right frame 126 are in an arc shape, so as to ensure that the deformation of the rod assembly 1252 causes the distance between the left frame 124 and the right frame 126 to vary.

In an embodiment, the rod assembly 1252 is formed by connecting in sequence two X-shape connecting rod assemblies in series. Certainly, in other embodiments, the rod assembly 1252 also can merely include one X-shape connecting rod assembly, or include three or more connecting rod assemblies. The specific number of the connecting rod assembly can be determined according to a range of dimension in which the display device 10 needs to be expanded.

Below the deformation assembly 125 formed by two X-shape connecting rod assemblies is described in detail.

Referring to FIG. 7 to FIG. 12, the rod assembly 1252 includes a first connecting rod R1, a second connecting rod R2, a third connecting rod R3, and a fourth connecting rod R4. The four connecting rods have a rod-shape structure with the same length. A middle portion of the first connecting rod R1 and a middle portion of the third connecting rod R3 are hinged to form an X-shape structure. A middle portion of the second connecting rod R2 and a middle portion of the fourth connecting rod R4 are hinged to form an X-shape structure. One end of the first connecting rod R1 is hinged to one end of the second connecting rod R2. The other end of the first connecting rod R1 is provided with the second moving end P4, and the other end of the second connecting rod R2 is provided with the first moving end P3. That is, free ends of the first connecting rod R1 and of the second connecting rod R2 (ends of the first connecting rod R1 and the second connecting rod R2 away from the hinging ends of the first connecting rod R1 and the second connecting rod R2) are the second moving end P4 and the first moving end P3, respectively. The second moving end P4 passes through the second limit slot 1265 of the right frame 126 to be slidably connected to the right frame 126, and the first moving end P3 passes through the first limit slot 1245 of the left frame 124 to be slidably connected to the left frame 124. One end of the third connecting rod R3 is hinged to one end of the fourth connecting rod R4. The other end of the third connecting rod R3 is provided with the second fixing end P2. The other end of the fourth connecting rod R4 is provided with the first fixing end P1. That is, free ends of the third connecting rod R3 and of the fourth connecting rod R4 (ends of the third connecting rod R3 and the fourth connecting rod R4 away from the hinging ends of the third connecting rod R3 and the fourth connecting rod R4) are the second fixing end P2 and the first fixing end P1, respectively. The first fixing end P1 is fixed to the first screw hole 1244 of the left frame 124 by a screw, and the second fixing end P2 is fixed to the second screw hole 1264 of the right frame 126 by a screw.

The elastic element 1254 is a coil spring. The elastic element 1254 is sleeved at a hinged place between the first connecting rod R1 and the second connecting rod R2. Two ends of the elastic element 1254 are fixed to the first connecting rod R1 and the second connecting rod R2, respectively. With the deformation of the rod assembly 1252, the first connecting rod R1 and the second connecting rod R2 are switched between an open state and a closed state. In this process, the elastic element 1254 generates elastic deformation. Specifically, referring to FIG. 7, FIG. 9, and FIG. 11, the first connecting rod R1 defines a clamp slot 1255. The clamp slot 1255 is located between a hinged place between the first connecting rod R1 and the second connecting rod R2 and the middle portion of the first connecting rod R1. The clamp slot 1255 is close to the middle portion of the first connecting rod R1. One end of the elastic element 1254 is fixed in the clamp slot 1255. The second connecting rod R2 includes a projection 1256 protruding from a surface of the second connecting rod R2, an inner slot 1257 is defined between the projection 1256 and the surface of the second connecting rod R2, and the other end of the elastic element 1254 is fixed in the inner slot 1257.

Furthermore, referring to FIG. 7 and FIG. 8, a surface of the first connecting rod R1 contacting the third connecting rod R3 or a surface of the third connecting rod R3 contacting the first connecting rod R1 forms a step 1258 for limiting the rod assembly 1252 further folding in the deformation process. The step 1258 can protrude from the surface of the first connecting rod R1, and also can protrude from the surface of the third connecting rod R3. The step 1258 is used to limit movement between the first connecting rod R1 and the third connecting rod R3 in the deformation process. When the elastic element 1254 is in the elastically compressed state, the rod assembly 1252 is in a folded state, at this point, the third connecting rod R3 abuts against the step 1258 of the first connecting rod R1, preventing further movement of the first connecting rod R1 relative to the third connecting rod R3. Likewise, a surface of the fourth connecting rod R4 lying on the second connecting rod R2 is provided with a step 1258. When the elastic element 1254 is in the elastically compressed state, the rod assembly 1252 is in the folded state, at this point, the second connecting rod R2 abuts against the step 1258 of the fourth connecting rod R4.

Figure 9:
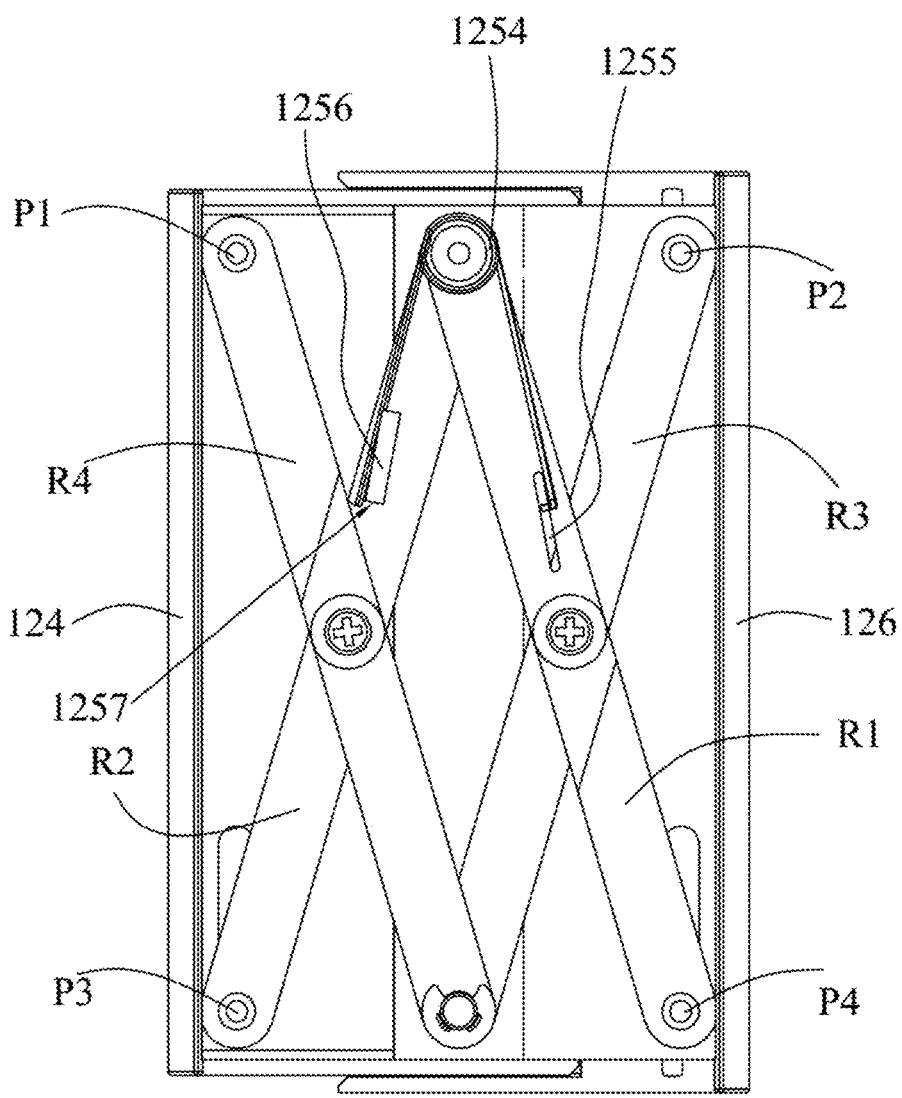
FIG. 9 is an assembled schematic view illustrating the deformation assembly being installed to the left frame and the right frame according to an embodiment of the present disclosure, the deformation assembly being in a folded state.
Figure 10:
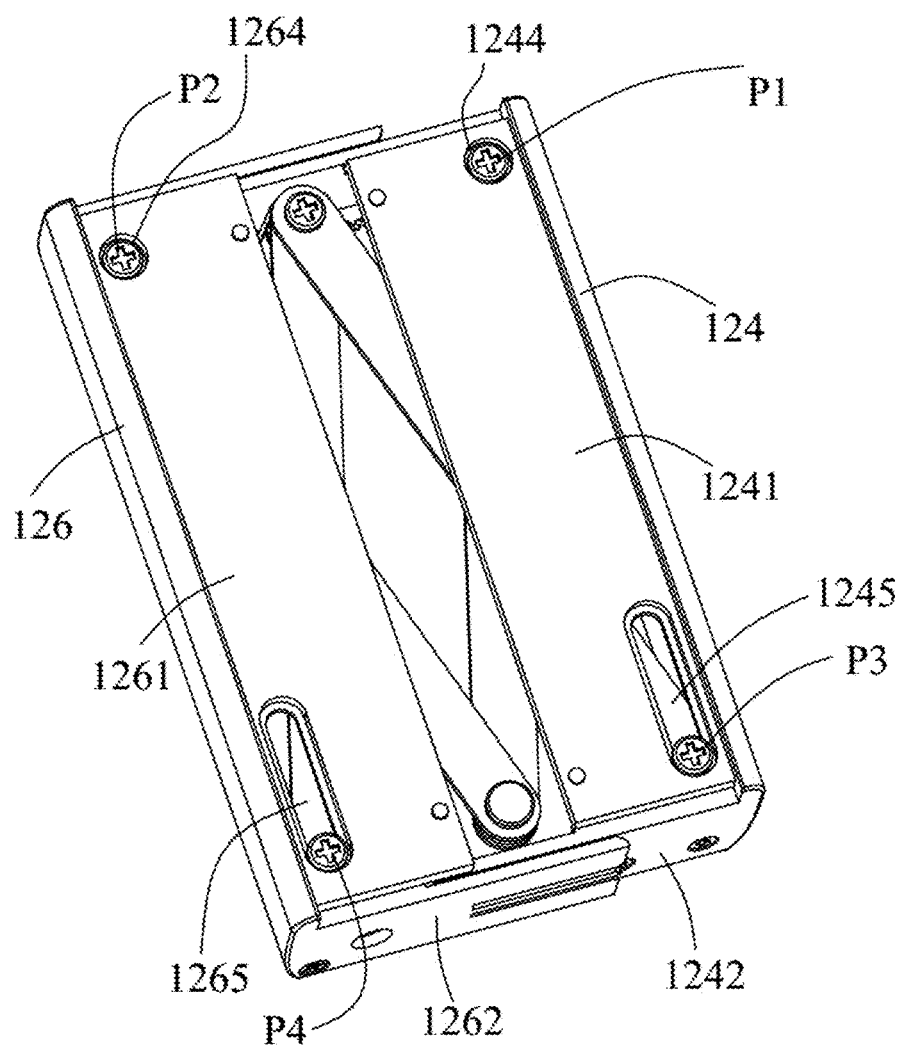
FIG. 10 is a schematic view of FIG. 9, viewed from another direction.
Figure 11:
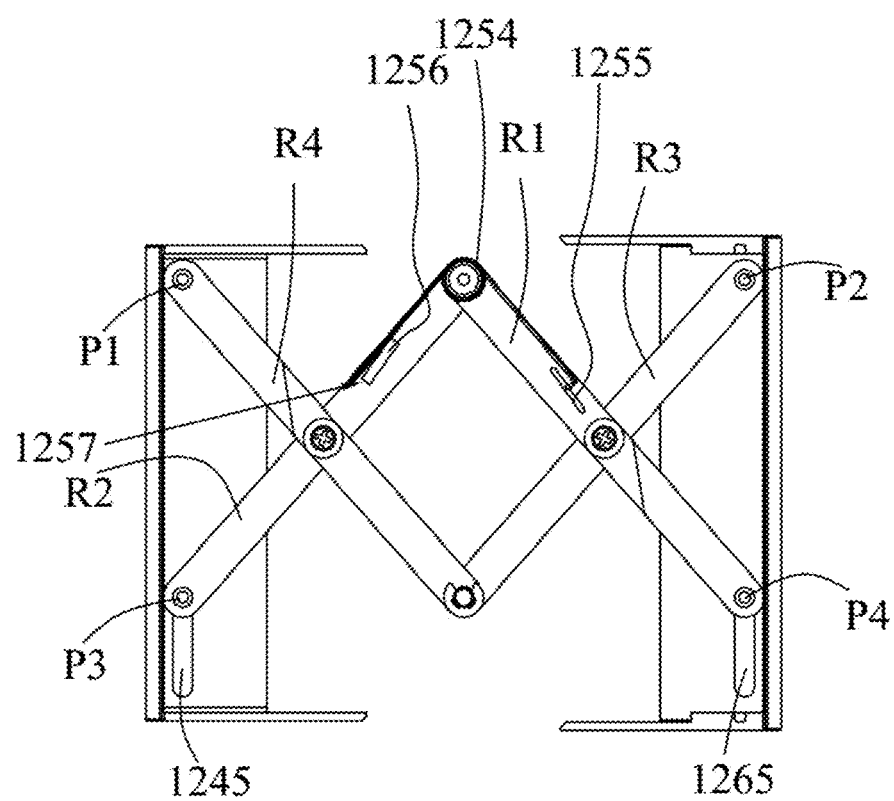
FIG. 11 is an assembled schematic view illustrating the deformation assembly being installed to the left frame and the right frame according to an embodiment of the present disclosure, the deformation assembly being in an unfolded state.
Figure 12:
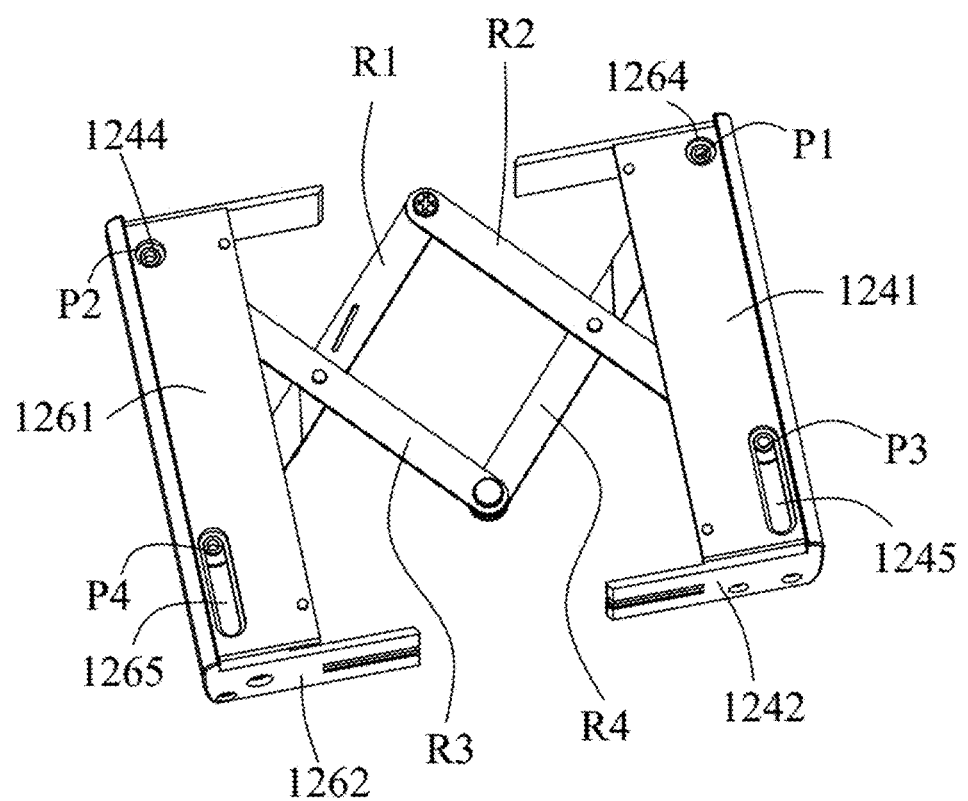
FIG. 12 is a schematic view of FIG. 11, viewed from another direction.

When the rod assembly 1252 is in the folded state, as illustrated in FIG. 9 and FIG. 10, the first moving end P3 is located at one end of the first limit slot 1245 close to the first side wall 1242, the second moving end P4 is located at one end of the second limit slot 1265 close to the second side wall 1262, and the elastic element 1254 is in the elastic compressed state. When the rod assembly 1252 is in an unfolded state, as illustrated in FIG. 11 and FIG. 12, the first moving end P3 is located at one end of the first limit slot 1245 away from the first side wall 1242, the second moving end P4 is located at one end of the second limit slot 1265 away from the second side wall 1262, and the elastic element 1254 is in a free state. The folding and unfolding direction of the rod assembly 1252 is perpendicular to a moving direction of the first moving end P3 in the first limit slot 1245. In the process of from folding to unfolding, the position of the hinged place between the first connecting rod R1 and the second connecting rod R2 is not changed, a hinging position of the third connecting rod R3 and the fourth connecting rod R4 moves towards a position close to the hinged place between the first connecting rod R1 and the second connecting rod R2, the first fixing end P1 and the second fixing end P2 move left and right, respectively, the first moving end P3 moves left and towards the first fixing end P1, and the second moving end P4 moves right and towards the second fixing end P2. In the process of from folding to unfolding, the first fixing end P1 and the first moving end P3 maintain the opposite position relationship all the time, and the two have the same displacement of movement in the left and right directions; the second fixing end P2 and the second moving end P4 also maintain the relative position relationship all the time, and the two also have the same displacement of movement in the left and right directions.

Figure 13:
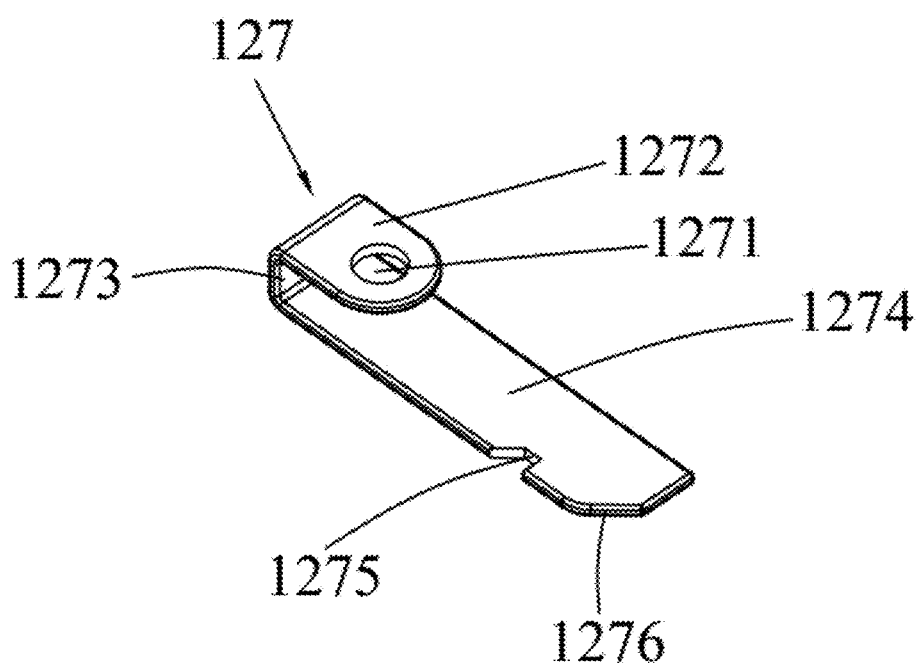
FIG. 13 is a schematic view of a connecting sheet of the frame assembly according to an embodiment of the present disclosure.
Figure 14:
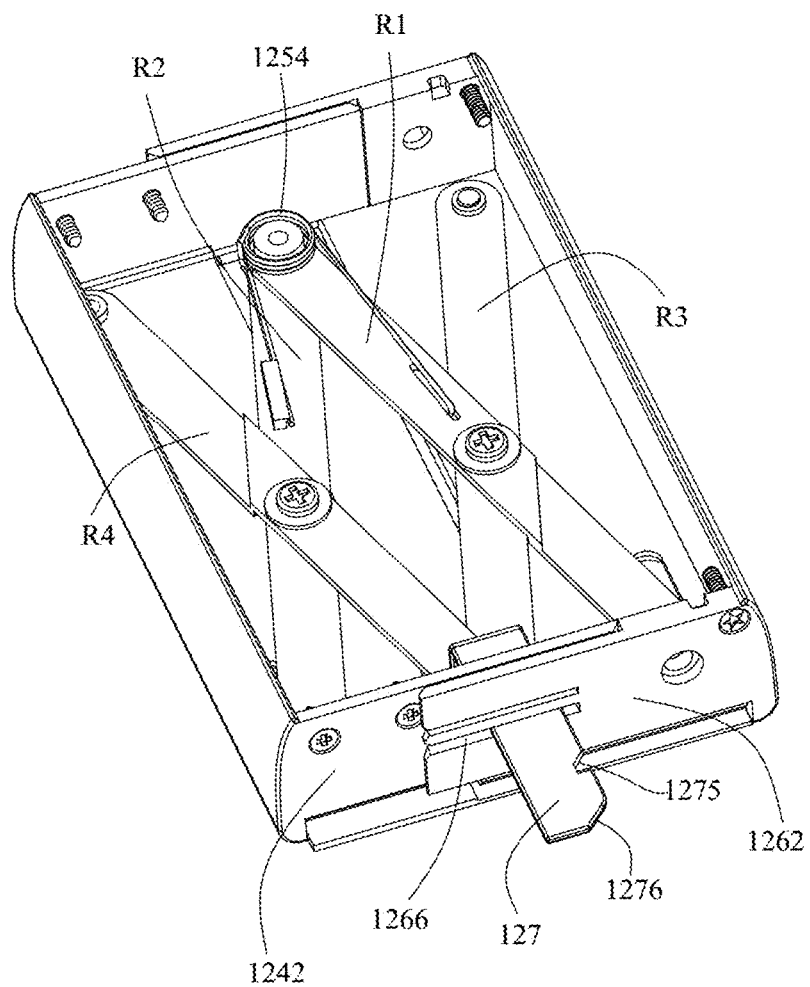
FIG. 14 is a schematic view illustrating the connecting sheet illustrated in FIG. 13 being installed to the deformation assembly and extending out of the frame assembly from the inside of the frame assembly.
Figure 18:
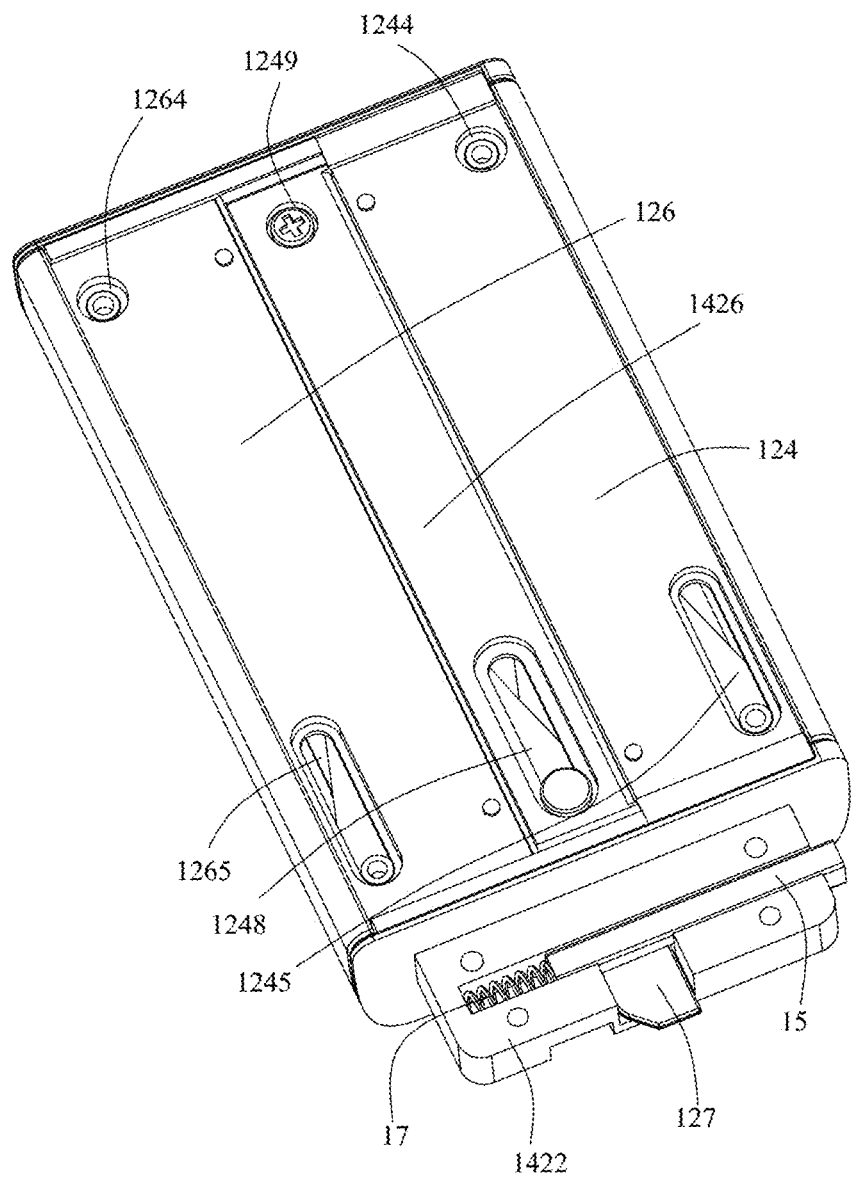
FIG. 18 is a schematic view of the assembled structure of the bracket illustrated in FIG. 17 with the left frame and the right frame, viewed from another direction.
Figure 19:
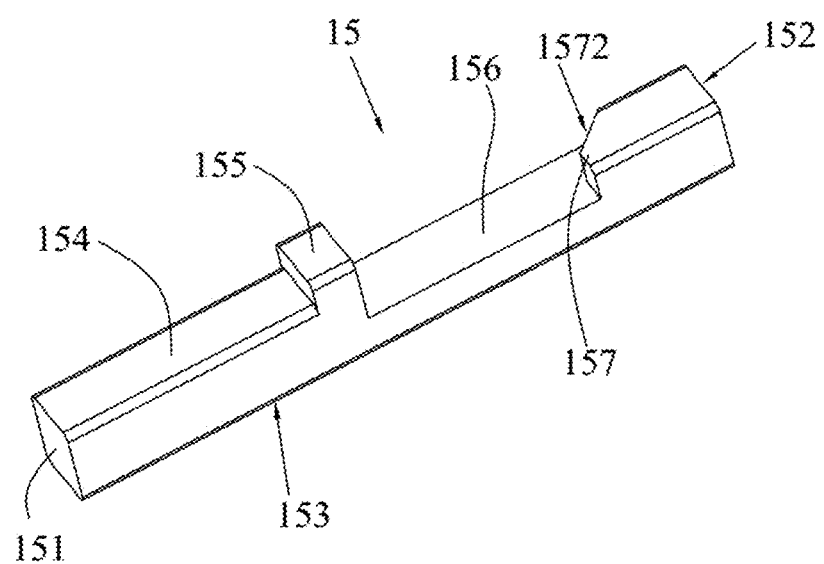
FIG. 19 is a schematic view of an operating rod of the frame assembly according to an embodiment of the present disclosure.
Figure 20:
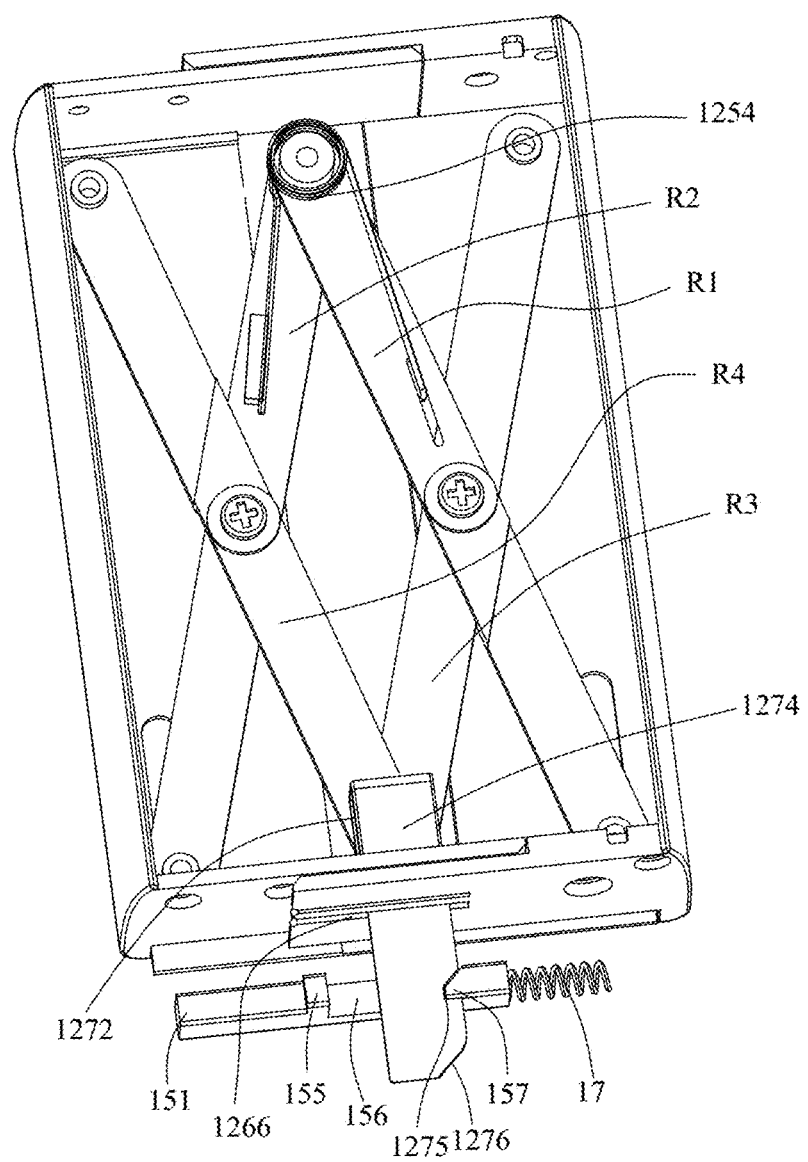
FIG. 20 is a schematic view illustrating an engagement of the operating rod illustrated in FIG. 19 with the connecting sheet illustrated in FIG. 14, the frame assembly being in a folded state.
Figure 21:
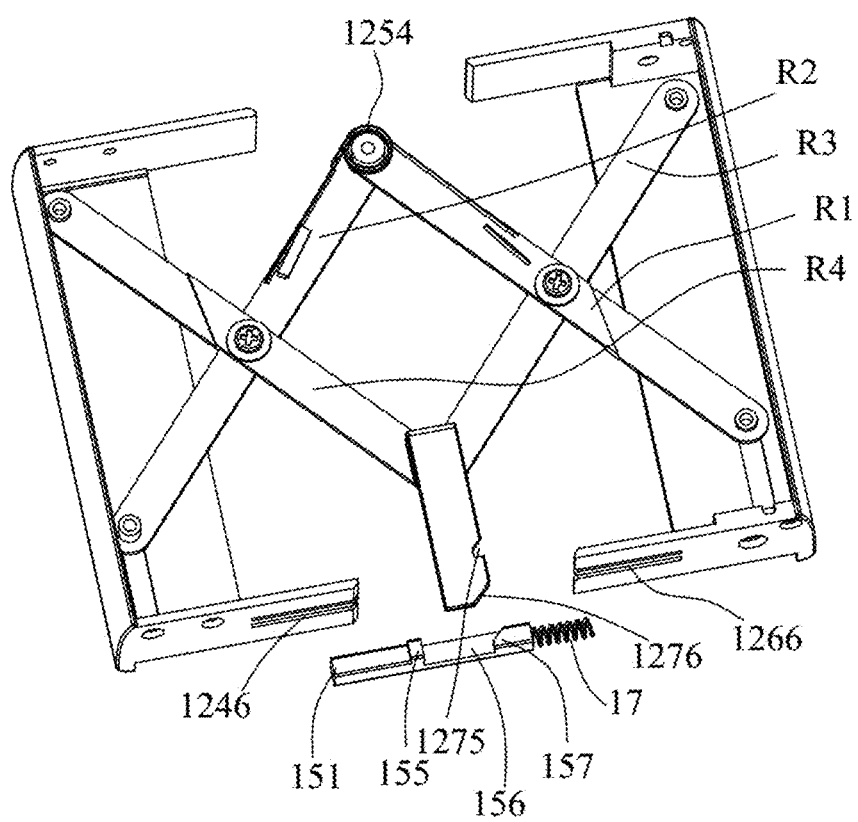
FIG. 21 is a schematic view illustrating a relative position relationship between the connecting sheet and the operating rod when the frame structure illustrated in FIG. 20 is in an unfolded state.

Referring to FIG. 13 and FIG. 14, the frame assembly 12 further includes a connecting sheet 127, and one end of the connecting sheet 127 is arranged in the receiving space 121 for connecting the rod assembly 1252. The connecting sheet 127 passes through one first groove 1246 and one second groove 1266 to extend out of the receiving space 121 of the frame assembly 12. The connecting sheet 127 is used to connect the rod assembly 1252 and an operating rod 15 (as illustrated in FIG. 18 and FIG. 19), and through the cooperation of the connecting sheet 127 and the operating rod, the rod assembly 1252 can be locked in the folded state. When the rod assembly 1252 is in the folded state, the operating rod 15 is snapped to the connecting sheet 127, and when the rod assembly 1252 is in the unfolded state, the operating rod 15 is separated from the connecting sheet 127, One end of the connecting sheet 127 defines a fixing hole 1271. Specifically, one end of the connecting sheet 127 includes a fixing portion 1272, a connecting portion 1273, and a main body 1274. The fixing portion 1272 and the main body 1274 are parallel to each other and spaced apart from each other. The connecting portion 1273 is perpendicularly connected between the fixing portion 1272 and the main body 1274. The fixing hole 1271 is defined in the fixing portion 1272. The fixing portion 1272 has a length less than that of the main body 1274. In an embodiment, the connecting sheet 127 has a metal sheet structure, and the fixing portion 1272 and the connecting portion 1273 are formed by bending one end of the main body 1274. The main body 1274 extends out of the frame assembly 12 from positions of the first groove 1246 and the second groove 1266. One edge of the main body 1274 defines a clamp notch 1275. An end of the main body 1274 away from the connecting portion 1273 (i.e., an end away from the rod assembly 1252) includes a first inclined face 1276. When the rod assembly 1252 is in the folded state, the clamp notch 1275 is located outside the frame assembly 12, and the clamp notch 1275 cooperates with the operation rod 15 to lock the rod assembly 1252 in the folded state.

Referring to FIG. 2, FIG. 15 to FIG. 19, the display device 10 further includes a bracket 142. The bracket 142 may be a part of the support assembly 14, and also can be regarded as a part of the frame assembly 12. The bracket 142 includes a bracket body 1421 and a base 1422. The rod assembly 1252 is connected to the bracket body 1421, the left frame 124 and the right frame 126 are slidably connected to the bracket body 1421, and the base 1422 is connected to the bracket body 1421 and located outside the receiving space 121 of the frame assembly 12. The base 1422 extends into the wrist belt 20.

The operating rod 15 and the base 1422 are in elastically sliding connection, and the connecting sheet 127 extends into the base 1422 and cooperates with the operating rod 15 to form a locking structure, so as to lock the rod assembly 1252 in a folded position.

Figure 15:
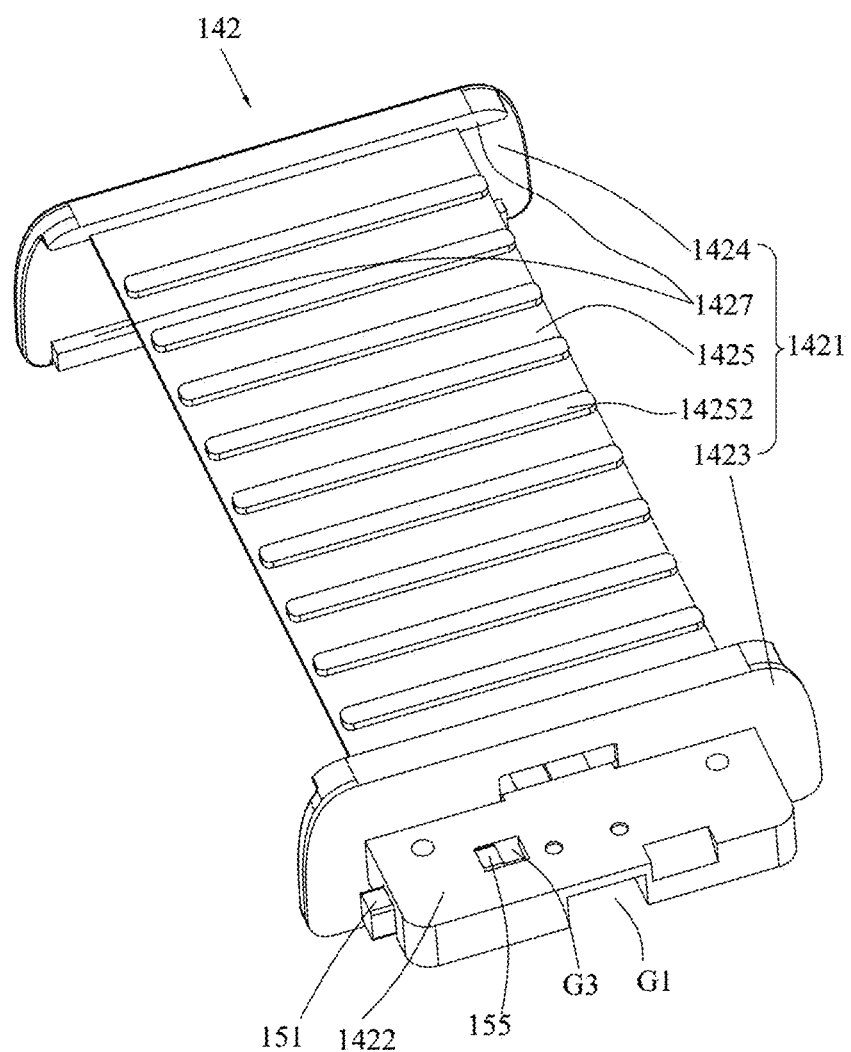
FIG. 15 is a schematic view of a bracket of the frame assembly according to an embodiment of the present disclosure.
Figure 16:
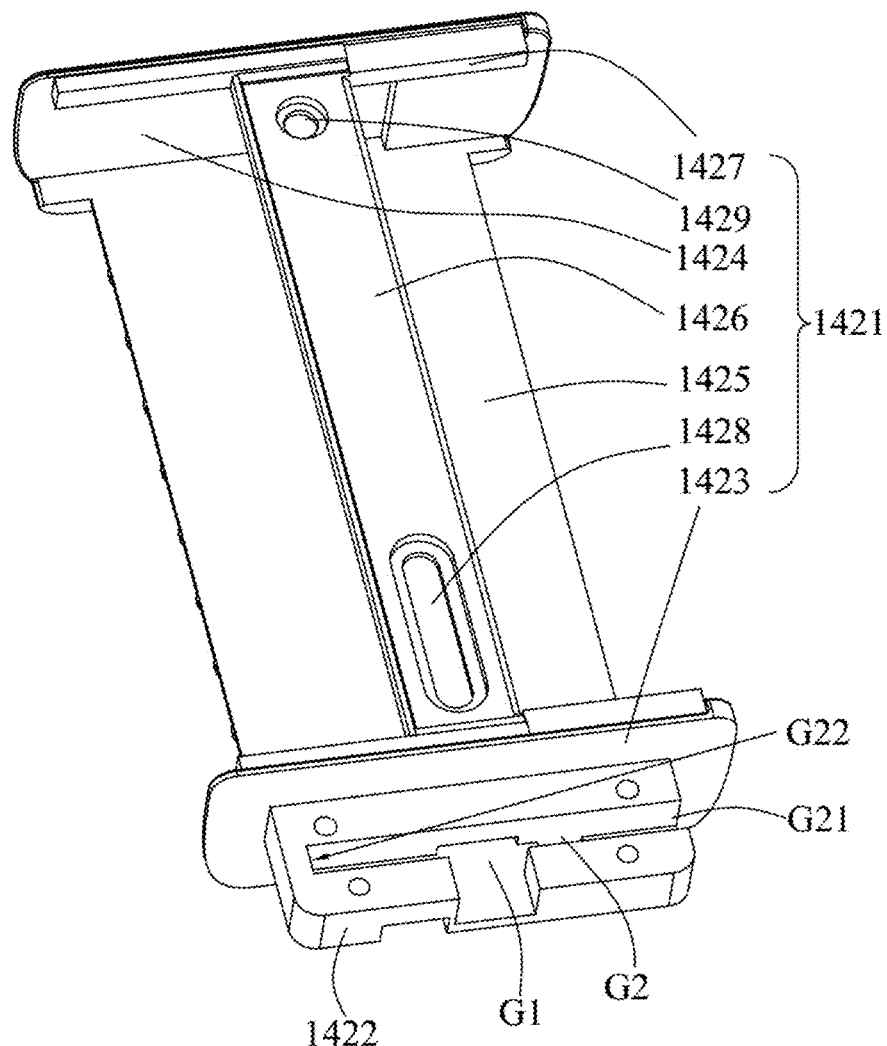
FIG. 16 is a schematic view of the bracket illustrated in FIG. 15, viewed from another direction.
Figure 17:
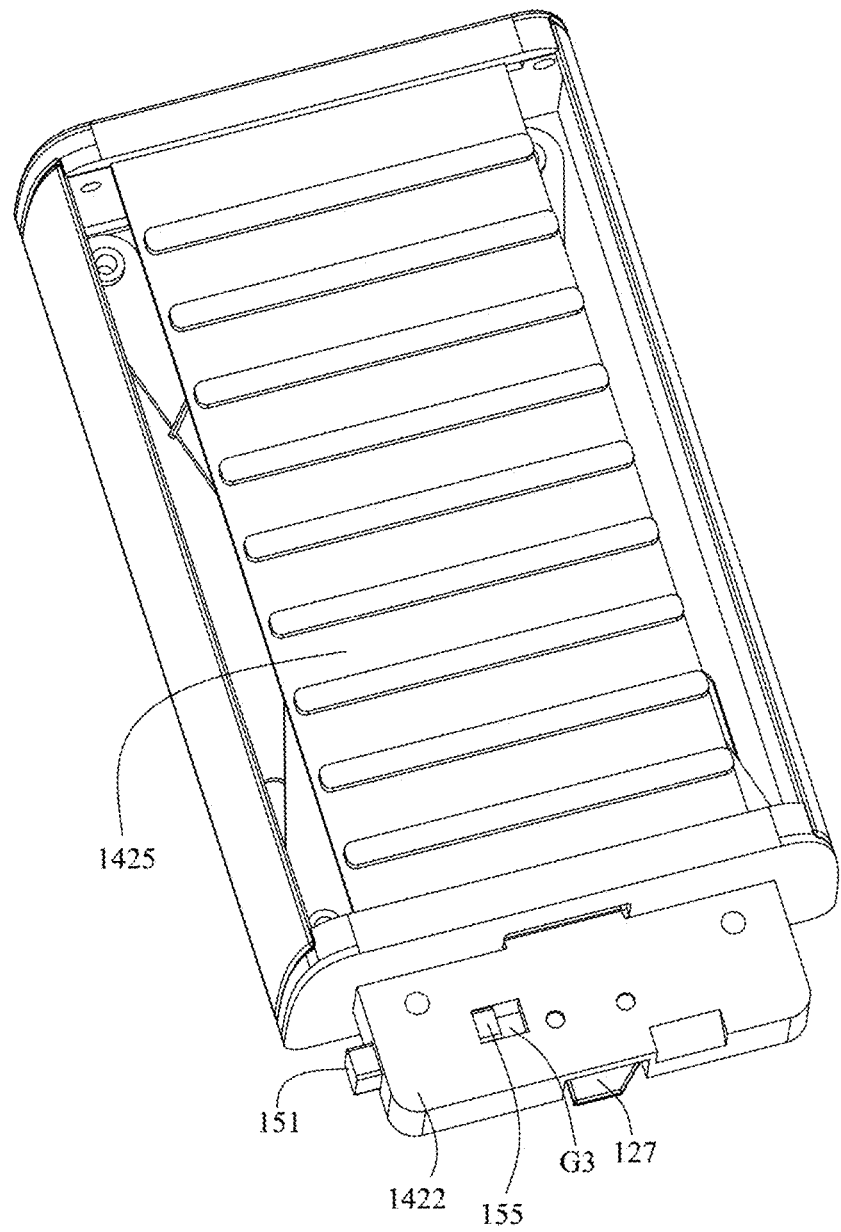
FIG. 17 is a schematic view of an assembled structure of the bracket illustrated in FIG. 15 with the left frame and the right frame.

Specifically, as illustrated in FIG. 18, the base 1422 is used to receive the operating rod 15 and the elastic element 17. As illustrated in FIG. 16, the base 1422 defines a first guide groove G1 and a second guide groove G2, and the first guide groove G1 and the second guide groove G2 crossed and communicating with each other. The first guide groove G1 is used to receive the main body of the connecting sheet 127. The second guide groove G2 is used to receive the operating rod 15. The second guide groove G2 includes an open end G21 and a bottom end G22 opposite to the open end G21, and the open end G21 is located at an edge of the base 1422, such that an outside of the base 1422 is in communication with an inside of the second guide groove G2. As illustrated in FIG. 15 and FIG. 17, the base 1422 further defines a hole G3 in communication with the second guide groove G2. In an embodiment, extending directions of the first guide groove G1 and of the second guide groove G2 are perpendicular, and the extending direction of the second guide groove G2 is the same as the relative movement direction of the left frame 124 and the right frame 126 in the deformation process of the rod assembly 1252. The first guide groove G1 communicates with the receiving space 121 inside the frame assembly 12.

Referring to FIG. 19, the operating rod 15 includes a head end 151 and a tail end 152 opposite to the head end 151, and a bottom face 153 and a engagement face 154 connected between the head end 151 and the tail end 152, and the bottom face 153 and the engagement face 154 are oppositely arranged. The engagement face 154 is provided with a protrusion 155, a recess 156, and a snap-fit portion 157. Specifically, the recess 156 is defined between the protrusion 155 and the snap-fit portion 157. The operating rod 15 is installed in the second guide groove G2, and the protrusion 155 is received in the hole G3. The protrusion 155 has a dimension smaller than that of the hole G3, such that the protrusion 155 can move in the hole G3, so as to limit a moving distance of the operating rod 15 in the second guide groove G2. The snap-fit portion 157 is used to be engaged with the clamp notch 1275 of the connecting sheet 127. The snap-fit portion 157 includes a second inclined face 1572 oriented towards the inside of the first guide groove G1, and the second inclined face 1572 is oriented towards the frame assembly 12. The second inclined face 1572 cooperates with the first inclined face 1276 to realize movement of the operating rod 15 in the second guide groove G2 that is driven by the movement of the connecting sheet 127. The snap-fit portion 157 of the operating rod 15 has the same shape as the clamp notch 1275 of the connecting sheet 127, and the snap-fit portion 157 is received in the clamp notch 1275, then the position of the connecting sheet 127 can be locked.

The elastic element 17 is elastically connected between the operating rod 15 and the base 1422. Furthermore, the elastic element 17 is received in the second guide groove G2, and is elastically connected between the tail end 152 of the operating rod 15 and the bottom end G22 of the second guide groove G2. The head end 151 of the operating rod 15 can extend out of the base 1422 from the open end G21 of the second guide groove G2 for user's operation.

When the rod assembly 1252 is in the folded state, the head end 151 of the operating rod 15 extends out of the open end G21 of the second guide groove G2, and is located outside the base 1422. The protrusion 155 of the operating rod 15 abuts against an end of the hole G3. The snap-fit portion 157 locks with the clamp notch 1275, such that the connecting sheet 126 is limited, and a pulling force generated by the connecting sheet 127 to the rod assembly 1252 counteracts a restoring resilience force of the elastic element 1254 of the rod assembly 1252.

When the frame assembly 12 needs to be folded, the head end 151 of the operating rod 15 is pressed down, the operating rod 15 moves in the second guide groove G2, such that the snap-fit portion 157 leaves the clamp notch 1275. At this point, the pulling force generated by the connecting sheet 127 to the rod assembly 1252 is eliminated, and under the effect of the restoring resilience force of the elastic element 1254 of the rod assembly 1252, the left frame 124 and the right frame 126 are driven to move towards left and right sides, meanwhile, the connecting sheet 127 is driven to move into the receiving space 121 of the frame assembly 12. When the head end 151 of the operating rod 15 is released, under the elastic force of the elastic element 17 in the base 1422, the operating rod 15 returns to an initial position.

When the frame assembly 12 needs to be folded, the left frame 124 and the right frame 126 are pressed towards the middle of the frame assembly 12, such that the left frame 124 and the right frame 126 move towards each other. Meanwhile, the left frame 124 and the right frame 126 drive the connecting sheet 127 to move into the first guide groove G1 of the base 1422. Then the first inclined face 1276 of the connecting sheet 127 abuts against the second inclined face 1572 of the operating rod 15, forcing the operating rod 15 to move towards the bottom end G22 of the second guide groove G2. When the connecting sheet 127 moves to a position where the snap-fit portion 157 meets the clamp notch 1275, the elastic element 17 in the second guide groove G2 restores the deformation to drive the operating rod 15 to move towards the open end G21 of the second guide groove G2, such that the snap-fit portion 157 moves into the clamp notch 1275, so as to fix the connecting sheet 127.

In the processes of unfolding and folding, the position of the bracket 142 remains original.

Referring to FIG. 15 and FIG. 16, the bracket body 1421 of the bracket 142 includes a front baffle 1423, a rear baffle 1424, a plate 1425, and a support beam 1426. The front baffle 1423 and the rear baffle 1424 are oppositely arranged at an interval. Surfaces of the front baffle 1423 and of the rear baffle 1424 facing each other are both provided with two limit strips 1427, a limit passage is formed between the two limit strips 1427, and the limit passage is used to receive the first side wall 1242 of the left frame 124 and the second side wall 1262 of the right frame 126. In other words, the limit passage is used to cooperate with the left frame 124 and the right frame 126, so as to realize the sliding connection of the left frame 124 and the right frame 126 to the bracket 142. The plate 1425 and the support beam 1426 are oppositely arranged between a side of the front baffle 1423 and a side of the rear baffle 1424. Edges of two opposite sides of the plate 1425 are respectively connected to one limit strip 1427 of the front baffle 1423 and one limit strip 1427 of the rear baffle 1424, and the front baffle 1423 and the rear baffle 1424 are located at the same side of the plate 1425. The plate 1425 is installed at top ends of the left frame 124 and the right frame 126, i.e., a side opposite to the first bottom wall 1241 of the left frame and a side opposite to the second bottom wall 1261 of the right frame 126. One end edge of the support beam 1426 is connected to the other limit strip 1427 of the front baffle 1423, and the other end edge of the support beam 1426 is connected to the other limit strip 1427 of the rear baffle 1424. The support beam 1426 and the plate 1425 are oppositely arranged, and the support beam 1426 is connected between the front baffle 1423 and the rear baffle 1424 to form an "I" shape.

The support beam 1426 is used to connect the rod assembly 1252. The deformation assembly is deformed with respective to the support beam 1426 as a deformation center. The support beam 1426 defines a third screw hole 1429 and a third limit slot 1428, the third screw hole 1429 is close to the rear baffle 1424, and the third limit slot 1428 is close to the front baffle 1423. A side of the front baffle 1423 away from the rear baffle 1424 is connected to the base 1422. The third screw hole 1429 is located between the first screw hole 1244 in the first bottom wall 1241 of the left frame 124 and the second screw hole 1264 in the second bottom wall 1261 of the right frame 126. The first screw hole 1244, the third screw hole 1429, and the second screw hole 1264 are collinear (it means that central points of the three are collinear). The third limit slot 1428 is located between the first limit slot 1245 and the second limit slot 1265. The first limit slot 1245, the third limit slot 1428, and the second limit slot 1265 are parallel to each other, and central points of the three are collinear. The third screw hole 1429 is used to fix a spindle at the hinged place between the first connecting rod R1 and the second connecting rod R2. The third limit slot 1428 is used to install a spindle at the hinged place between the third connecting rod R3 and the fourth connecting rod R4. The fixing hole 1271 at an end of the connecting sheet 127 is fixedly connected to the spindle at the hinged place between the third connecting rod R3 and the fourth connecting rod R4.

When the rod assembly 1252 is in the folded state, the first bottom wall 1241 and the second bottom wall 1261 are connected to two opposite sides of the support beam 1426, respectively.

A surface of the plate 1425 is provided with a number of protruding ribs 14252 for supporting the screen assembly 16, and the protruding ribs 14252 are spaced apart from each other and arranged in an array. The bracket 142 provided with the protruding ribs 14252 also can be regarded as a portion of the support assembly 14.

Figure 22:
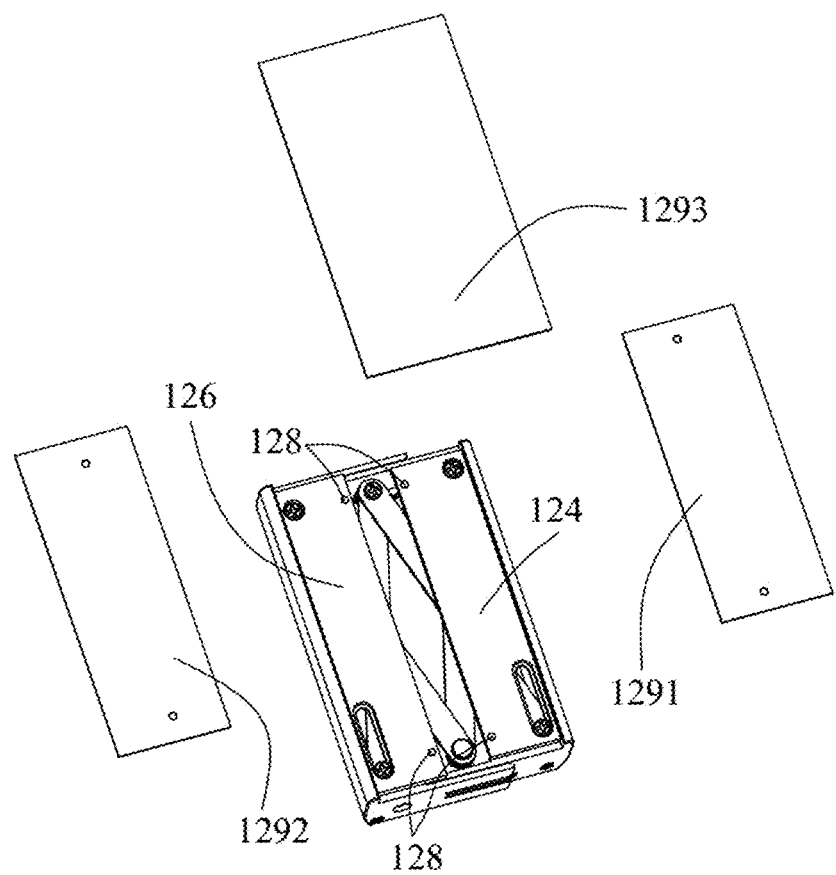
FIG. 22 is an exploded schematic view of the frame assembly according to an embodiment of the present disclosure, illustrating the left frame, the right frame, a left bottom plate, a right bottom plate, and a support plate of the frame assembly.
Figure 23:
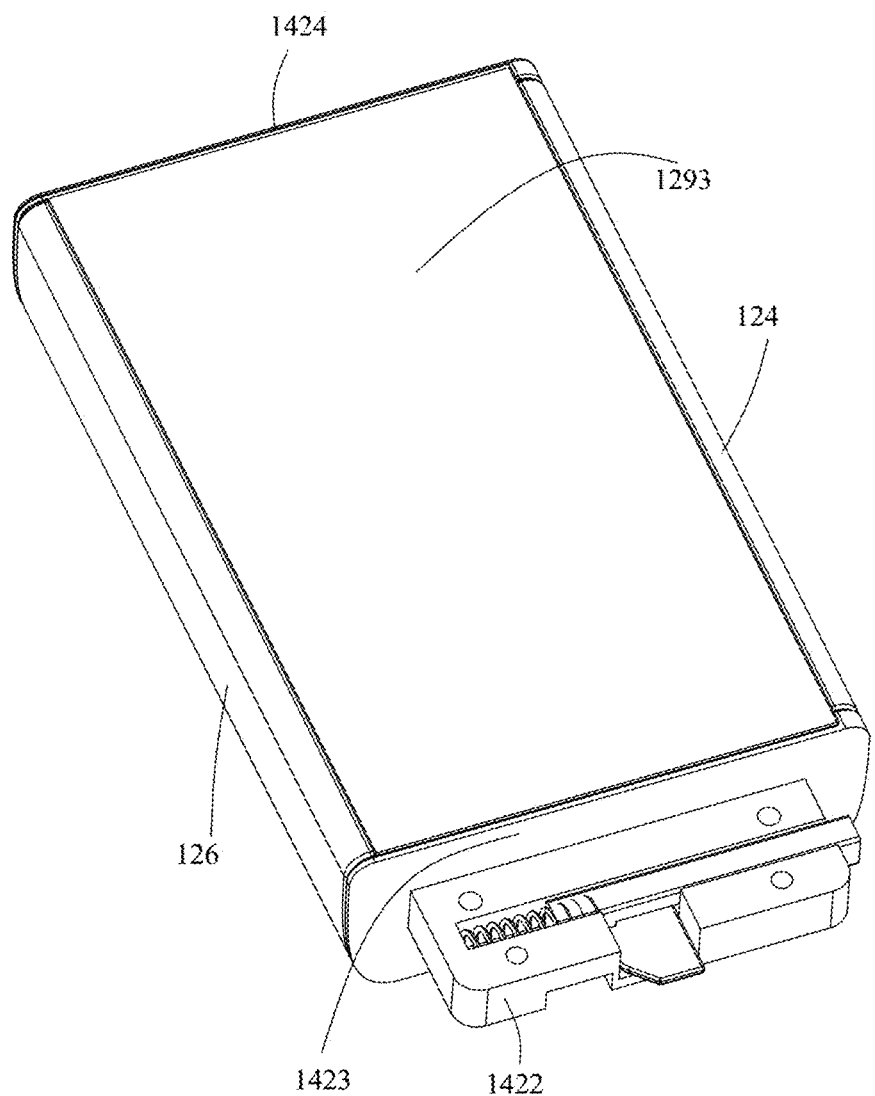
FIG. 23 is an assembled schematic view of the frame assembly illustrated in FIG. 22, the frame assembly being in a folded state.
Figure 24:
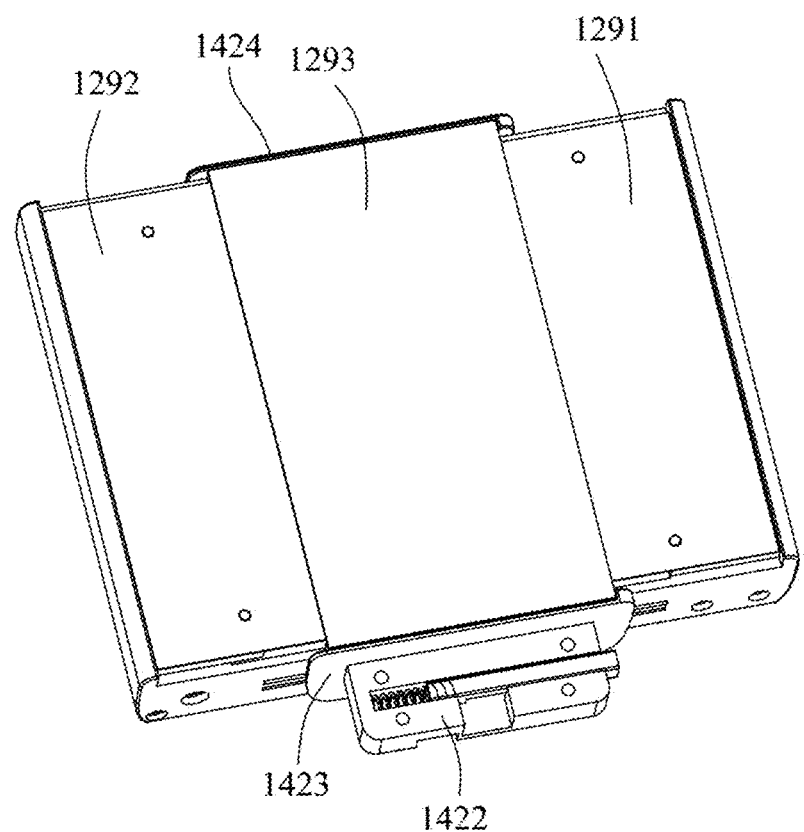
FIG. 24 is a schematic view illustrating the frame assembly illustrated in FIG. 23 in an unfolded state.

Referring to FIG. 22 to FIG. 24, a bottom face of the first bottom wall 1241 and a bottom face of the second bottom wall 1261 are both provided with protruding points 128. The frame assembly 12 further includes a left bottom plate 1291, a right bottom plate 1292, and a support plate 1293. The left bottom plate 1291 and the right bottom plate 1292 both define fixing holes, and through the cooperation of the fixing holes and the protruding points 128, the left bottom plate 1291 is installed to the bottom face of the first bottom wall 1241, and the right bottom plate 1292 is installed to the bottom face of the second bottom wall 1261. The support plate 1293 is fixedly connected to the front baffle 1423 and the rear baffle 1424 of the bracket 142, and covers the support beam 1426. The support plate 1293 does not move with the movement of the left frame 124 and the right frame 126. When the frame assembly 12 is in the folded state, the support plate 1293 covers the left bottom plate 1291 and the right bottom plate 1292, and merely the support plate 1293 is visible, as illustrated in FIG. 23. When the frame assembly 12 is unfolded, the left bottom plate 1291 and the right bottom plate 1292 extend beyond the support plate 1293 so as to support the left frame 124 and the right frame 126, as illustrated in FIG. 24. The left bottom plate 1291, the right bottom plate 1292, and the support plate 1293 are connected with each other to form a continuous bottom face of the frame assembly.

Figure 25:
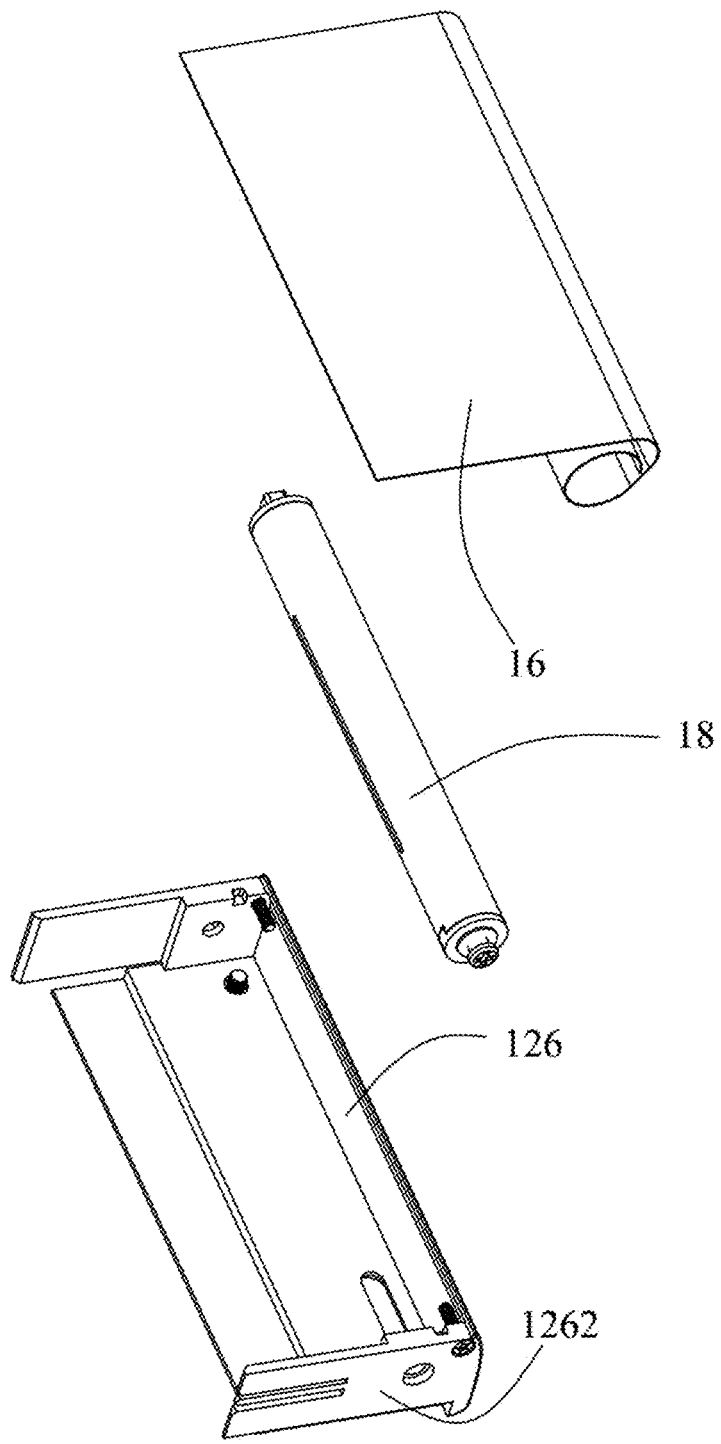
FIG. 25 is an exploded perspective schematic view illustrating a reel assembly, a screen assembly, and the right frame of the frame assembly according to an embodiment of the present disclosure.

Referring to FIG. 25, the reel assembly 18 is used to wind the screen assembly 16, and the reel assembly 18 is arranged inside the frame assembly, specifically installed to an inner side of the right frame 126. The second side wall 1262 of the right frame 126 defines screw holes, and two ends of the reel assembly 18 are fixed to the second side walls at the screw holes by screws. The screen assembly 16 is a flexible screen, and when the frame assembly 12 is folded, a part of the screen assembly 16 is wound on the reel assembly 18, and when the frame assembly 12 is unfolded, the screen assembly 16 is released and unfolded from the reel assembly 18.

The reel assembly 18 includes a reel 181, a connector 182, a limit part 183, and a spring 184. The connector 182 is fixedly connected to the frame assembly 12. The limit part 183 is rotatably connected to the frame assembly 12. One end of the reel 181 is rotatably connected to the connector 182, and the other end of the reel 181 is fixedly connected to the limit part 183. Two opposite ends of the spring 184 are fixedly connected to the connector 182 and the limit part 183, respectively. When the reel 181 rotates, the limit part 183 rotates with the reel 181, while the connector 182 does not rotate with the reel 181. When the reel 181 rotates, one end of the spring 184 rotates with the limit part 183, while the other end remains still with respect to the connector 182, thereby generating a resilience force. The limit part 183 is fixedly connected to the other opposite end of the reel 181 by a snap (i.e., a step 1832 in a subsequent embodiment).

Figure 26:
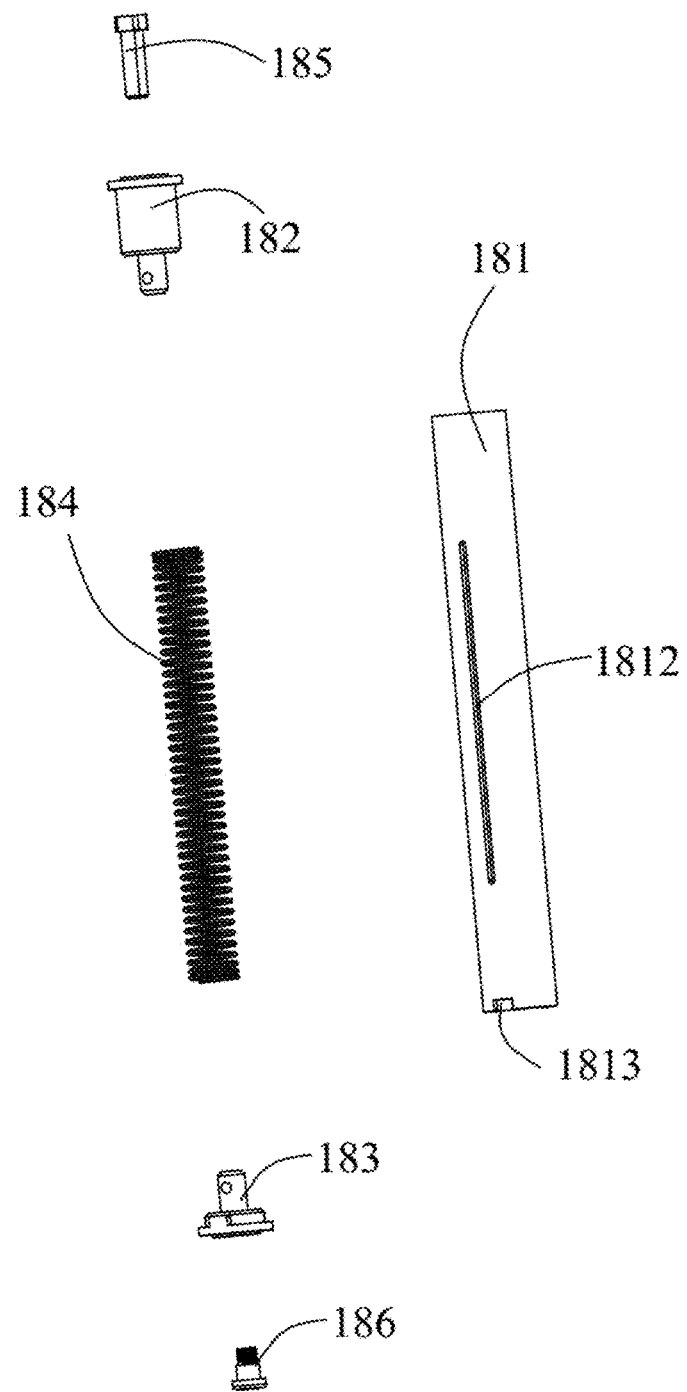
FIG. 26 is an exploded perspective schematic view of the reel assembly according to an embodiment of the present disclosure.

In an embodiment, referring to FIG. 25 and FIG. 26, the reel assembly 18 includes a reel 181, a connector 182, a limit part 183, a spring 184, and a fixing part 185. The reel 181 includes two opposite end faces and a lateral face connected between the two end faces, and the lateral face is a cylindrical face. The reel 181 has a hollow tubular shape open at two ends. The lateral face of the reel 181 defines a seam 1812, and the seam 1812 is used to fix the screen assembly 16. The connector 182 is installed to an opening of an end of the reel 181, and the connector 182 and the reel 181 are in free rotational connection in a circumferential direction (i.e., in a circumferential direction of the reel, there is no limit structure), and both rotation centers of the connector 182 and the reel 181 are in an axis of the reel 181. The fixing part 185 is used to connect the connector 182 to the second side wall 1262 of the right frame 126, and the engagement of the fixing part 185 with the right frame 126 and the connector 182 limit the circumferential movement between the connector 182 and the right frame 126 i.e., the connector 182 cannot rotate relative to the right frame. The limit part 183 is connected to an opening of the other end of the reel 181. The limit part 183 is fixedly connected to the reel 181, and the limit part 183 and the reel 181 are in limit connect in the circumferential direction, that is, the limit part 183 and the reel 181 cannot rotate relative to each other. The limit part 183 is rotatably connected to the screw holes of the right frame 126 by a screw. The spring 184 is received in the reel 181. One end of the spring 184 is connected to the connector 182, and the other end of the spring 184 is connected to the limit part 183. The spring 184 is in an axial compressed state in the reel 181, and the elastic force of the spring 184 generates a pushing force to the connector 182, such that the connector 182 abuts against the right frame 126.

Figure 27:
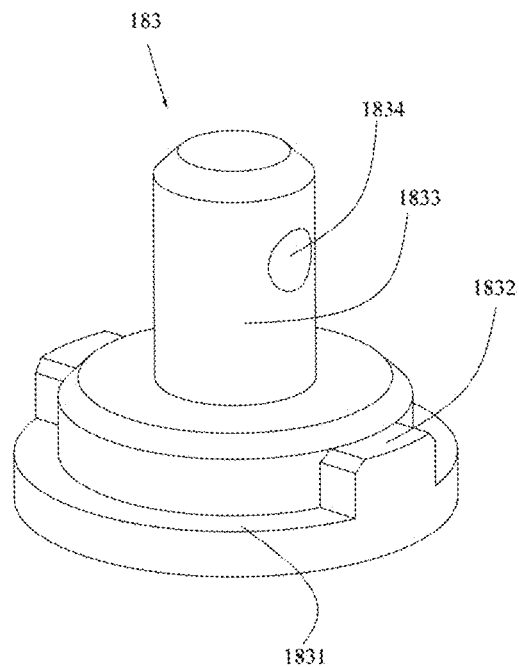
FIG. 27 is a perspective schematic view of a limit part of the reel assembly according to an embodiment of the present disclosure.
Figure 31:
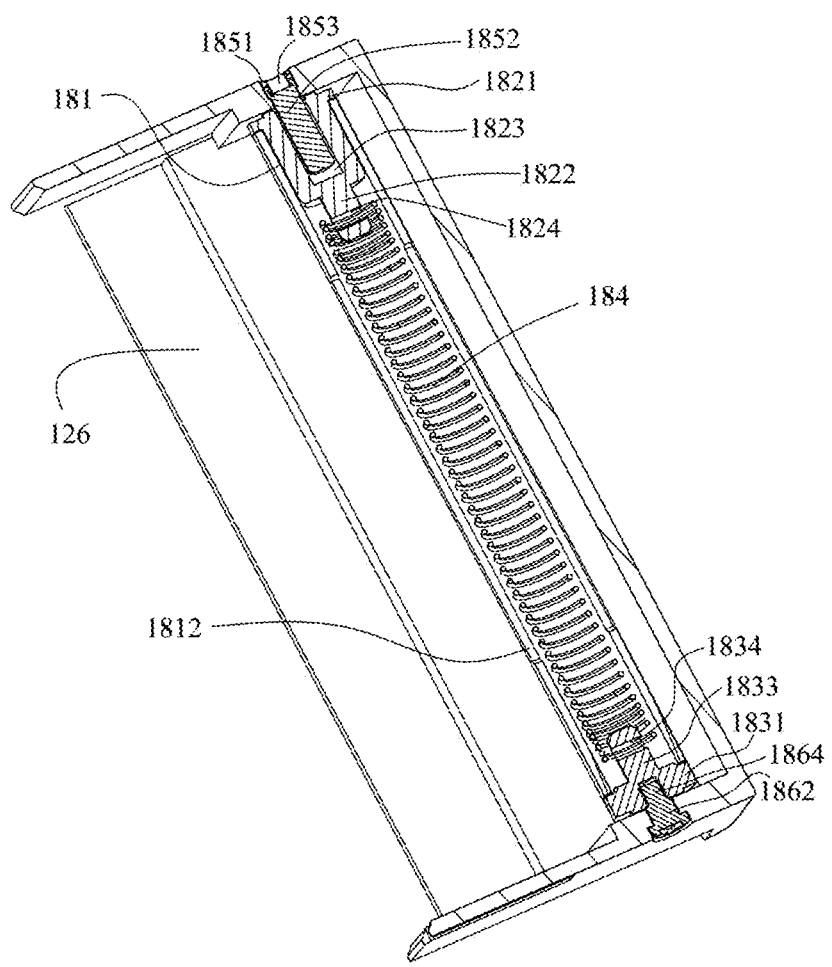
FIG. 31 is a sectional view illustrating the reel assembly being assembled to the right frame according to an embodiment of the present disclosure.

Referring to FIG. 27, the limit part 183 includes a seat 1831, a step 1832 (it is the snap mentioned above) formed on the seat 1831, and a protruding column 1833. An end of the reel 181 connected to the limit part 183 defines a notch 1813. The step 1832 is engaged in the notch 1813 of the reel 181 so as to realize the fixed connection between the limit part 183 and the reel 181 in the circumferential direction. The protruding column 1833 defines a penetrating hole 1834, and the penetrating hole 1834 is used to fix the spring 184. Furthermore, the seat 1831 covers the end face of the reel 181, a truncated cone protrudes from a surface of the seat 1831, and the protruding column 1833 is formed on a surface of the truncated cone away from the seat 1831. In a preferred embodiment, the protruding column 1833 is located in a central area of the truncated cone. The step 1832 is located on a lateral face of the truncated cone and is formed on a surface of the seat 1831. In a preferred embodiment, two steps 1832 are provided, and the steps are symmetrically distributed on a periphery of the truncated cone, correspondingly, two notches 1813 are provided. In an embodiment, the seat 1831 is in a disk shape, and the reel 181 is in a cylindrical shape. The truncated cone extends into the reel 181, and contacts an inner surface of the reel 181. When the limit part 183 and the reel 181 rotate together, the protruding column 1833 drives one end of the spring 184 to rotate, while the other end of the spring 184 does not rotate as it is connected and fixed to the connector 182, therefore, the spring 184 is twisted to generate elastic deformation. The elastic deformation of the spring generated by twisting can drive the reel 181 to rotate back automatically. The seat 1831 of the limit part 183 defines a threaded hole, and through the cooperation of the screw 186 and the threaded hole, the limit part 183 is rotatably connected to the right frame 126, as illustrated in FIG. 31.

Figure 28:
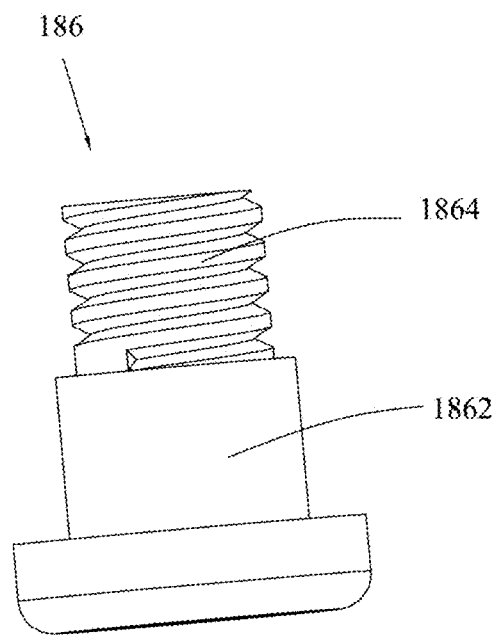
FIG. 28 is a perspective schematic view of a screw of the reel assembly used to be engaged with the limit part, according to an embodiment of the present disclosure.

Referring to FIG. 28, the screw 186 includes a smooth section 1862 and a threaded section 1864 formed at one side of a screw head thereof. The smooth section 1862 passes through the screw hole of the right frame 126, and the threaded section 1864 is locked in the threaded hole of the seat 1831, as illustrated in FIG. 31, such that the screw 186 is fixed to the seat 1831. The smooth section 1862 of the screw 186 acts as a spindle connecting the right frame 126 to the reel assembly 18. A surface of the smooth section 1862 is smooth. The smooth section 1862 and the screw hole of the right frame 126 are in clearance fit, and the smooth section 1862 and the right frame 126 can rotate freely relative to each other.

Figure 29:
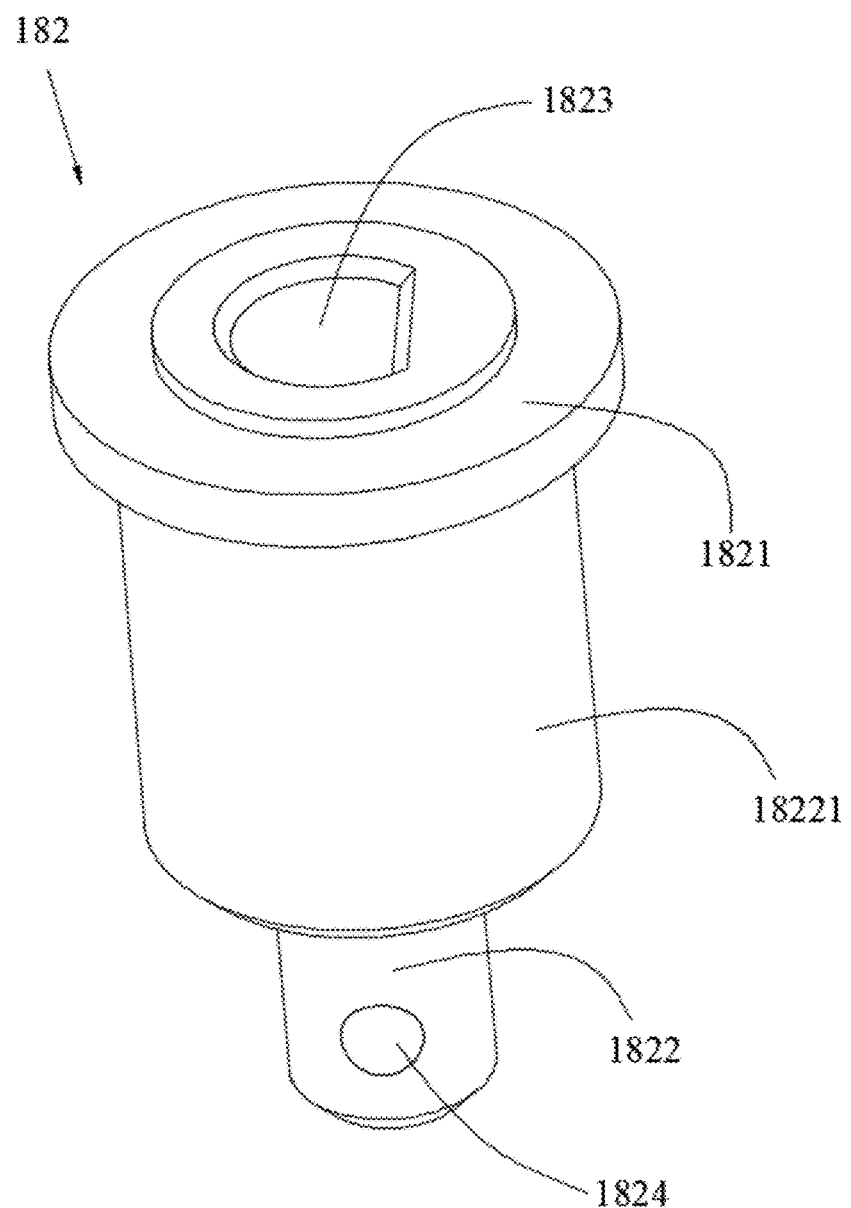
FIG. 29 is a perspective schematic view of a connector of the reel assembly according to an embodiment of the present disclosure.

Referring to FIG. 29, the connector 182 includes a base plate 1821 and a lug 1822. The base plate 1821 defines a groove 1823, and the groove 1823 has a non-rotational symmetrical structure, for example, the groove 1823 can be in a semicircular shape, a polygonal shape, etc. The base plate 1821 covers the end face of the reel 181, and the lug 1822 extends into the reel 181. The lug 1822 defines a penetrating hole 1824, and the penetrating hole 1824 is used to fix one end of the spring 184. The lug 1822 further includes an engagement face 18221, as illustrated in FIG. 31, and the engagement face 18221 contacts an inner surface of the reel 181. The engagement face 18221 is a cylindrical face. Through the contact of the engagement face 18221 with the inner surface of the reel 181, the limit between the connector 182 and the reel 181 in a radial direction is realized, such that the connector 182 and the reel 181 are in a stable rotational connection, and do not wobble in the radial direction. The radial direction refers to a direction perpendicular to an axial direction of the reel 181.

Figure 30:
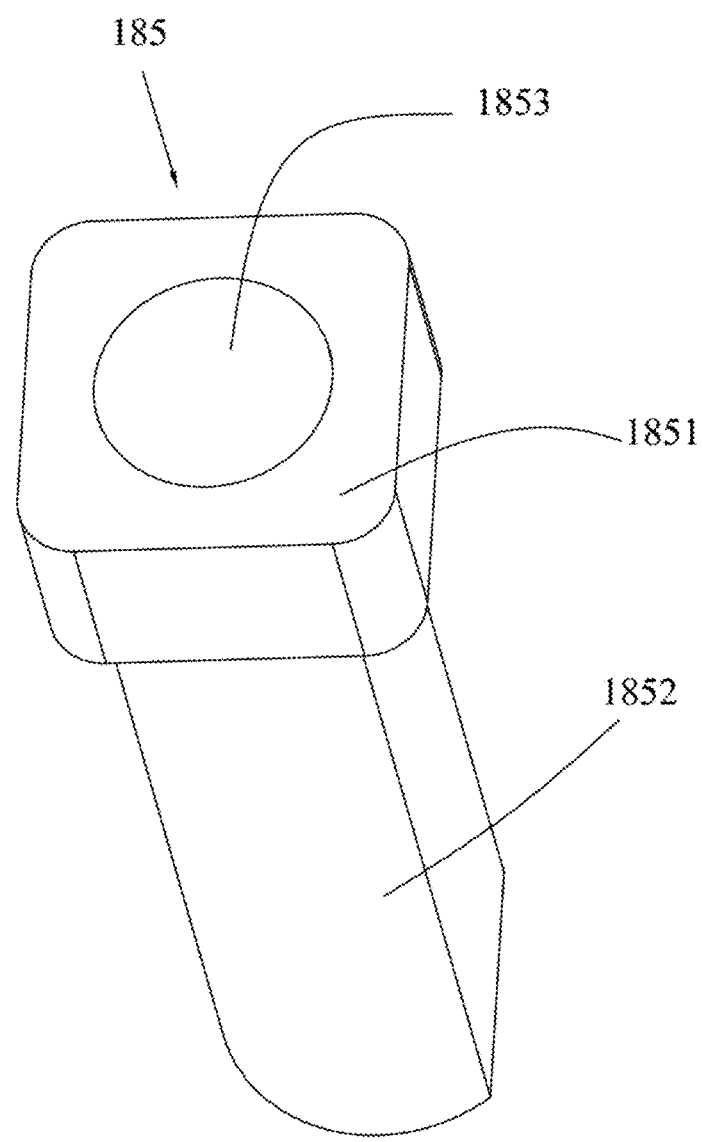
FIG. 30 is a perspective schematic view of a fixing part of the reel assembly according to an embodiment of the present disclosure.

The connector 182 is located at an inner side of the right frame 126. Referring to FIG. 30, the fixing part 185 includes a fixing head 1851 and an insertion rod 1852, and the shape of the insertion rod 1852 is consistent to the shape of the groove 1823 in the base plate 1821 of the connector 182. Both the insertion rod 1852 and the groove 1823 have a non-rotational symmetrical structure, and the insertion rod 1852 cooperates with the groove 1823 to realize the fixed connection of the connector 182 to the fixing part 185. In an embodiment, the insertion rod 1852 is a cylinder with a part being cut off, i.e., formed by an arc surface and a plane. In other embodiments, a section of the insertion rod 1852 also can have a triangular shape or a square shape or other irregular shapes, as long as it ensure that the insertion rod 1852 cannot rotate relative to the groove 1823 when the insertion rod 1852 is inserted in the groove 1823. The fixing head 1851 also has a non-rotational symmetrical structure, for example, the fixing head has a square shape.

Referring to FIG. 31, the side wall of the right frame 126 defines a slot matched with the fixing head 1851 of the fixing part 185, for example, a square slot, the fixing head 1851 is received in the square slot, and the fixing head and the square slot are in non-rotational connection. An end face of the fixing head 1851 defines a hole 1853. The connector 182 is not fixed to the reel 181, and the reel 181, when rotates, does not drive the connector 182 to rotate.

When a torsion of the spring 184 in the reel 181 in the circumferential direction needs to be adjusted, a part of the fixing part 185 can be pulled out from the square slot of the right frame 126, then a tool is inserted in the hole 1853 of the fixing head 1851 of the fixing part 185 to rotate the fixing head 1851. Since a plane of the insertion rod 1852 of the fixing part 185 abuts against a plane of the groove 1823 of the connector 182, the connector 182 is driven to rotate together, and the connector 182 drives an end of the spring 184 to rotate through the lug 1822 thereof, so that the spring 184 is twisted, thus the torsion is varied. Therefore, since the square slot of the right frame 126 is a through slot defined in the second side wall 1262, the torsion of the spring 184 in the reel 181 can be adjusted outside the frame assembly 12, without the need of disassembling the display device 10. After the adjustment is completed, the fixing part 185 is again pushed into the square slot.

When the display device 10 is stretched to expand, under the pulling of the screen assembly 16, the reel 181 rotates to drive the spring 184 in the reel 181 to generate torsional deformation, thus creating a resilience force. When the user pushes the left frame 124 and the right frame 126 to enable the display device 10 to retract, under the effect of the torsional elastic force, the reel 181 rotates to drive the screen assembly 16 to be wound on the reel 181, therefore, the present disclosure can realize the effect of automatically winding the screen assembly 16. The elastic force of the torsional deformation of the spring 184 in the reel 181 is less than the elastic force of the elastic element 1254 of the elastic connecting rod assembly 1252 of the frame assembly 12, so as to prevent the display device 10, after being stretched, from being driven by the spring 184 in the reel 181 to automatically retract.

Referring to FIG. 32 to FIG. 36, the support assembly 14 includes a left support frame 144, a right support frame 146, and the bracket 142. The frame assembly 12 also belongs to a portion of the support assembly 14. The left frame 124 and the right frame 126 are slidably connected to the limit strips 1427 of the front baffle 1423 and the rear baffle 1424 of the bracket 142. The left support frame 144 is fixed to the left frame 124, and the right support frame 146 is fixed to the right frame 126.

Figure 32:
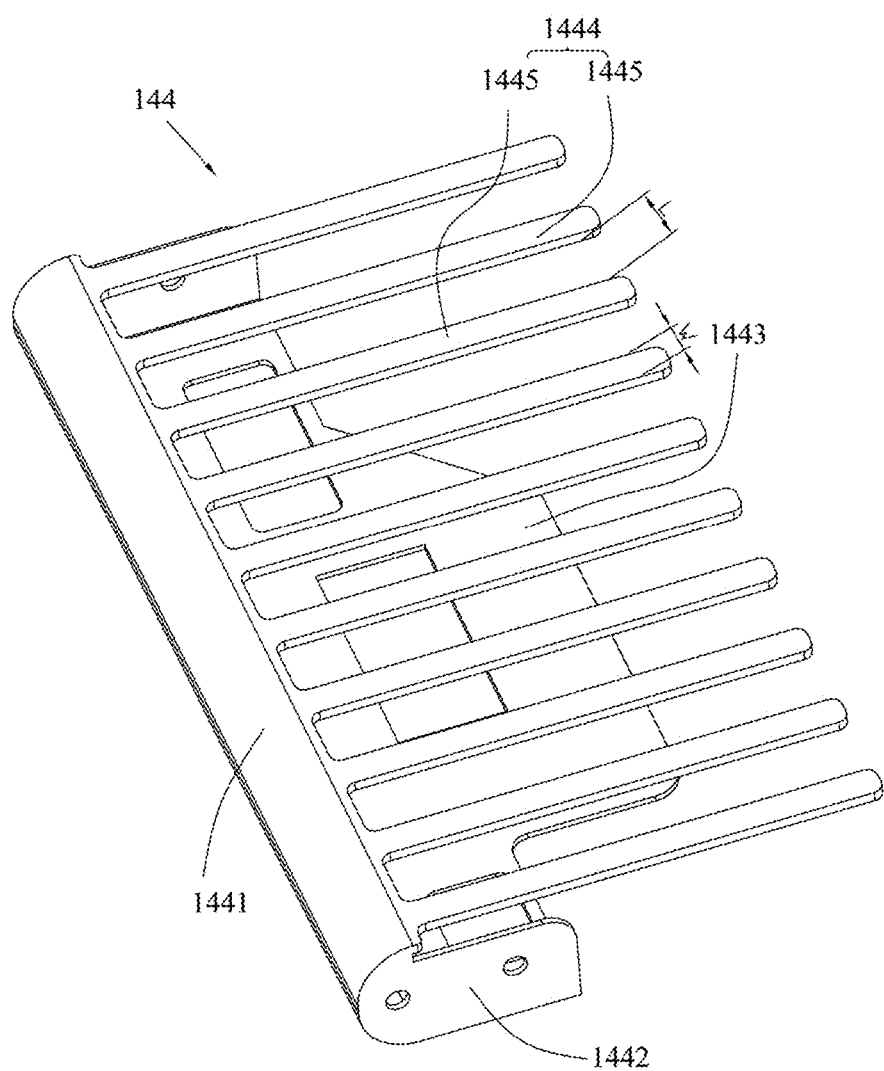
FIG. 32 is a schematic view of a left support frame of a support assembly according to an embodiment of the present disclosure.

Referring to FIG. 32, the left support frame 144 includes a first base 1441, a pair of first side plates 1442, a first bottom plate 1443, and a first tooth portion 1444.

The first base 1441 has an arc shape. Specifically, a section of the first base 1441 is semicircular, and a surface of the first base 1441 is a half cylindrical surface. The first tooth portion 1444 and the first bottom plate 1443 are connected to a top portion and a bottom portion of the first base 1441, respectively. From a surface of the first tooth portion 1444 to a surface of the first bottom plate 1443, smooth transition is formed by the arc surface of the first base 1441. Furthermore, a plane where the first tooth portion 1444 is located and a plane where the first bottom plate 1443 is located are parallel to each other. The pair of first side plates 1442 are located at a front end and a rear end of the first base 1441, respectively, and the first side plate 1442 is connected between the first base 1441 and the first bottom plate 1443.

The first side plates 1442 are used to be fixedly connected to the first side walls 1242 of the left frame 124. Specifically, the first side plate 1442 defines screw holes. The first side plate 1442 is fixed to an inner surface of the first side wall 1242 of the left frame 124 by screws passing through the screw holes thereof. The first side walls 1242 and the first bottom plate 1443 are received in the receiving space 121 of the frame assembly 12. The left support frame 144 can move along with the left frame 124. One end of the screen assembly 16 passes through a gap between the first base 1441 of the left support frame 144 and the first connecting wall 1243 of the left frame 124 to be fixed, and is electrically coupled to electronic components inside.

The first tooth portion 1444 includes a number of teeth 1445. Each tooth 1445 includes a root portion and a tip portion. A distance from the root portion extending to the tip portion is a length of the tooth 1445, and a dimension perpendicular to the length direction of the tooth 1445 is a width of the tooth 1445. In an embodiment, in the first tooth portion 1444, a perpendicular distance L between two adjacent teeth 1445 (i.e., an interval of two adjacent teeth) is twice the width W of each tooth 1445.

Figure 33:
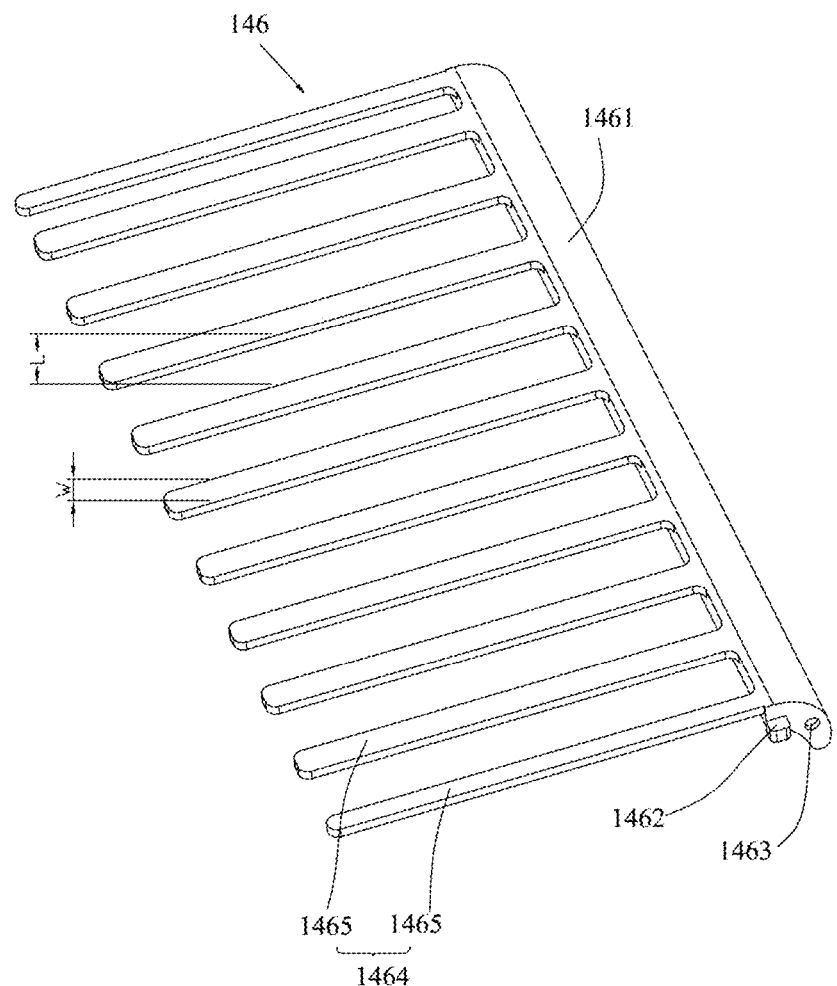
FIG. 33 is a schematic view of a right support frame of the support assembly according to an embodiment of the present disclosure.

Referring to FIG. 33, the right support frame 146 includes a second base 1461, a second tooth portion 1464, and a pair of bulges 1462.

Figure 35:
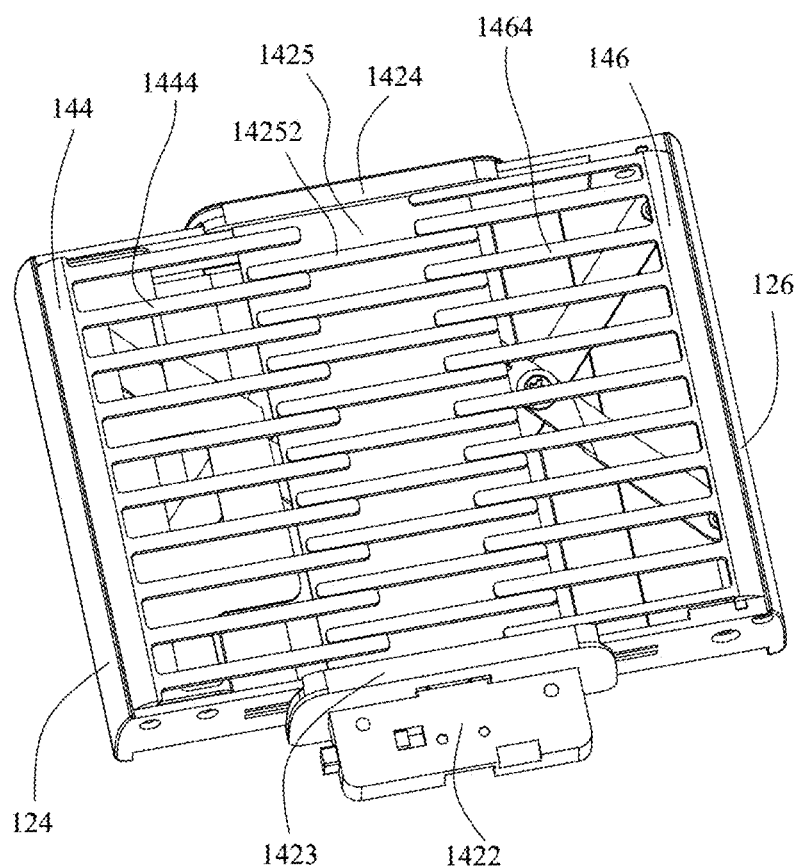
FIG. 35 is a schematic view illustrating the support assembly illustrated in FIG. 34 being in an extension state.

The second base 1461 has an arc shape. Specifically, a section of the second base 1461 is semicircular, and a surface of the second base 1461 has a shape of a quarter of cylindrical surface. The second base 1461 has a front end face, a rear end face, and a lateral face connected between the front end face and the rear end face. The second tooth portion 1464 is connected to the lateral face. The front end face and the rear end face both define screw holes 1463, and the second base 1461 is fixed to an inner surface of the second side wall 1262 of the right frame 126 by a screw passing through the screw hole 1463 thereof. The pair of bulges 1462 protrude from the front end face and the rear end face, respectively, and the bulges 1462 are clamped in the notches 1267 of the second side wall 1262 of the right frame 126, as illustrated in FIG. 35, thus facilitating positioning the right support frame 146 to the right frame 126. The right support frame 146 can move along with the right frame 126. The other end of the screen assembly 16 can pass through a gap between the second base 1461 of the right support frame 146 and the second connecting wall 1263 of the right frame 126, and then is wound on the reel assembly 18.

The second tooth portion 1464 has the same structure as the first tooth portion 1444, and the dimension of the tooth 1465 of the second tooth portion 1464 is the same as that of the tooth 1445 of the first tooth portion 1444. In an embodiment, in the second tooth portion 1464, a perpendicular distance L between two adjacent teeth 1465 (i.e., an interval between two adjacent teeth) is twice the width W of a single tooth 1465.

Figure 34:
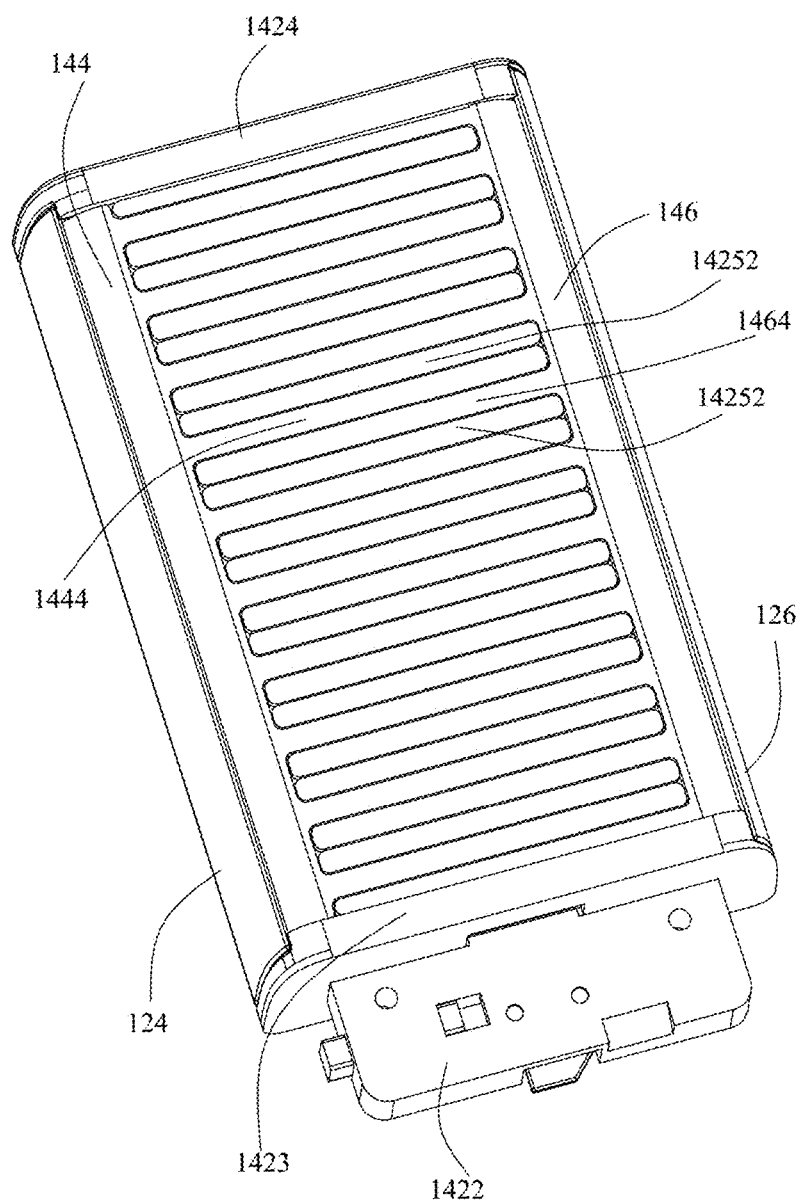
FIG. 34 is a schematic view of the support assembly according to an embodiment of the present disclosure, the support assembly being in a retraction state.

As illustrated in FIG. 34 and FIG. 35, the first tooth portion 1444 of the left support frame 144 and the second tooth portion 1464 of the right support frame 146 are coplanar. The left support frame 144 and the right support frame 146 are located at two sides of the bracket body 1421 of the bracket 142, respectively. The protruding ribs 14252 on the surface of the plate 1425 of the bracket body 1421 are spaced apart from each other. A plane where the protruding ribs 14252 are located is coplanar with the first tooth portion 1444 of the left support frame 144 and the second tooth portion 1464 of the right support frame 146. A gap between two adjacent protruding ribs 14252 define a receiving groove, and the teeth 1445 of the first tooth portion 1444 and the teeth 1465 of the second tooth portion 1464 can be received in the receiving grooves. Each receiving groove receives one tooth of the first tooth portion 1444 and one tooth of the second tooth portion 1464. In an embodiment, the interval between two adjacent protruding ribs 14252 is equal to a sum of the width of one tooth 1445 of the first tooth portion 1444 and the width of one tooth 1465 of the second tooth portion 1464. A width of one protruding rib 14252 is equal to the width of one tooth 1445 of the first tooth portion 1444 or the width of one tooth 1465 of the second tooth portion 1464.

In the left support frame 144 and the right support frame 146, the interval of two adjacent teeth is twice the width of the tooth, while the width of the protruding rib 14252 on the plate 1425 of the bracket body 1421 is the same as the width of the tooth 1445, 1465. Therefore, referring to FIG. 34, when the left support frame 144 and the right support frame 146 move along with the left frame 124 and the right frame 126 to fold, the teeth 1465 of the right support frame 146 and the teeth 1445 of the left support frame 144 are totally received in the gaps between the protruding ribs 14252 of the bracket body 1421, thus the teeth 1445, 1465 of the left support frame 144 and of the right support frame 146 and the protruding ribs 14252 of the bracket body 1421 together form a relatively smooth plane, such that the hand feeling of touching the screen assembly 16 on the smooth plane is ensured.

Referring to FIG. 35, when the left support frame 144 and the right support frame 146 move along with the left frame 124 and the right frame 126 to expand, only a part of each of the teeth 1465 of the right support frame 146 and the teeth 1445 of the left support frame 144 are received in the gaps (i.e., the receiving grooves) between the protruding ribs 14252 of the bracket body 1421, thus the teeth 1445, 1465 of the left support frame 144 and of the right support frame 146 and the protruding ribs 14252 of the bracket body 1421 together form a discontinuous plane, i.e., adjacent support faces (referring to faces of the teeth 1445, 1465 and of the protruding ribs 14252 for supporting the screen assembly 16) are separated by the receiving grooves. However, in the transverse direction (i.e., a direction front left to right), each protruding rib 14252 and the adjacent tooth 1445 of the left support frame 144 and the adjacent tooth 1465 of the right support frame 146 are continuously distributed; in the longitudinal direction, an interval between every two adjacent teeth 1445, 1465 and between every two adjacent protruding ribs 14252 still can provide good support to the screen assembly. In fact, since the width of the finger of the human beings is far bigger than the interval between the protruding ribs 14252 and the interval between the teeth 1445, 1465, the hand feeling of touching the screen assembly 16 is not be significantly affected.

Figure 36:
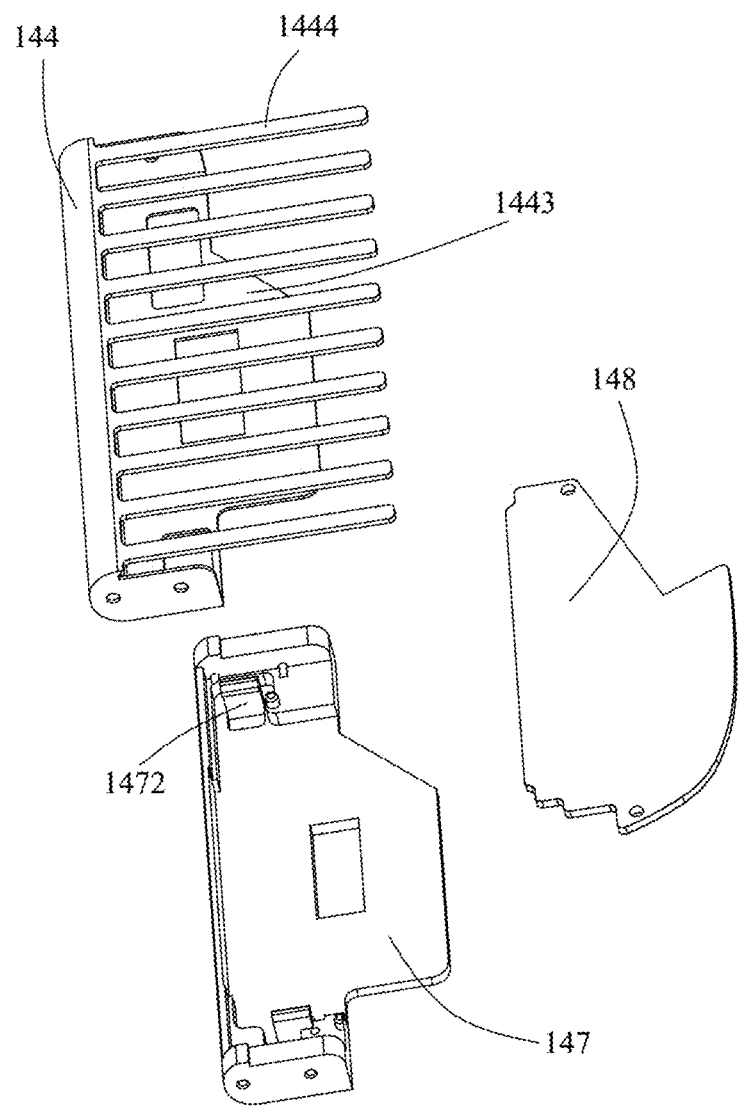
FIG. 36 is an exploded schematic view illustrating the left support frame of the support assembly, a tray, and a circuit board according to an embodiment of the present disclosure.

Referring to FIG. 36, a tray 147 is further fixed in the left support frame 144. The tray 147 is located between the first tooth portion 1444 and the first bottom plate 1443 for supporting and positioning a circuit board 148, and a bottom of the tray 147 lies on the first bottom plate 1443 of the left support frame 144. A front face and a back face of the circuit board 148 are provided with electronic components such as controller and memory for controlling the screen assembly 16. In other embodiments, the circuit board 148 also can be directly fixed on the first bottom plate 1443. Specifically, the tray 147, together with the first side plate 1442 of the left support frame 144, is locked by screws on an inner surface of the first side wall 1242 of the left frame 124. The tray 147 are provided with hooks 1472, and the hooks 1472 are used to suspend and position the circuit board 148 on the tray 147, such that the front face and the back face of the circuit board 148 both have a space for receiving the electronic components.

Figure 37:
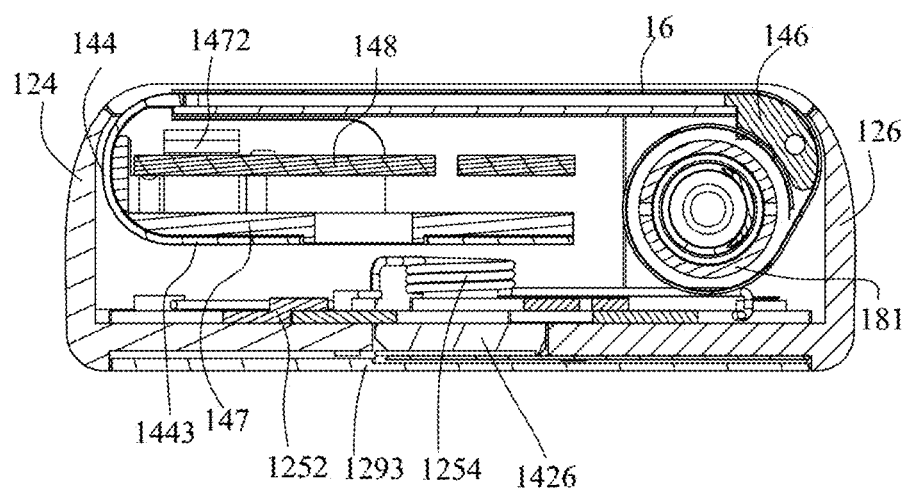
FIG. 37 is a sectional view of a display device according to an embodiment of the present disclosure.

Referring to FIG. 37, the first bottom plate 1443 of the left support frame 144 and the first bottom wall 1241 of the left frame 124 are spaced apart from each other to define a space for receiving the deformation assembly 125 (the rod assembly 1252 in the embodiment). The right support frame 146 is located above the reel assembly 18. The reel assembly 18 is interposed between the right support frame 146 and the rod assembly 1252. The second base 1461 of the right support frame 146 and the right frame 126 define a gap therebetween for the screen assembly 16 to extend into the right frame 126 therethrough and to be wound on the reel 181.

The present disclosure further provides a structure of another support assembly 14. As illustrated in FIG. 38 to FIG. 42, in this embodiment, the support assembly 14 differs from the support assembly 14 of the preceding embodiment in that tooth structures of the left support frame 144 and of the right support frame 146 are different and that a structure of the bracket body 1421 of the bracket 142 engaging with the tooth structures of the left support frame 144 and the right support frame 146 is different. In the support assembly 14 of the preceding embodiment, the receiving grooves are defined between the protruding ribs 14252 of the bracket 142, each receiving groove receives the teeth of the left support frame 144 and the right support frame 146, i.e., one receiving groove receives two teeth. In the support assembly 14 of the present embodiment, the surface of the plate 1425 of the bracket body 1421 of the bracket 142 is not provided with the protruding ribs 14252, while the surface of the plate 1425 is coplanar with the surfaces of the tooth portions of the left support frame 144 and the right support frame 146, meanwhile, the surface of the plate 1425 defines a number of receiving grooves 14253. The receiving grooves 14253 are distributed more densely than the receiving grooves 14253 on the bracket body 1421 in the preceding embodiment. Two adjacent receiving grooves 14253 define therebetween a support strip for supporting the screen assembly 16, and each receiving groove 14253 merely receives one tooth 1445 of the left support frame 144 or one tooth 1465 of the right support frame 146, that is, one receiving groove 14253 receives one tooth. The teeth 1445 of the left support frame 144 and the teeth 1465 of the right support frame 146 are alternately spaced and distributed and engaged with the receiving grooves 14253, that is to say, the receiving grooves 14253 are arranged in a row. The number of the receiving grooves 14253 is equal to a sum of the number of the teeth 1445 of the first tooth portion 1444 and the number of the teeth 1465 of the second tooth portion 1464, and every two adjacent receiving grooves 14253 receive the tooth 1445 of the left support frame 144 and the tooth 1465 of the right support frame 146, respectively.

Figure 40:
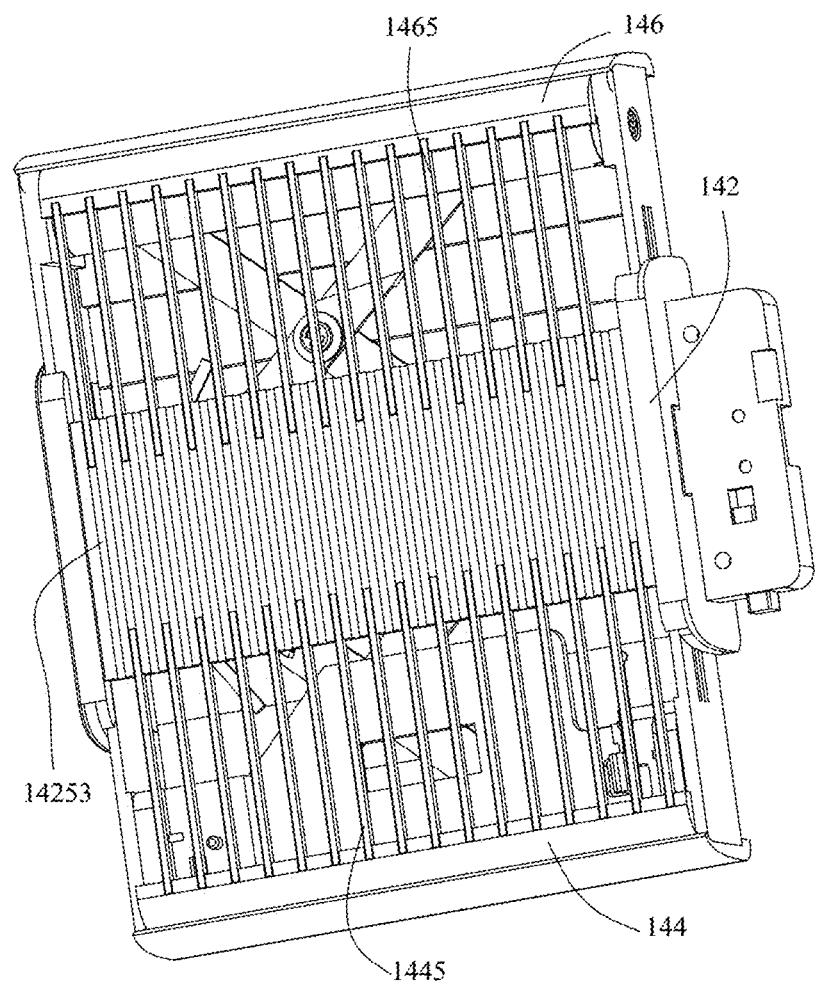
FIG. 40 is a schematic view illustrating the support assembly illustrated in FIG. 38 in an extension state.

Referring to FIG. 40, when the left support frame 144 and the right support frame 146 move along with the left frame 124 and the right frame 126 to unfold, the adjacent support faces (referring to surfaces of the teeth 1445, 1465 for supporting the screen assembly 16, and surfaces of the support strip arranged between two adjacent receiving grooves 14253 for supporting the screen assembly 16) are continuous at a position close to edges of the bracket 142.

Figure 41:
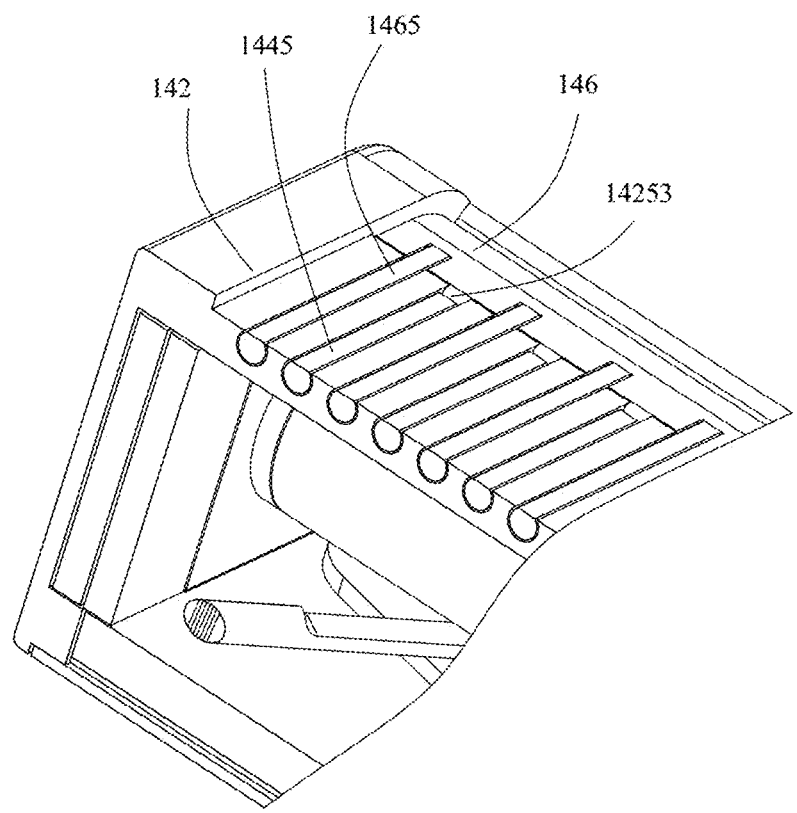
FIG. 41 is a partial enlarged sectional view of the support assembly illustrated in FIG. 38, mainly illustrating a section shape of teeth of the left support frame and the right support frame.
Figure 42:
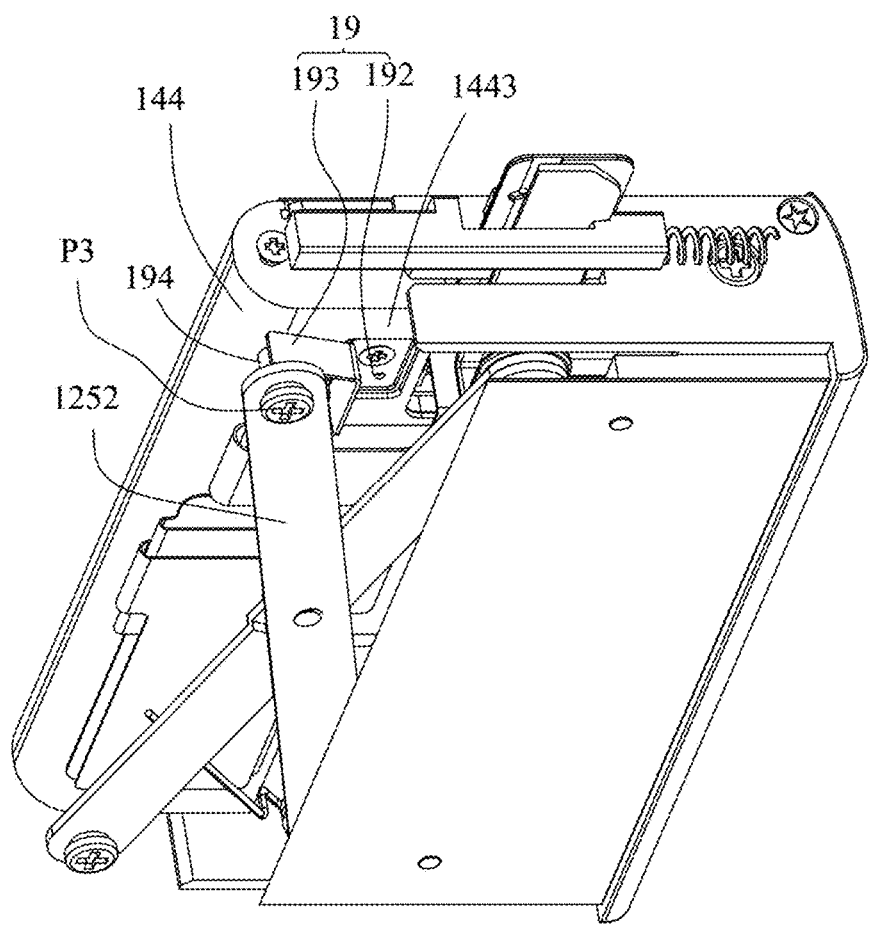
FIG. 42 is a structural schematic view illustrating a trigger device in a display device according to an embodiment of the present disclosure, the display device being in a retraction state.

Referring to FIG. 41, sections of the teeth 1445, 1465 of the support assembly 14 in the embodiment substantially have a circular shape with a top face being cut off to form flat support faces for better contacting the screen assembly 16. The sections of the receiving grooves 14253 of the bracket 142 also have a circular shape with a top portion being cut off, so as to receive the teeth 1445, 1465.

Since the teeth 1445, 1465 of the left support frame 144 and the right support frame 146 each have a structure with a narrow top and a wide bottom, the section of the receiving groove 14253 also has a narrow top and a wide bottom, that is, an opening of the receiving groove 14253 in a direction perpendicular to a surface of the plate 1425 of the bracket 142 (i.e., a direction perpendicular to the screen assembly 16) is smaller than the dimension of an inner space of the receiving groove, in this way, the teeth 1445, 1465 in the receiving grooves 14253 are limited by the receiving grooves 14253 in the vertical direction as being blocked by the inner walls of the receiving grooves 14253, and no position of the teeth 1445, 1465 can escape the receiving grooves 14253. Therefore, distal ends of the teeth 1445, 1465 will not be warped, further ensuring flatness of the screen assembly 16.

Furthermore, the teeth 1445 of the left support frame 144 and the first base 1441 can be integrally formed, and also can have a two-part structure, i.e., separately manufactured and then assembled in one piece. The teeth 1465 of the right support frame 146 and the second base 1461 also can be integrally formed or have a two-part structure.

The present disclosure further discloses a trigger device for selectively triggering an operation area of the screen assembly 16 according to a display size of the screen assembly 16, realizing automatic switch of the operation area of the screen assembly 16. Since the display device 10 can be retracted and extended, when the display device 10 is retracted, the trigger device merely triggers an exposed area of the screen assembly 16 to operate, while the wound part does not need to operate; when the display device 10 is extended, the exposed area of the screen assembly 16 is increased, and the trigger device trigger all the exposed area of the screen assembly 16 to operate.

The trigger device includes a controller 1482, a screen assembly 16, an extendible support assembly 14 for supporting the screen assembly 16, and a drive assembly for driving the support assembly 14. The drive assembly is provided with a first contact, and the support assembly 14 is provided with a second contact movable relative to the first contact. During retraction or extension of the support assembly 14, the first contact and the second contact move relative each other between a contacting state and a separating state, and the controller 1482, according to the contacting state or the separating state of the first contact and the second contact, determines whether the support assembly 14 is in the retraction state or in the extension state, so as to control the display of the screen assembly 16.

Referring to FIG. 42, FIG. 43, FIG. 44, FIG. 45, and FIG. 46, the above drive assembly may be regarded as the rod assembly 1252 in the embodiment, and the first contact is arranged on the rod assembly 1252. The second contact is arranged on a tab 19. The tab 19 is fixedly connected to the support assembly 14, and can be regarded as a part of the support assembly 14. In an embodiment, the support assembly 14 is deformed along a first direction, the first contact moves relative to the second contact along the second direction, and the first direction is different from the second direction. In a preferred embodiment, the first direction is perpendicular to the second direction. When the support assembly 14 is deformed along the first direction, the first contact and the second contact also move along the first direction.

The drive assembly includes the first connecting rod R1 and the second connecting rod R2 hinged with each other, and when the support assembly 14 is extended or retracted, the first connecting rod R1 and the connecting rod R2 move relative to each other. In an embodiment, the first contact is arranged on the second connecting rod R2, the second connecting rod R2 is made from an electrically conductive material, and the second connecting rod R2 is electrically coupled to the controller 1482. When the first contact contacts the second contact, the second connecting rod R2 and the controller 1482 form a current path; when the first contact is separated from the second contact, the current path formed by the second connecting rod R2 and the controller 1482 is disconnected.

Figure 46:
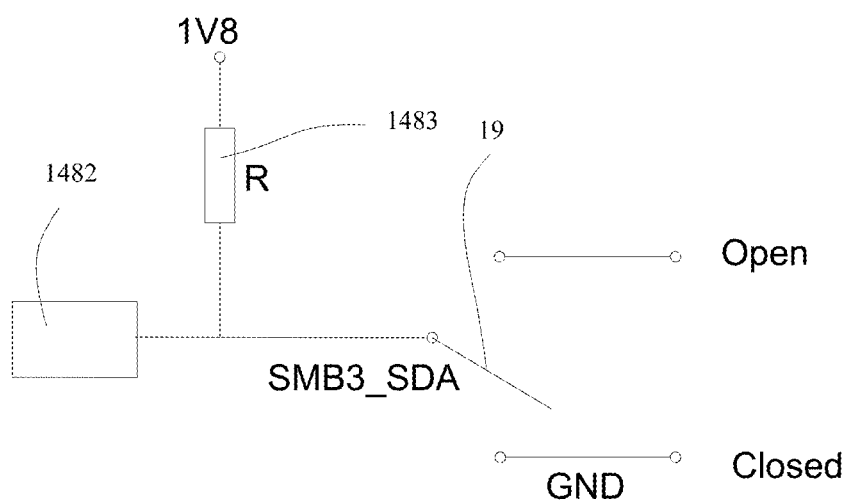
FIG. 46 is a schematic view of a circuit of the trigger device according to an embodiment of the present disclosure.

Referring to FIG. 46, specifically, the first contact is grounded, the second contact is electrically coupled to a terminal of the controller 1482, and the controller 1482 is further electrically coupled to a resistor (i.e., a pull-up resistor 1483 in the embodiment, as illustrated in FIG. 46), and when the first contact contacts the second contact, a low level is presented at the terminal of the controller 1482; when the first contact is separated from the second contact, the resistor (i.e., the pull-up resistor 1483) generates a high level signal and the high level signal is input to the terminal of the controller 1482.

In the embodiment, the trigger action is performed through the cooperation of one connecting rod (for example, the second connecting rod R2) of the rod assembly 1252 and the tab 19. The rod assembly 1252 can be deformed to drive the deformation of the frame assembly 12 for supporting the screen assembly 16. The tab 19 is fixedly connected to the left frame 124 of the frame assembly 12. The rod assembly 1252 includes a protruding column 194. In the process of the deformation of the rod assembly 1252, the protruding column 194 moves relative to the tab 19. In the embodiment, the first moving end P3 of the rod assembly 1252 is provided with the protruding column 194 extending towards the bottom of the left support frame 144. Specifically, the protruding column 194 is arranged at an end of the second connecting rod R2. That is to say, the first contact includes the protruding column 194 formed on the second connecting rod R2, and the second contact includes the tab 19.

Specifically, the support assembly 14 includes the tray 147, the controller 1482 is installed above the tray 147, and the second contact is fixed below the tray 147. The bottom (i.e., the first bottom plate 1443) of the left support frame 144 defines a through groove exposing the bottom of the tray 147. The tab 19 includes a fixing sheet 192 and a pressing sheet 193. The fixing sheet 192 is fixed in the through groove by a screw. The tray 147 and the circuit board 148 are located at a side of the first bottom plate 1443 away from the first bottom wall 1241 of the left frame 124. The fixing sheet 192 is electrically coupled to electronic components arranged on the circuit board 148 in the tray 147. The pressing sheet 193 protrudes from the fixing sheet 192 and extends from the fixing sheet 192 towards the rod assembly 1252. In an embodiment, the pressing sheet 193 has a bent structure, and is integrally formed with the fixing sheet 192, and the pressing sheet 193 may be perpendicular to the fixing sheet 192. The pressing sheet 193 is used to abut against the rod assembly 1252.

Figure 43:
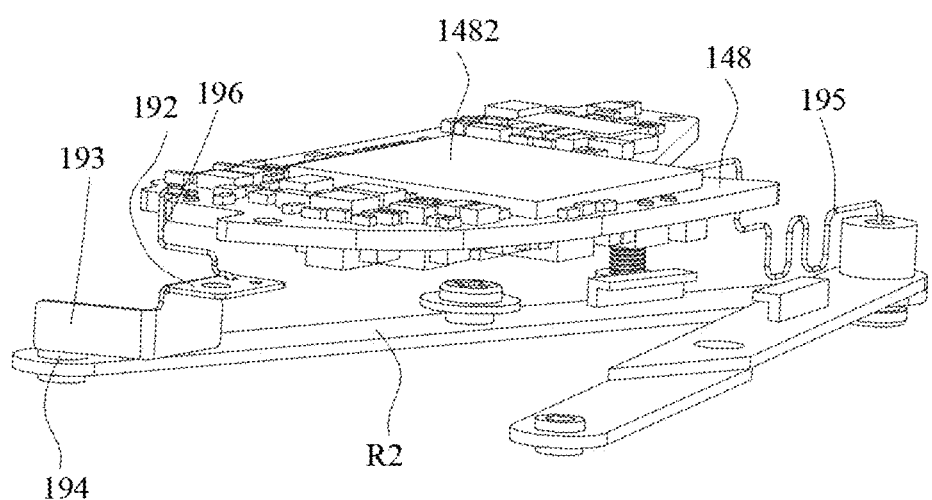
FIG. 43 is a schematic view of electrical connection of a tab of the trigger device, a rod assembly, and a circuit board, in the folded state illustrated in FIG. 42.
Figure 44:
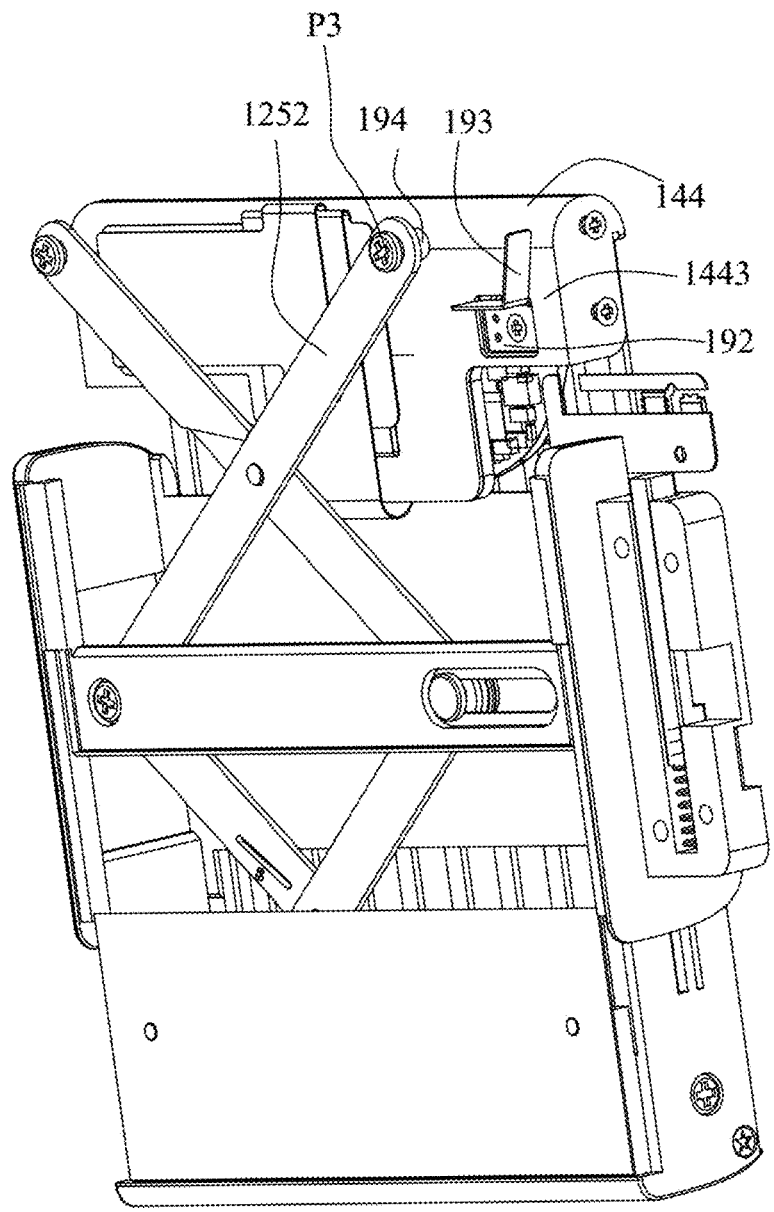
FIG. 44 is a structural schematic view illustrating the trigger device in the display device according to an embodiment of the present disclosure, the display device being in an extension state.
Figure 45:
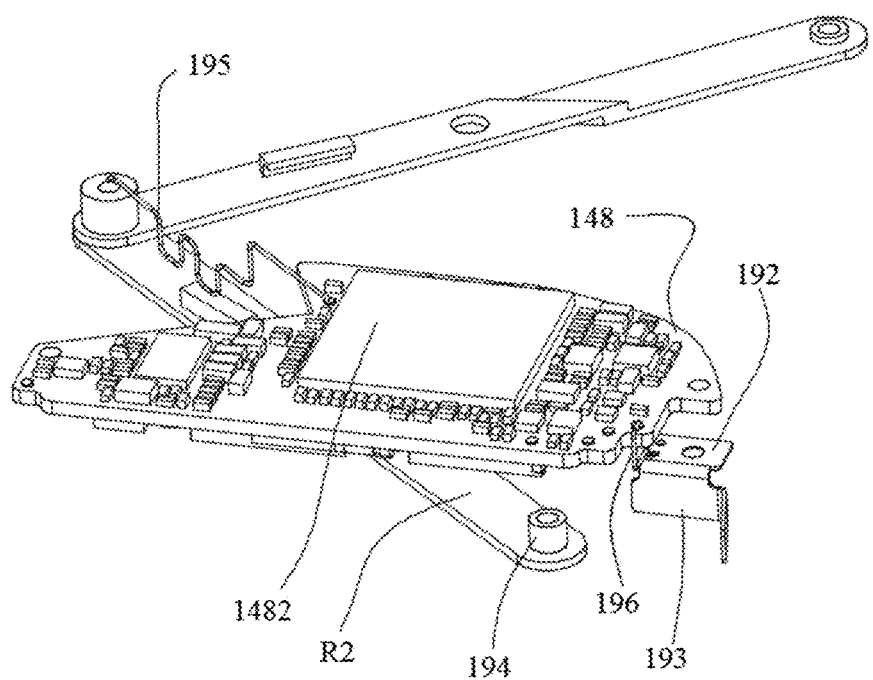
FIG. 45 is a schematic view of electrical connection of the tab of the trigger device, the rod assembly, and the circuit board, in the unfolded state illustrated in FIG. 42.

Referring to FIG. 43 and FIG. 45 in detail, the protruding column 194 is connected to a ground terminal of the circuit board 148 (referring to the circuit board 148 of the support assembly 14 arranged in the left support frame 144) through a conductor 195 connected to the rod assembly 1252. Therefore, the protruding column 194 is grounded. In an embodiment, the protruding column 194 and the rod assembly 1252 are both made from an electrically conductive material, for example, metal rods, and the rod assembly 1252 is electrically coupled to the ground terminal of the circuit board 148 through the conductor 195. In another embodiment, the rod assembly 1252 is made from an insulating material, the protruding column 194 is made from an electrically conductive material, and the protruding column 194 is electrically coupled to the ground terminal of the circuit board through the conductor.

As illustrated in FIG. 43 and FIG. 45, the tab 19 is electrically coupled to the controller 1482 on the circuit board 148 through the conductor 196.

The protruding column 194, the tab 19, and electronic components on the circuit board 148 form a sensing circuit, and the sensing circuit is used to sense a relative position relationship between the protruding column 194 and the tab 19, and generate a signal. The controller 1482 on the circuit board 148 is used to receive the signal transmitted by the sensing circuit, and control the display of the screen assembly 16.

When the display device 10 is retracted, the first moving end P3 is located at an end of the first limit groove 1245 close to the first side wall 1242 of the left frame 124, the protruding column 194 contacts or abuts against the pressing sheet 193, and through the electrical coupling between the tab 19 and the rod assembly 1252, the sensing circuit is enabled to form a closed current loop, thus generating a signal. The controller 1482 on the circuit board 148, upon receiving the signal, determines that the display device 10 is in the retracted state, furthermore, the controller 1482 merely controls the exposed area of the screen assembly 16 to operate.

When the display device 10 is extended, the first moving end P3 is moved to an end of the first limit slot 1245 away from the first side wall 1242, the protruding column 194 is separated from the pressing sheet 193, such that the current loop of the sensing circuit is disconnected. The controller 1482 cannot receive the signal, at this point, the controller 1482 determines that the display device 10 is in the expanded state, and further controls the whole exposed area of the screen assembly 16 to operate.

Referring to FIG. 46 in detail, a circuit architecture of the trigger device in an embodiment includes the controller 1482 and the pull-up resistor 1483. The controller 1482 is electrically coupled to the tab 19, and a switch structure is formed between the tab 19 and the protruding column 194. When the tab 19 abuts against the protruding column 194, the tab 19 is connected to a ground terminal of the protruding column 194, at this point, a voltage at the terminal of the controller 1482 is zero, presenting a low level. The controller 1482, upon receiving a signal of low level, determines that the screen assembly 16 is in the retracted state. When the tab 19 is separated from the protruding column 194, the tab 19 is disconnected from the ground terminal, at this point, a high level generated by the pull-up resistor 1483 is input into the terminal of the controller 1482. The controller 1482, upon receiving the signal of high level, determines that the screen assembly 16 is in the expanded state.

For the trigger structure of the present disclosure, since the deformation structure (i.e., the rod assembly 1252) is used to realize the automatic switch function of the screen assembly 16, it is unnecessary to add a complex switch means in the display device 10 (only a simple tab 19 is added), avoiding occupying too much space in the display device 10 additionally, such that the structure of the display device 10 is more compact, which is advantageous to save the inner space of the display device 10.

In an embodiment, all of the left frame 124, the right frame 126, the left support frame 144, the right support frame 146 and so on of the display device 10 are made from a metal material, therefore, if a wireless communication module is arranged in the display device 10, the wireless communication module cannot work well due to the metallic shield effect. Therefore, the present disclosure further designs a unique antenna structure.

Referring to FIG. 47, an antenna structure includes a wireless communication module (not illustrated in the figure) and an antenna module, and the wireless communication module is arranged on the circuit board 148 inside the display device 10. The controller 1482 is electrically coupled to the FPC 11. The FPC 11 extends through the support assembly 14 and is partially located outside the display device 10. The part of the FPC 11 located outside the display device 10 is provided with the antenna module. The antenna module is arranged on the FPC 11 outside the display device 10, and is electrically coupled to the wireless communication module through a conductor.

Figure 48:
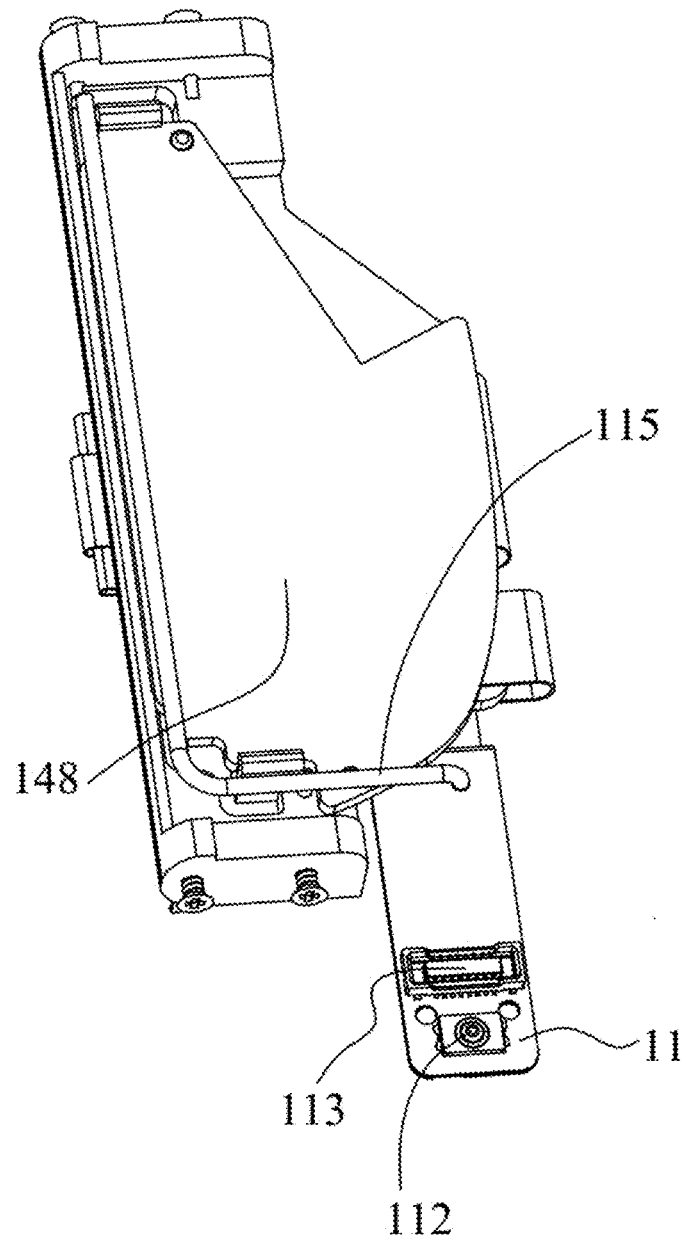
FIG. 48 is a schematic view illustrating the FPC illustrated in FIG. 47 and structures thereon, and connection of the FPC to the circuit board in the display device.
Figure 49:
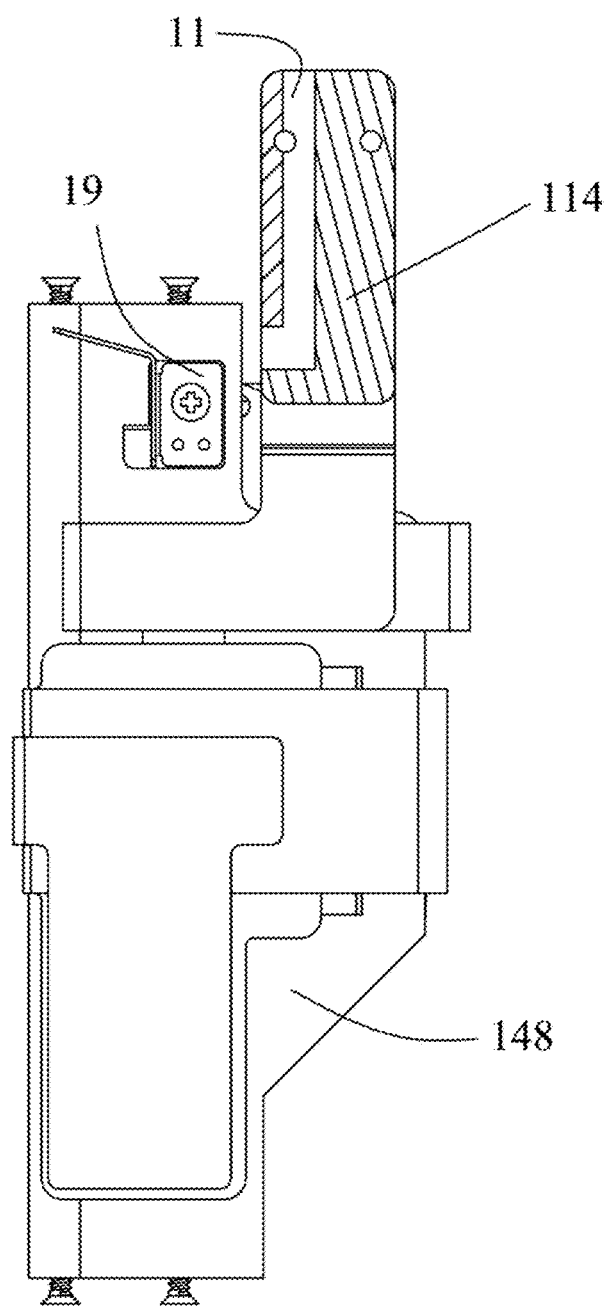
FIG. 49 is a schematic view of FIG. 48, viewed from another direction, mainly illustrating structures of the other face of the FPC.

Referring to FIG. 48 and FIG. 49, specifically, the FPC 11 extends beyond the frame assembly 12 from the first groove 1246 in the first side wall 1242 of the left frame 124 and the second groove 1266 in the second side wall 1262 of the right frame 126. The FPC 11 is provided with a button 112 and a coupler 113 for realizing electrical connection with the structures on the wrist belt 20. The coupler 113 and the button 112 are arranged on the front face of the FPC 11, and are electrically coupled to the electronic components on the circuit board 148 through conductors 115.

The part of the FPC 11 located outside the display device 10 is further attached with a reinforcing structure 114 spaced apart from the antenna module, and the reinforcing structure 114 and the antenna module are located at the same side of the FPC. The part of the FPC 11 located outside the display device 10 is further provided with the button 112, and the button 112 and the antenna module are located at two opposite sides of the FPC 11, respectively. Specifically, a bottom face of the FPC 11 is provided with the reinforcing structure 114, as illustrated in FIG. 47, and the reinforcing structure 114 includes two portions independent from each other. The reinforcing structure 114 is made of a rigid material, and can reinforce the hardness of the FPC 11, such that the FPC 11, when extending beyond the display device 10, can maintain flat shape connected to the electronic components such as the button and the coupler. The arrangement of the reinforcing structure 114 is advantageous to enhance the stability and service life of the button 112 and the coupler 113 on the FPC. The reinforcing structure 114 arranged on the bottom face of the FPC 11 can be a metal sheet. Furthermore, the reinforcing structure 114 can act as the antenna module, i.e., a radiating body of an antenna, and the antenna module is electrically coupled to the wireless communication module through the conductor to realize reception and transmission of wireless signals. The antenna module can be designed as an inverted F antenna or other types of antenna. Particularly, the reinforcing structure 114 located at the left side and the reinforcing structure 114 located at the right side are spaced apart by a trench so as to be insulated from each other. An area of the reinforcing structure 114 located at the left side is less than that of the reinforcing structure 114 located at the right side. Only the reinforcing structure 114 located at the left side acts as the antenna module, while the reinforcing structure 114 located at the right side is merely for supporting and reinforcement.

The FPC 11 extending beyond the display device 10 is fixed onto the base 1422 of the bracket 142, the bottom face of the FPC 11 lies on the base 1422, and the coupler 113 and the button 112 on the front face of the FPC 11 are exposed so as to be combined with relevant structures of the wrist belt 20.

The display device 10 of the present disclosure is combined with the wrist belt 20. The wrist belt 20 not only is used to be worn on the wrist of the user, but also can supply power to the display device 10. In the present disclosure, the battery module 30 is arranged on the wrist belt 20, preventing it from occupying the space in the display device 10, which is advantageous to design the display device 10 with small dimension.

Referring to FIG. 50 to FIG. 53, the wrist belt 20 includes a connecting part 21, a support sheet 22, and an enveloping body 23. The connecting part 21 is connected to an end of the support sheet 22 for connecting the support sheet 22 to the display device 10. The enveloping body 23 envelops the support sheet 22 and the connecting part 21 for contacting the wrist of the human body.

The connecting part 21 includes an end face 211, a bottom face 212, a top face 213, and a first lateral face 214 and a second lateral face 215 oppositely arranged and connected between the end face 211, the bottom face 212, and the top face 213. The top face 213 has an arc shape. The bottom face 212 includes an arc-shape face corresponding to the top face 213 and a plane corresponding to the end face 211. The connecting part 21 defines a receiving space. The end face 211 defines a first opening 2112. The end face 211 is attached with the display device 10, and a part of the display device 10 extend into the connecting part 21 through the first opening 2112. In the embodiment, the first opening 2112 is used for the base 1422 on the bracket 142 of the display device 10 to extend into the connecting part 21. The top face 213 defines a second opening 2132 and a third opening 2133. The second opening 2132 is close to the end face 211 and communicates with the first opening 2112. After the base 1422 extends into the inside of the connecting part 21, the button on the FPC 11 of the base 1422 is received in the second opening 2132. The third opening 2133 directly faces the bottom face 212.

The support sheet 22 is made from an elastic metal, and it is inserted in the enveloping body 23. The support sheet 22 includes a top end 221, a bottom end 222, and a bending section 223 connected between the top end 221 and the bottom end 222. The top end 221 is used to be fixedly connected to the connecting part 21. The bottom end 222 is used to fix the battery module 30. In a preferred embodiment, a plane where the top end 221 is located and a plane where the bottom end 222 is located are substantially parallel (i.e., the top end 221 and the bottom end 222 are parallel or nearly parallel). The support sheet 22 is attached with an FPC 25, and the FPC 25 extends from the bottom end 222 of the support sheet 22 to the top end 221. The FPC 25 on the support sheet 22 is fixedly connected to the FPC 11 of the display device 10, so as to conduct the signal and the current.

Figure 51:
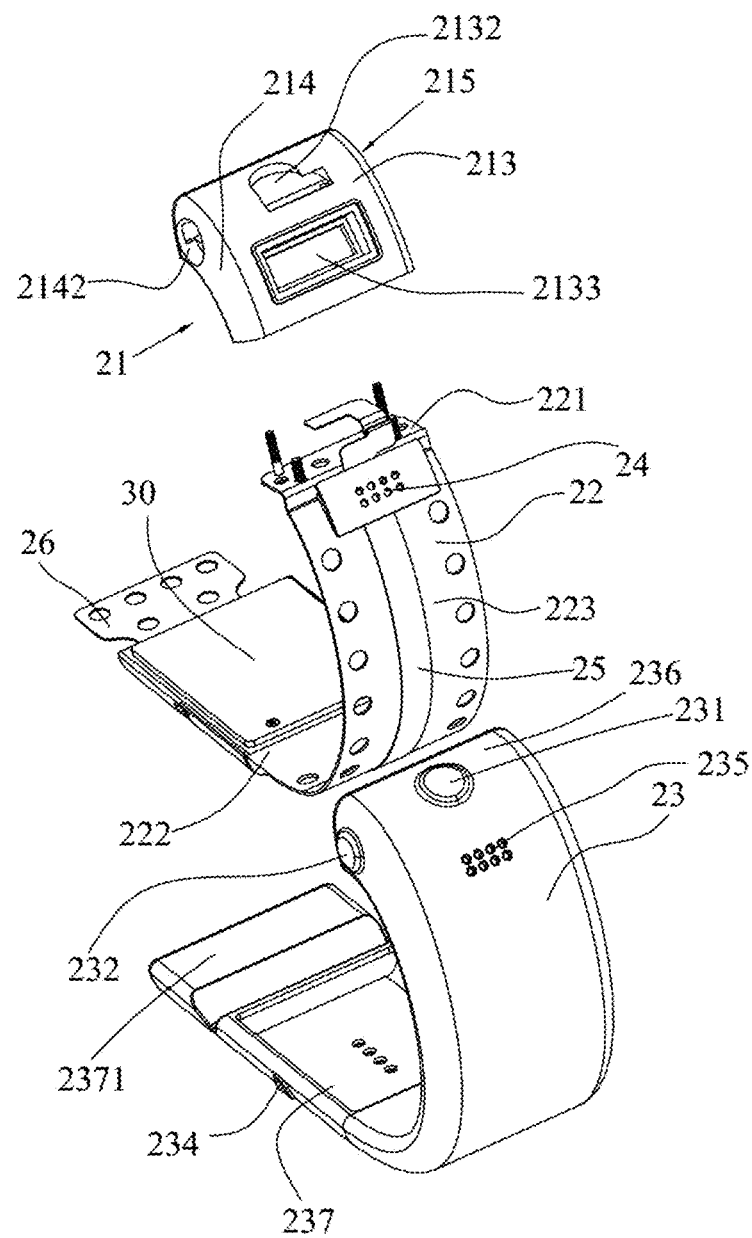
FIG. 51 is an exploded perspective schematic view of the wrist belt according to an embodiment of the present disclosure, viewed from one direction.
Figure 52:
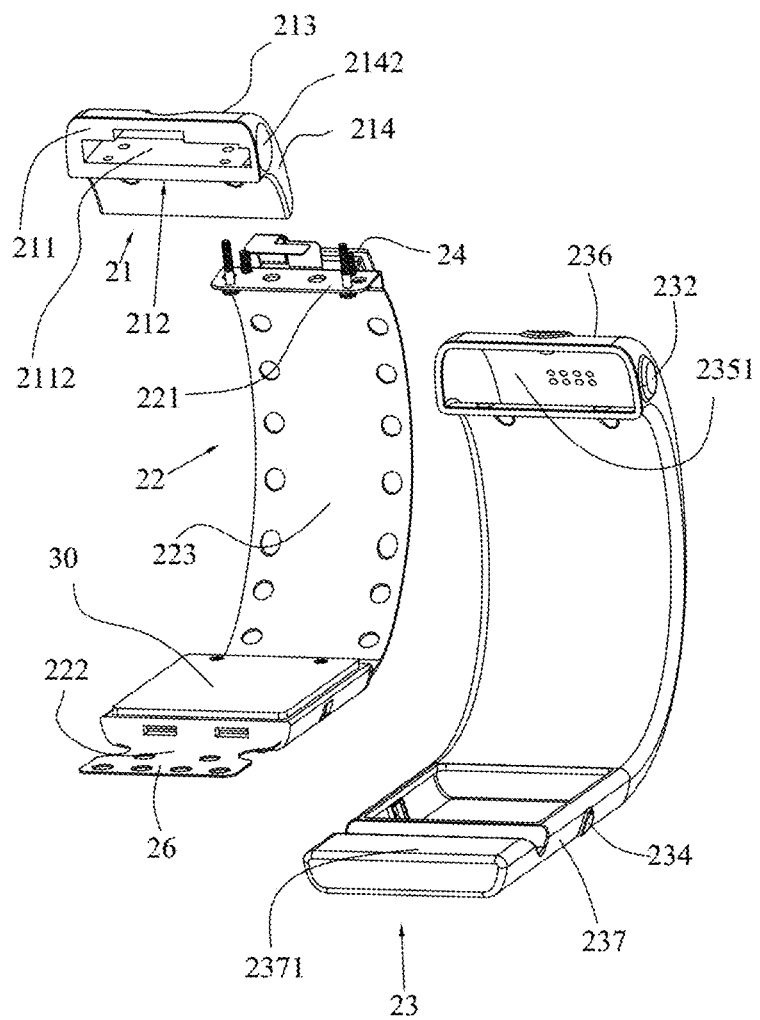
FIG. 52 is an exploded perspective schematic view of the wrist belt according to an embodiment of the present disclosure, viewed from another direction.

The top end 221 of the support sheet 22 passes through an end face of the bottom face 212, as illustrated in FIG. 51 and FIG. 52, and the top end 221 is locked in the connecting part 21 by four screws. One side of the top end of the support sheet 22 is fixed with a loudspeaker 24, and the loudspeaker 24 is received in the third opening 2133. Certainly, the loudspeaker 24 also can be other electronic components, for example, a battery management chip and a flash light. The first lateral face 214 of the connecting part 21 defines a penetrating hole 2142. The penetrating hole 2142 is arranged close to the end face 211 and communicates with the first opening 2112, and the head end 151 of the operating rod 15 in the base 1422 extends into the penetrating hole 2142.

Figure 53:
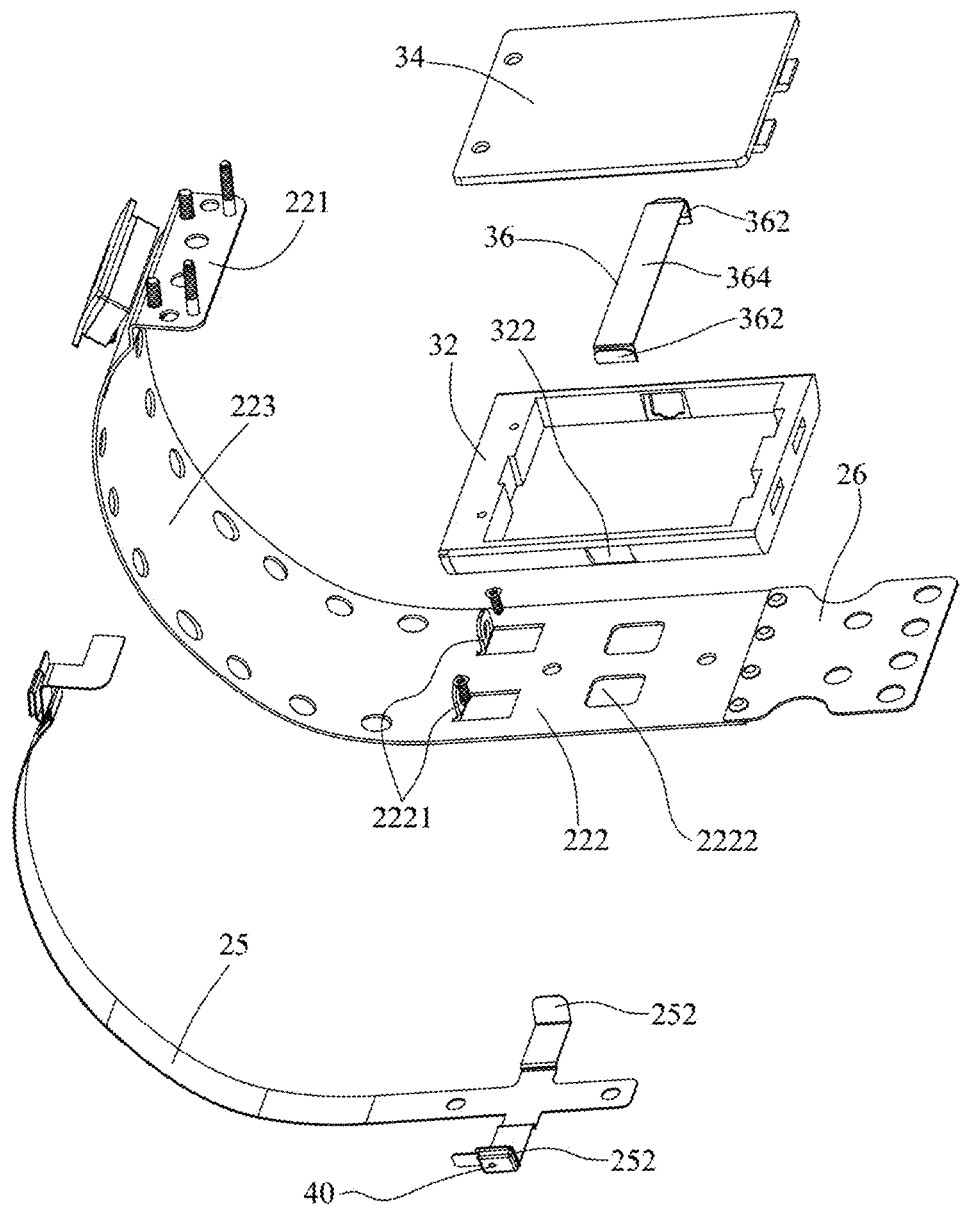
FIG. 53 is an exploded structural schematic view illustrating a support sheet of the wrist belt and a battery module according to an embodiment of the present disclosure.

Referring to FIG. 53, the bottom end 222 of the support sheet 22 is provided with the battery module 30 connected to the FPC 25. The battery module 30 includes a bottom frame 32 and a top cover 34.

The bottom frame 32 is attached with the bottom end 222 of the support sheet 22 in a manner such as injection molding. The bottom frame 32 has a hollow square frame structure, and is formed by connecting four side walls. The four side walls together define an opening. The support sheet 22 is exposed to the opening.

Baffles 2221 protrude from the surface of the bottom end 222 of the support sheet 22, as illustrated in FIG. 53, the number of the baffles 2221 is two, and the baffles 2221 are formed by cutting and bending the bottom end 222. The baffles 2221 are fixedly connected to the bottom frame 32. In an embodiment, the bottom end 222 has a sheet-shape structure, and the baffle 2221 is perpendicular to the surface of the bottom end 222. The baffle 2221 of the support sheet 22 is inserted in a side wall of the bottom frame 32 in the molding process of the bottom frame 32, such that the combination of the bottom frame 32 with the support sheet 22 is more stable. Specifically, the bottom frame 32 can be formed on the bottom end 222 by means of injection molding.

The bottom frame 32 defines a buckle hole. The top cover 34 is provided with a buckle hook for clamping in the buckle hole of the bottom frame 32, thus fixing the top cover 34 to the bottom frame 32. Furthermore, the top cover and the bottom frame are fixed by a screw passing through a screw hole of the top cover 34 and locked in the screw hole of the bottom frame 32.

The bottom frame 32 defines an inner cavity for receiving the battery, and the top cover 34 covers the bottom frame 32 so as to cover the battery in the bottom frame 32.

Referring to FIG. 53, the present disclosure further provides a power switch 40. In an embodiment, the power switch 40 is arranged at one side of the battery module 30. Specifically, the power switch 40 is arranged on the FPC 25 in the wrist belt 20. The FPC 25 attached on the support sheet 22 forms a side wing 252 at a place of the bottom end 222 of the support sheet 22. The power switch 40 is arranged on the side wing 252, and the side wing 252 extends into one side wall of the bottom frame 32, and is fixed at the penetrating hole 322 of the side wall of the bottom frame 32 through a fixing structure.

In another embodiment, the FPC 25 forms a cross structure at the bottom portion and erects upwards on the two sides to form the side wings 252. The side wall of the bottom frame 32 defines two penetrating holes 322 for the side wings 252 of the FPC 25 to pass through. The FPC 25 is attached on the bottom face of the support sheet 22, and the bottom frame 32 is fixed to the top face of the support sheet 22. The side walls of the bottom frame 32 define penetrating holes 322. The bottom end 222 of the support sheet 22 defines through holes 2222 passing through the bottom face and the top face thereof.

Figure 54:
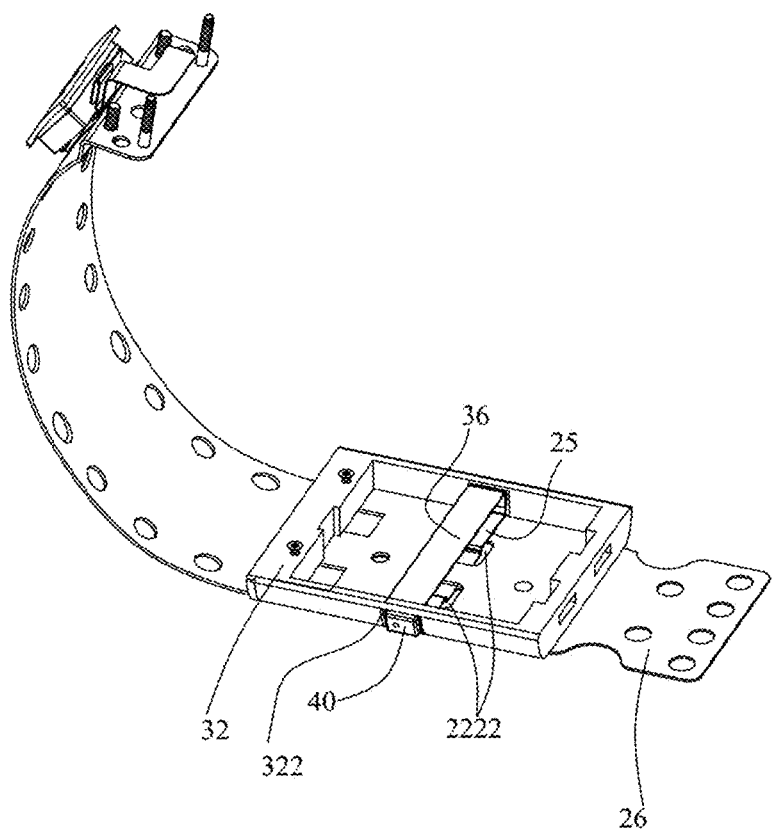
FIG. 54 is a schematic view illustrating the FPC of the wrist belt assembled with the support sheet and a bottom frame according to an embodiment of the present disclosure.

Referring to FIG. 54, the FPC 25 penetrates into the bottom frame 32 through the through holes 2222 of the support sheet 22, and the side wings 252 extend into the penetrating holes 322 of the bottom frame 32. One of the side wings 252 is fixed with the power switch 40. The battery module 30 further includes a support tab 36. The support tab 36 includes a pair of oppositely arranged abutment portions 362 and an elastic connecting sheet 364 connected between the pair of abutment portions 362. The pair of abutment portions 362 abut against the two side wings 252 of the FPC 25, respectively, and the connecting sheet 364 is connected between the pair of abutment portions 362 so as to provide support to the power switch 40, such that the power switch 40, when being pressed down, can be supported by the support tab 36 to restore an original position. The support tab 36 and the FPC 25 together envelop the battery, and the two side wings 252 are located at two sides of the battery, respectively.

As illustrated in FIG. 51, FIG. 52, and FIG. 53, the wrist belt 20 further includes a lap sheet 26, and the bottom end 222 of the support sheet 22 is connected to the lap sheet 26 by rivets. The lap sheet 26 is made from a deformable stainless iron sheet material. The lap sheet 26 and the support sheet 22 are made from different materials. The strength of the lap sheet 26 is higher than that of the support sheet 22, and the lap sheet 26 is mainly used to shape the enveloping body 23, so as to comply with the shape of the wrist of the human body. The lap sheet 26 has better flexibility, and can be bent to any position, and can maintain the shape at any position. Therefore, the wrist is enveloped by the support sheet 22, and the lap sheet 26 prevents the wrist belt 20 from falling off.

A screw passes through the top end 221 of the support sheet 22 and the bottom face 212 of the connecting part 21, and is locked in the screw hole of the base 1422 of the bracket 142, thus assembling and fixing the display device 10, the connecting part 21, and the support sheet 22.

The enveloping body 23 is used to envelop the connecting part 21 and the support sheet 22. In an embodiment, the enveloping body 23 is made from a soft material. Specifically, the support sheet 22 is preferably an elastic manganese steel sheet, and the enveloping body 23 is a silicone molded on the support sheet 22.

Figure 50:
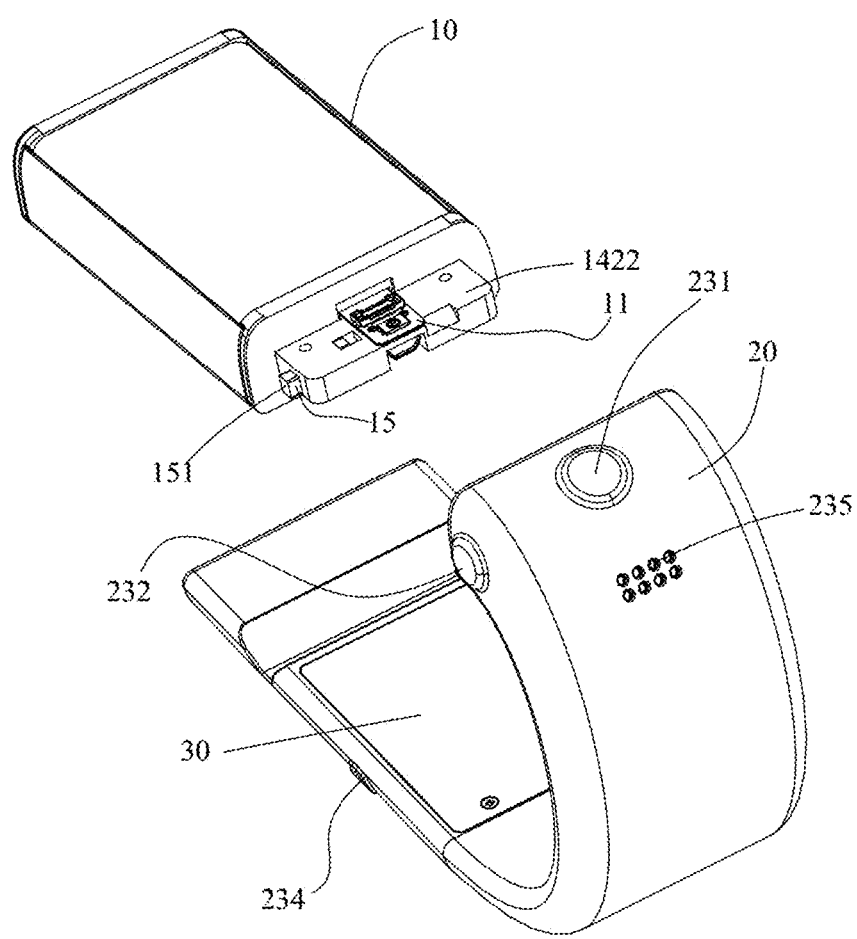
FIG. 50 is a schematic view illustrating a wrist belt of the smart bracelet being separated from the display device according to an embodiment of the present disclosure.

Referring to FIG. 50 to FIG. 52, the enveloping body 23 includes a top portion 236 and a bottom portion 237, the top portion 236 is close to the display device 10, and the bottom portion 237 is away from the display device 10. An end of the top portion 236 of the enveloping body 23 defines a receiving space 2351 for receiving the connecting part 21. A top face of the top portion 236 of the enveloping body 23 is provided with a home button 231. The home button 231 is arranged opposite to the second opening 2132 on the connecting part 21. The home button 231 is corresponding to the button 112 on the FPC 11. By pressing down the home button 231, the button 112 on the FPC 11 can be triggered, such that display contents of the screen assembly 16 return to a home interface.

A lateral face of the top portion 236 of the enveloping body 23 is provided with an expansion button 232. The expansion button 232 is arranged opposite to the penetrating hole 2142 in the connecting part 21, and the expansion button 232 is corresponding to the head end 151 of the operating rod 15. By pressing down the expansion button 232, the display device 10 expands automatically.

A lateral face of the bottom portion 237 of the enveloping body 23 is provided with a switch button 234, and the switch button 234 is corresponding to the power switch 40 of the support sheet 22. By pressing down the switch button 234, the display device 10 is turned on or off.

The enveloping body 23 is further provided with the sound holes 235, corresponding to the loudspeaker 24. The sound from the loudspeaker 24 goes out through the sound holes 235.

A free end of the bottom portion 237 of the enveloping body 23 is provided with a tail portion 2371, and the tail portion 2371 is used to envelop the lap sheet 26.

Finally, it should be indicated that the above-mentioned embodiments are merely for illustrating the technical solutions of the present disclosure, rather than limiting the present disclosure. Although the present disclosure is described in detail with reference to the preceding embodiments, a person ordinarily skilled in the art should know that the scope of protection of the present disclosure is not limited to this, while modifications or replacements easily envisaged by any one skilled in the art, within the technical scope of the present disclosure, shall fall within the scope of protection of the present disclosure. Therefore, the scope of protection of the present disclosure should be based on the scope of protection of the claims.

What is claimed is:

1. A trigger device comprising:
   a controller;
   a screen assembly;
   an extendible support assembly operable to support the screen assembly; and
   a drive assembly operable to drive the support assembly;
   the drive assembly being provided with a first contact, the support assembly being provided with a second contact movable relative to the first contact, during retraction or extension of the support assembly, the first contact and the second contact move relative to each other between a contacting state and a separating state; the controller is operable to determine whether the support assembly is in the retraction state or the extension state according to the contacting state or the separating state of the first contact and the second contact, so as to control display of the screen assembly.

2. The trigger device of claim 1, wherein the support assembly is deformed in a first direction, and the first contact moves relative to the second contact in a second direction different from the first direction.

3. The trigger device of claim 2, wherein the first direction is perpendicular to the second direction.

4. The trigger device of claim 2, wherein when the support assembly is extended or retracted in the first direction, the first contact and the second contact move together with the support assembly in the first direction.

5. The trigger device of claim 1, wherein the drive assembly comprises a first connecting rod and a second connecting rod hinged with each other, and when the support assembly is retracted or extended, the first connecting rod and the connecting rod move relative to each other.

6. The trigger device of claim 5, wherein the first contact is arranged on the second connecting rod, the second connecting rod is made from an electrically conductive material, and the second connecting rod is electrically coupled to the controller.

7. The trigger device of claim 6, wherein when the first contact comes to be in contact with the second contact, the second connecting rod and the controller form a current path; when the first contact is separated from the second contact, the current path formed by the second connecting rod and the controller is disconnected.

8. The trigger device of claim 7, wherein the first contact is grounded, the second contact is electrically coupled to a terminal of the controller, the controller is further electrically coupled to a resistor, and when the first contact comes to be in contact with the second contact, the terminal of the controller is at a low level; when the first contact is separated from the second contact, the resistor generates a high level signal, and the high level signal is input to the terminal of the controller.

9. The trigger device of claim 1, wherein the support assembly comprises a tray, the controller is installed above the tray, and the second contact is fixed below the tray.

10. The trigger device of claim 5, wherein the first contact comprises a protruding column protruding from the second connecting rod, and the second contact comprises a tab.

11. The trigger device of claim 10, wherein the drive assembly comprises a rod assembly, the rod assembly comprises a first fixing end, a second fixing end, a first moving end, and a second moving end, the support assembly comprises a left frame and a right frame, the first fixing end is fixedly connected to the left frame, the second fixing end is fixedly connected to the right frame, the first moving end is slidably connected to the left frame, the second moving end is slidably connected to the right frame, and the protruding column protrudes from the first moving end.

12. The trigger device of claim 11, wherein the rod assembly further comprises a third connecting rod and a fourth connecting rod, the first connecting rod is hinged with the third connecting rod to form an X-shape structure, the second connecting rod is hinged with the fourth connecting rod to form an X-shape structure; the first connecting rod has an end hinged with an end of the second connecting rod, and another end of the first connecting rod forms the second moving end, another end of the second connecting rod forms the first moving end; the third connecting rod has an end hinged with an end of the fourth connecting rod, and another end of the third connecting rod forms the second fixing end, another end of the fourth connecting rod forms the first fixing end.

13. The trigger device of claim 5, wherein the first connecting rod and the second connecting rod are elastically connected through an elastic element, the elastic element is a coil spring, the elastic element is sleeved at a hinged place between the first connecting rod and the second connecting rod, and the elastic element has two ends fixed to the first connecting rod and the second connecting rod, respectively.

14. The trigger device of claim 1, wherein the controller is electrically coupled to a flexible printed circuit (FPC), and the FPC passes through the support assembly and has a part located outside a display device having the trigger device.

15. The trigger device of claim 14, wherein the part of the FPC located outside the dial plate display device is attached with an antenna module.

16. The trigger device of claim 15, wherein the part of the FPC located outside the display device is further attached with a reinforcing structure spaced apart from the antenna module, and the reinforcing structure and the antenna module are located at the same side of the FPC.

17. The trigger device of claim 15, wherein the part of the FPC located outside the display device is further provided with a button, and the button and the antenna module are located at two opposite sides of the FPC, respectively.

18. The trigger device of claim 1, wherein the support assembly comprises a left frame, a right frame, a left support frame, a right support frame, and a bracket, the left frame comprises a first bottom wall, the right frame comprises a second bottom wall, the drive assembly is connected to the first bottom wall and the second bottom wall; the left support frame is fixedly connected to the left frame, and comprises a first bottom plate arranged opposite to the first bottom wall; the right support frame is fixedly connected to the right frame; the second contact is fixed to the first bottom plate, and the drive assembly has a part located between the first bottom plate and the first bottom wall.

19. The trigger device of claim 18, wherein the first bottom plate defines a through groove, the second contact comprises a fixing sheet and a pressing sheet, the fixing sheet is fixed in through groove, the controller is located at a side of the first bottom plate away from the first bottom wall, and the pressing sheet protrudes from the fixing sheet and extends from the fixing sheet towards the drive assembly.

20. A smart bracelet comprising:
a display device comprising:
a controller;
a screen assembly;
an extendible support assembly operable to support the screen assembly; and
a drive assembly operable to drive the support assembly;
the drive assembly being provided with a first contact, the support assembly being provided with a second contact movable relative to the first contact, during retraction or extension of the support assembly, the first contact and the second contact move relative to each other between a contacting state and a separating state; the controller is operable to determine whether the support assembly is in the retraction state or the extension state according to the contacting state or the separating state of the first contact and the second contact, so as to control display of the screen assembly; and
a wrist belt coupled with the display device.

\* \* \* \* \*